United States Patent
Takaishi

(10) Patent No.: US 7,265,934 B2
(45) Date of Patent: Sep. 4, 2007

(54) HEAD POSITION CONTROL METHOD, HEAD POSITION CONTROL DEVICE, AND DISK DEVICE

(75) Inventor: Kazuhiko Takaishi, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/362,601

(22) Filed: Feb. 23, 2006

(65) Prior Publication Data

US 2006/0291101 A1    Dec. 28, 2006

(30) Foreign Application Priority Data

Jun. 27, 2005   (JP)   ............... 2005-187029

(51) Int. Cl.
*G11B 5/596* (2006.01)
(52) U.S. Cl. .................................. 360/77.04
(58) Field of Classification Search ............ 360/77.04, 360/75, 78.01, 77.01, 77.16, 73.03; 369/300, 369/53.42; 375/341, 347
See application file for complete search history.

(56) References Cited

U.S. PATENT DOCUMENTS

| | | | | |
|---|---|---|---|---|
| 5,404,252 | A * | 4/1995 | Nagasawa et al. | 360/77.16 |
| 5,566,378 | A * | 10/1996 | Nagasawa et al. | 360/77.16 |
| 5,636,193 | A * | 6/1997 | Ohmi | 369/53.42 |
| 5,936,787 | A * | 8/1999 | Ohmi | 360/73.03 |
| 6,178,157 | B1 * | 1/2001 | Berg et al. | 369/300 |
| 6,421,200 | B2 | 7/2002 | Takaishi | |
| 6,430,239 | B1 * | 8/2002 | Ferreol | 375/347 |
| 6,678,339 | B1 * | 1/2004 | Lashkarian | 375/341 |
| 6,762,902 | B2 | 7/2004 | Chew | |
| 7,145,746 | B1 * | 12/2006 | Hirano et al. | 360/77.04 |
| 2002/0159539 | A1 * | 10/2002 | Alcock et al. | 375/279 |
| 2006/0250719 | A1 * | 11/2006 | Hutchins et al. | 360/46 |

FOREIGN PATENT DOCUMENTS

JP    3460795    8/2003

OTHER PUBLICATIONS

Brown et al.; "Control for Canceling Periodic Disturbances with Uncertain Frequency"; Proceedings for the 40th IEEE Conference on Decision and Control; pp. 4909-4914; Dec. 2001.
Masashi Kisaka; "Frequency Chasing Peak Filter"; Institute of Electrical Engineers of Japan; Technical Meeting on Industrial Instrumentation and Control; pp. 19-23; Sep. 10, 2004.

* cited by examiner

*Primary Examiner*—Fred F. Tzeng
(74) *Attorney, Agent, or Firm*—Greer, Burns & Crain, Ltd.

(57) ABSTRACT

A position control device corrects the displacement of the head by disturbance applied to the disk device by the control system. An adaptive control to an unknown disturbance frequency is performed. The frequency estimation block for estimating the external vibration frequency from a signal that is based on the position error according to the adaptive rule, and a correction table for sequentially correcting the constants of the compensator using this external vibration frequency, are provided. Since the constants of the compensator are sequentially corrected according to the estimated angular frequency, highly accurate follow up control to an external vibration frequency in a wide range becomes possible.

27 Claims, 30 Drawing Sheets

| cos(1·ωr·T) | sin(1·ωr·T) | F1(1·ωr) | F2(1·ωr) |
|---|---|---|---|
| cos(2·ωr·T) | sin(2·ωr·T) | F1(2·ωr) | F2(2·ωr) |
| ... | ... | ... | ... |
| cos(k·ωr·T) | sin(k·ωr·T) | F1(k·ωr) | F2(k·ωr) |
| ... | ... | ... | ... |

25

| cos(1·ωr·T) | F1(1·ωr) | F2(1·ωr) |
|---|---|---|
| cos(2·ωr·T) | F1(2·ωr) | F2(2·ωr) |
| ... | ... | ... |
| cos(k·ωr·T) | F1(k·ωr) | F2(k·ωr) |
| ... | ... | ... |

25-1

HEAD POSITION CONTROL METHOD, HEAD POSITION CONTROL DEVICE, AND DISK DEVICE

CROSS-REFERENCE TO RELATED APPLICATIONS

This application is based upon and claims the benefit of priority from the prior Japanese Patent Application No. 2005-187029, filed on Jun. 27, 2005, the entire contents of which are incorporated herein by reference.

BACKGROUND OF THE INVENTION

1. Field of the Invention

The present invention relates to a head position control method for a disk device for suppressing the displacement of the head by disturbance and the disk device, and more particularly to a head position control method for suppressing the displacement of the head by external vibration and the disk device.

2. Description of the Related Art

In the case of a disk device, which reads and writes data on a rotating storage medium (e.g. disk medium) by a head, the head is positioned on a desired track of the storage medium and data is read from/written to the track by the head. For such a disk device, such as a magnetic disk device or optical disk device, it is extremely important to accurately position the head on the target track for improving the recording density.

One factor that interrupts this positioning is eccentricity, which is caused by the center of the servo signals disposed concentrically on the disk that is different from the rotation center of the motor. A technology to correct this eccentricity is a control method using an observer (e.g. Japanese Patent No. 3,460,795).

Eccentricity generates sinusoidal positional fluctuation synchronizing with an integral multiple of the rotation frequency. The above-mentioned observer control method can suppress such sinusoidal positional fluctuation so as to position the head accurately on the target track. However for this eccentricity correction, the frequency to be corrected must be known in advance. For example, the frequency must be an integral multiple, multiplied once or twice, of the rotation frequency.

The second factor that interrupts this positioning is vibration, which is applied to the disk device from the outside. This vibration has various waveforms, but here a method for handling sinusoidal vibration will be described. By applying the above-mentioned eccentricity correction control, it becomes possible to handle a frequency which is not an integral multiple of the rotation frequency.

In the case of the above-mentioned conventional configuration, it is based on the assumption that the frequency of the disturbance is known in advance. The external vibration to be applied, however, is unknown at the point of designing the control system, so it is impossible to know the frequency in advance. Therefore some means of detecting this unknown frequency is necessary, and only if the frequency can be detected, the positional fluctuation by external vibration can be suppressed using such a control method as the above-mentioned Japanese Patent No. 3,460,795.

FIG. 44 is a block diagram depicting a conventional control system for detecting the disturbance frequency and suppressing sinusoidal disturbance with a predetermined frequency. The position error 'e' between the target position 'r' and the observed position 'y' is calculated by the computing unit 100, and is input to the controller 102 (Cn) for performing feedback control. The controller 102 outputs the control current value Un by known PID control, PI control+ LeadLag, and observer control.

A frequency estimation unit ($\omega$ estimation) 106 for estimating disturbance, and a compensator (Cd) 104 for suppressing disturbance of a predetermined frequency by adaptive control are added to this controller 102. The sum of the output Un of the controller 102 (Cn) and the output Ud of the compensator 104 (Cd) that is U, is supplied to the control target 103 (P). This frequency estimation unit 106 estimates the angular frequency $\omega$ ($=2\pi f$) of the disturbance based on the position error 'e', and introduces it to the transfer function of the disturbance frequency suppression of the compensator 104. The compensator 104 calculates the recurrence formula (adaptive control formula) of the sine wave from the position error 'e' and the estimated angular frequency '$\omega$', and calculates the compensating current output Ud.

In this way, the frequency of disturbance is detected and the unknown frequency is suppressed so that conventional eccentricity correction control can handle the disturbance of an unknown frequency in a certain range (e.g. Proceedings of the $40^{th}$ IEEE Conference on Decision and Control, pp. 4909-4914, issued December 2001). As a method of estimating an unknown frequency and suppressing the disturbance of an unknown frequency, assuming the recurrence formula of the sine wave (e.g. The Institute of Electrical Engineers of Japan, Technical Meeting on Industrial Instrumentation and Control, IIC-04-70, "Frequency following type peak filter", issued Sep. 10, 2004), or correcting the drive amount of the control target by introducing an adaptive rule based on the above-mentioned error signal (e.g. Proceedings of the $40^{th}$ IEEE Conference on Decision and Control, pp. 4909-4914, issued December 2001), have been proposed. Another proposal is estimating an unknown frequency by the error signal, generating a disturbance suppression signal in the position level, correcting the error signal and inputting it to the controller (e.g. U.S. Pat. No. 6,762,902).

For example, as an example of the open loop characteristics of the system in FIG. 45 show, the zero cross frequency of the open loop characteristics is set to 1000 Hz, and the target disturbance frequency is set to 500 Hz. This is the characteristic expressed by (Cn+Cd) P in FIG. 46. By setting the gain of the open loop characteristics of a specified frequency (500 Hz in this case) to high in this way, suppression of disturbance can be implemented.

Recently such a disk device, in particular a hard disk drive (HDD), is installed in mobile equipment, such as a portable personal computer, portable terminal, portable telephone and portable AV equipment. When the disk device is used in this environment the disturbance frequency is unknown and multiple, so the disk device must adapt to a wide range of disturbance frequencies.

Therefore if a conventional compensator for suppressing external vibration is attached to a conventional controller, a coefficient, according to the frequency of the external vibration, must be appropriately set in the suppression signal generation formula. In the case of the system in FIG. 44, the gain and the phase of the transfer function (adaptive rule) of the compensator 104 for suppressing external vibration must be adjusted. If this adjustment is not appropriate, the control system becomes unstable.

The above-mentioned various conventional disturbance suppression control methods determine such coefficients as the gain and the phase in advance based on experience or on estimate using the design theory of the feedback system, and the gain and the phase are fixed values in a generation formula. In such a setting of coefficients, disturbance suppression by a disturbance frequency in a certain range (e.g. estimated frequency range of the servo system) is possible.

However if the disk device is used in the above-mentioned mobile environment, the range of the unknown disturbance frequency changes depending on the operating conditions, and cannot be easily estimated. In the case of the adaptive control of a disturbance in prior art, the frequency range that can be followed up is limited, so in the above-mentioned operation environment, an adjusted gain and phase may be inappropriate, and may make the control system unstable. The level of disturbance cannot be specified either, which makes the control system unstable, and may amplify errors or may even diverge errors.

SUMMARY OF THE INVENTION

With the foregoing in view, it is an object of the present invention to provide a head position control method, head position control device and disk device for implementing disturbance suppression control adapting to disturbance frequencies in a wider range.

It is another object of the present invention to provide a head position control method, head position control device and disk device for implementing disturbance suppression control even when used in a mobile environment.

It is still another object of the present invention to provide a head position control method, head position control device and disk device for implementing disturbance suppression control adapting to disturbance frequencies and the disturbance amplitudes in a wider range.

It is still another object of the present invention to provide a head position control method, head position control device and disk device for implementing disturbance suppression control adapting to disturbance frequencies in a wider range at high precision.

To achieve these objects, the present invention is a head positioning control method for controlling the positioning of a head onto a desired track of a disk by an actuator according to a position signal, which the head has read from the disk. The control method has: a step of obtaining a control value of the actuator according to a position error between a target position and a current position acquired from the position signal; a step of estimating sequentially an external vibration frequency from a signal that is based on the position error according to an adaptive rule; a step of estimating a rotation vector of the cyclic disturbance from the signal that is based on the position error and obtaining an external vibration suppression control value using a constant for external vibration suppression; a step of sequentially correcting the constant for external vibration suppression according to each of the sequentially estimated external vibration frequencies; and a step of generating a drive value of the actuator by adding the control value and the external vibration suppression control value.

Also the present invention is a head positioning control device for controlling the positioning of a head onto a desired track of a disk by an actuator according to a position signal, which the head has read from the disk. The device has: a control unit for obtaining a control value of the actuator according to a position error between a target position and a current position acquired from the position signal; an adaptive control unit for estimating sequentially an external vibration frequency from a signal that is based on the position error according to an adaptive rule, estimating a rotation vector of the cyclic disturbance from the signal based on the position error, obtaining an external vibration suppression control value using a constant for external vibration suppression, and sequentially correcting the constant for external vibration suppression according to each of the sequentially estimated external vibration frequencies; and an addition unit for adding the control value and the external vibration suppression control value, and generating a drive value of the actuator.

The disk device of the present invention has a head for reading information from a disk, an actuator for moving the head in track crossing direction of the disk, and a control unit for obtaining a control value of the actuator according to a position error between a target position and a current position acquired by a position signal read by the head, so as to position the head onto a desired track of a disk according to the position signal. The control unit further has an adaptive control block for estimating sequentially an external vibration frequencies from a signal that is based on the position error according to an adaptive rule, estimating a rotation vector of the cyclic disturbance from the signal that is based on the position error, obtaining an external vibration suppression control value using a constant for external vibration suppression, and sequentially correcting the constant for external vibration suppression according to each of the sequentially estimated external vibration frequencies, and an addition block for adding the control value and the external vibration suppression control value, and generating a drive value of the actuator.

In the present invention, it is preferable that the step of estimating further has a step of estimating an angular frequency of the sequential disturbance from the signal based on the position error according to the adaptive rule, the step of obtaining the external vibration suppression value further has a step of converting the estimated rotation vector of cyclic disturbance into a current value as the external vibration suppression control value using an output gain as the constant for external vibration suppression, and the step of correcting further has a step of sequentially correcting the output gain according to the sequentially estimated angular frequency.

In the present invention, it is also preferable that the step of correcting further has a step of referring to a table for storing the output gain for each of a plurality of angular frequency values by the estimated angular frequency, fetching the corresponding output gain, and updating the output gain as the constant for external vibration suppression.

In the present invention, it is also preferable that the step of correcting further has a step of referring to a table for storing the output gain for each of a plurality of angular frequency values by the estimated angular frequency, fetching the corresponding two output gains, and a step of obtaining the output gain of the estimated angular frequency by the interpolation of the two output gains and updating the output gain as the constant for external vibration suppression.

It is also preferable that the present invention further has a step of delaying the external vibration suppression control value by one sample, and the step of generating further has a step of generating a drive value of the actuator by adding the control value in the current sample and the one sample-delayed external vibration suppression control value.

In the present invention, it is also preferable that the step of estimating further has a step of limiting the estimated angular frequency by an upper limit value and a lower limit value.

In the present invention, it is also preferable that the step of estimating, the step of correcting and the step of obtaining the external vibration suppression value and the step of generating are executed for every one sample, and the step of obtaining the control value is executed a plurality of times during one sample.

It is also preferable that the present invention further has a step of executing the step of estimating, the step of correcting and the step of obtaining the external vibration suppression value for each of the plurality of external vibration frequencies for each of the external vibration frequencies, and a step of adding the plurality of external vibration suppression values.

In the present invention it is also preferable that the step of executing further has a step of correcting one of the estimated external vibration frequencies so that the estimated external vibration frequencies do not overlap.

In the present invention, an accurate external vibration frequency, which is integral-compensated, can be estimated, since the external vibration frequency is estimated from a signal based on the position error according to an adaptive rule, and a highly accurate follow up control can be performed for a wide range of external vibration frequencies, since the constant of the compensator is corrected using this estimated external vibration frequency. In this way, the operation of the compensator can always be maintained at an optimum according to the value of the estimated external vibration frequency, and follow up control for a wide range of external vibration frequencies becomes possible by correcting the constant of the compensator.

BRIEF DESCRIPTION OF THE DRAWINGS

FIG. 15 is delayed by one sample;

FIG. 7 is not delayed by one sample;

DESCRIPTION OF THE PREFERRED EMBODIMENTS

The present invention will now be described in the sequence of the disk device, first embodiment of the positioning control system, second embodiment of the positioning control system, third embodiment of the positioning control system, fourth embodiment of the positioning control system, fifth embodiment of the positioning control system, sixth embodiment of the positioning control system, seventh embodiment of the positioning control system, example, and other embodiments. In the present invention, the magnetic disk device (hard disk drive) will be described as an example. However the technology described in the present invention can also be applied to other disk devices, for example such optical disk devices as CD-ROM and DVD-ROM, and such magneto-optical disk devices as MO and MD.

Disk Device

Figure 1:
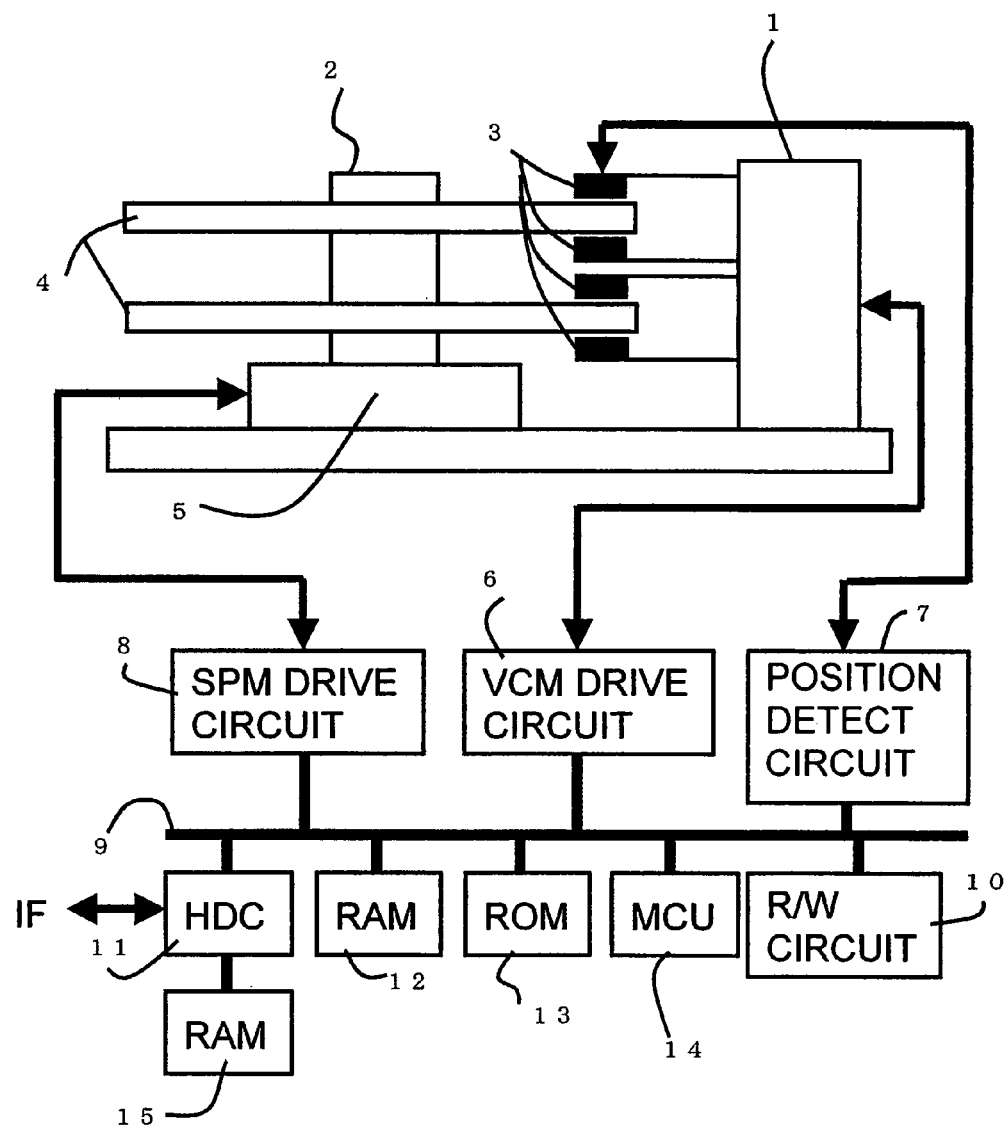
FIG. 1 is a block diagram depicting the disk storage device according to an embodiment of the present invention.
Figure 2:
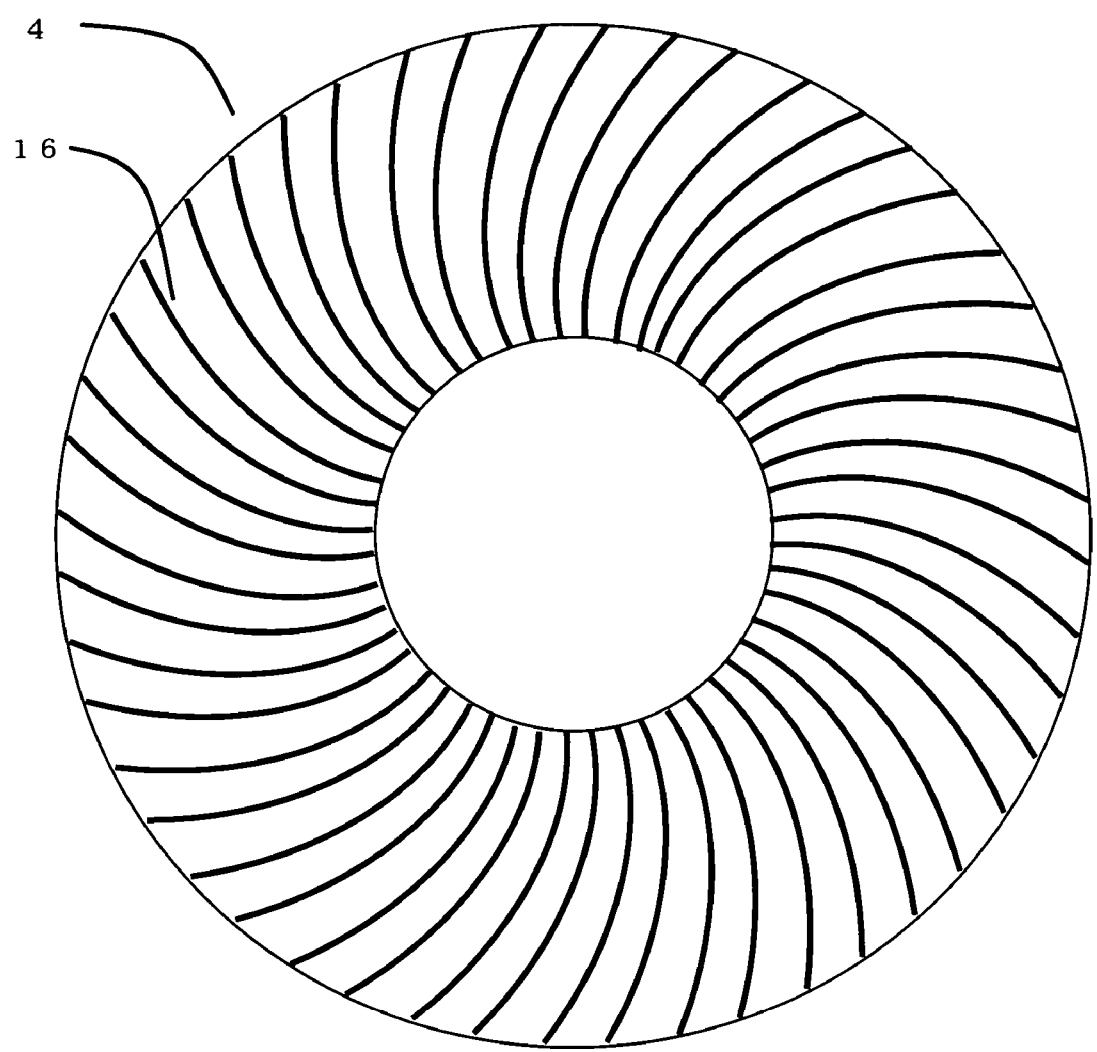
FIG. 2 is a diagram depicting the position signals of the disk in the configuration in FIG. 1.
Figure 3:
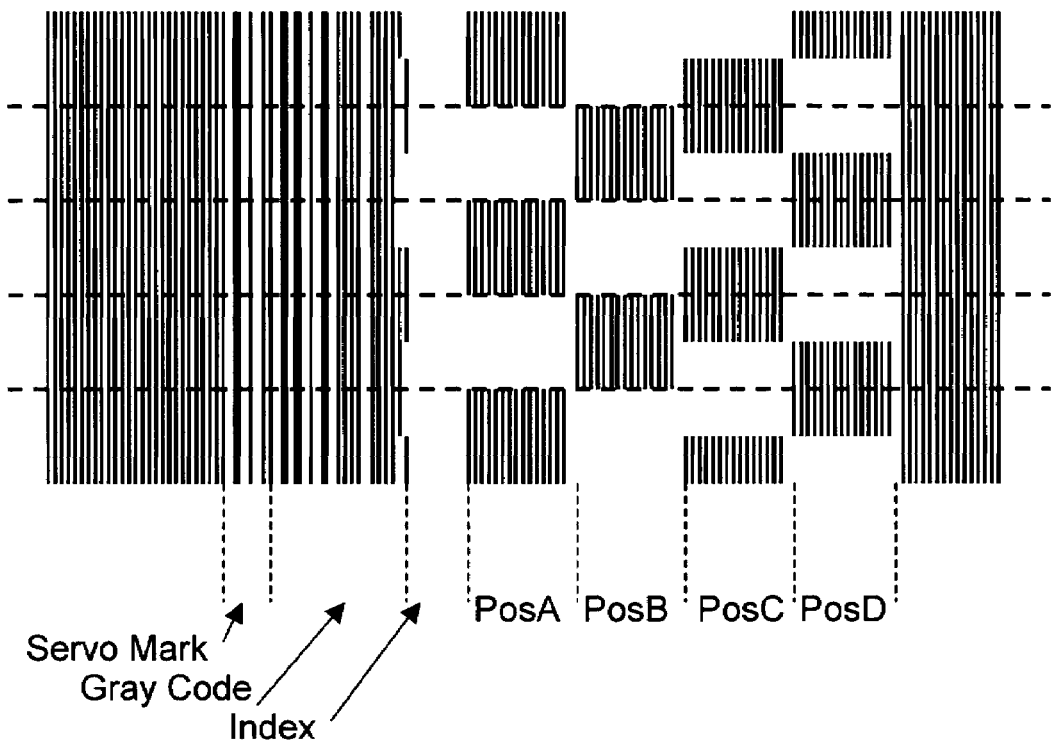
FIG. 3 is a diagram depicting the details of the position signals in FIG. 2.
Figure 4:
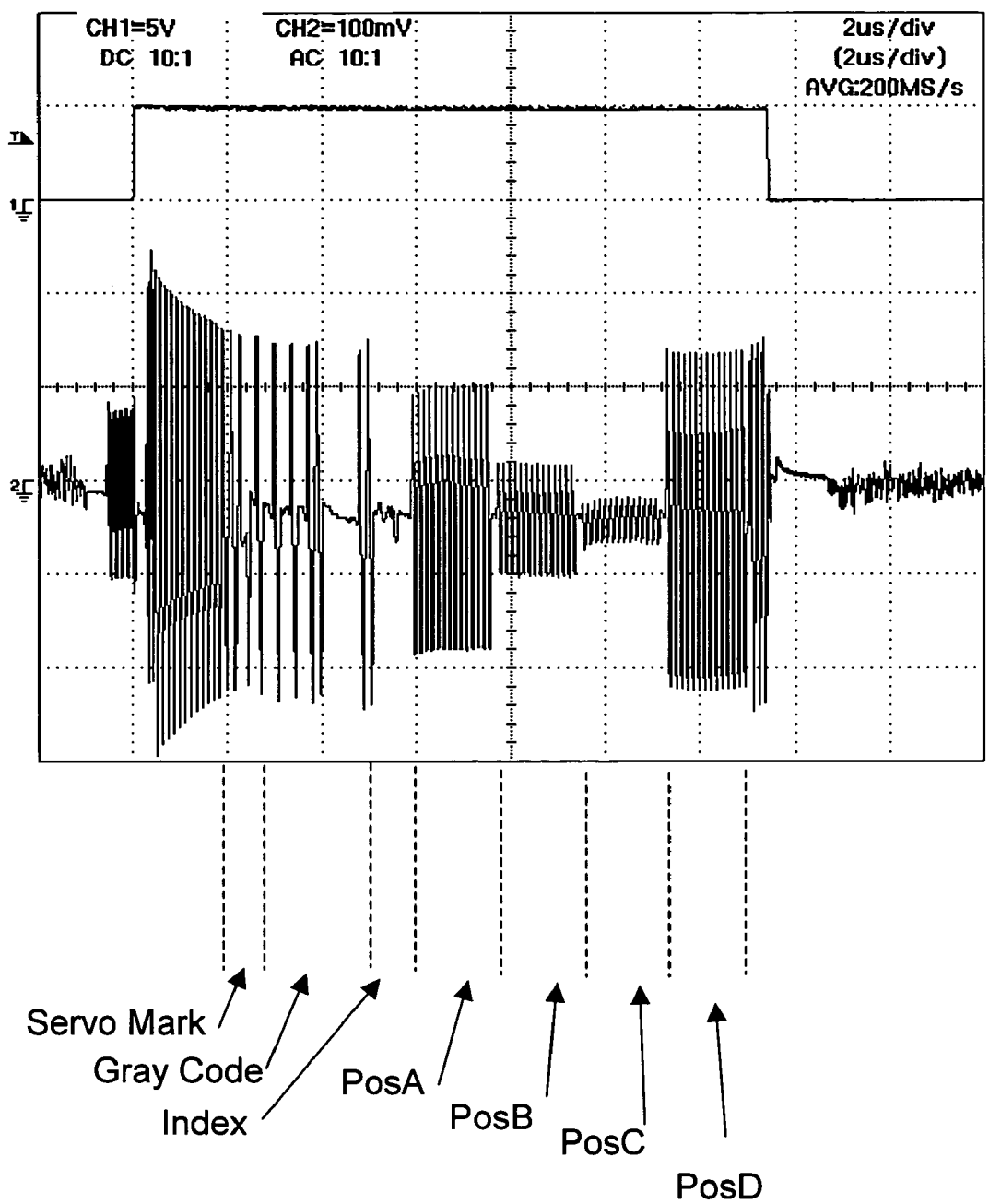
FIG. 4 is a waveform diagram when the position signals in FIG. 2 are read.
Figure 5:
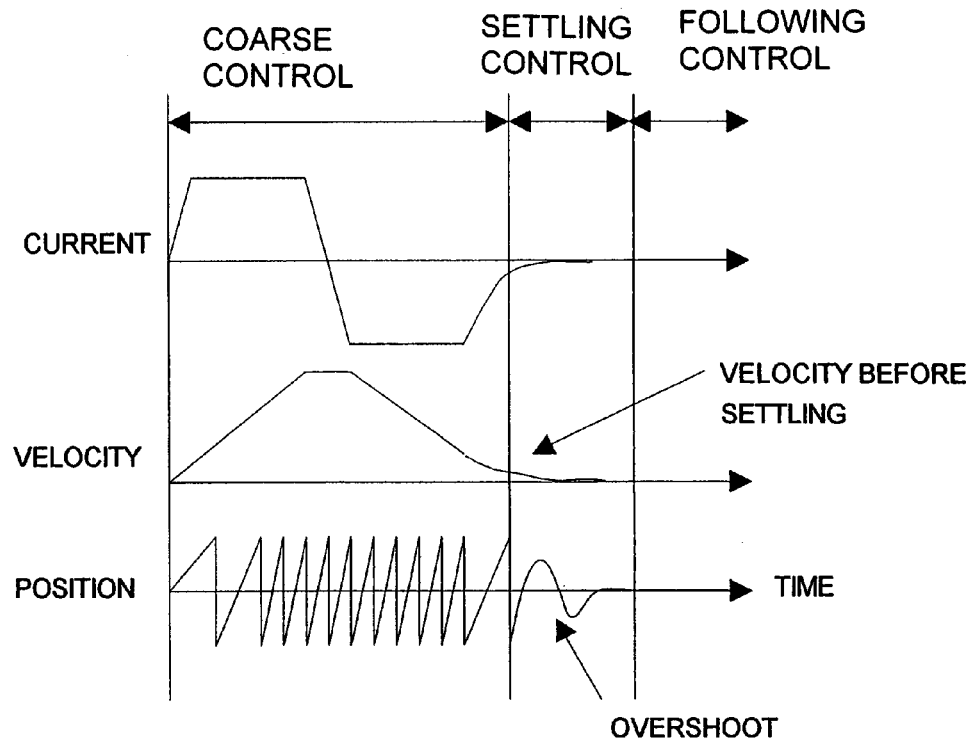
FIG. 5 is a diagram depicting the seek operation of the head in FIG. 1.

FIG. 1 is a block diagram depicting the disk storage device according to the present invention, FIG. 2 is a diagram depicting the arrangement of the position signals of the magnetic disk in FIG. 1, FIG. 3 is a diagram depicting the configuration of the position signals of the magnetic disk in FIG. 1 and FIG. 2, FIG. 4 is a waveform diagram when the position signals in FIG. 3 are read, and FIG. 5 is a diagram depicting the head position control in FIG. 1.

FIG. 1 shows a magnetic disk device as the disk storage device. As FIG. 1 shows, the magnetic disk 4, which is a magnetic storage medium, is installed at the rotation axis 2 of the spindle motor 5. The spindle motor 5 rotates the magnetic disk 4. The actuator (VCM) 1 has magnetic heads 3 at the tip, and moves the magnetic heads 3 in the radius direction of the magnetic disk 4.

The actuator 1 is comprised of a voice coil motor (VCM), which rotates around the rotation axis. In FIG. 1, two magnetic disks 4 are installed in the magnetic disk device, and the same actuator 1 simultaneously drives four magnetic heads 3.

The magnetic head 3 is comprised of a read element and a write element. In the magnetic head 3, the read elements including the magneto-resistance (MR) element are layered on the slider, and the write elements including the write coil are layered thereon.

The position detection circuit 7 converts the position signals (analog signals) read by the magnetic head 3 into digital signals. The read/write (R/W) circuit 10 controls the read and write of the magnetic head 3. The spindle motor (SPM) drive circuit 8 drives the spindle motor 5. The voice coil motor (VCM) drive circuit 6 supplies drive current to the voice coil motor (VCM) 1 and drives the VCH 1.

The microcontroller (MCU) 14 detects (demodulates) the current position from the digital position signals from the position detection circuit 7, and computes the VCM drive command value according to the error between the detected current position and the target position. In other words, the position demodulation and the servo control are performed. The read only memory (ROM) 13 stores the control programs of the MCU 14, for example. The random access memory (RAM) 12 stores the data for processing of the MCU 14, for example.

The hard disk controller (HDC) 11 judges the position on one rotation of the disk based on the sector number of the servo signal, and reads and writes data. The random access memory (RAM) for buffer 15 temporarily stores the read data and write data. The HDC 11 communicates with the host using such an interface IF as USB, ATA and SCSI. The bus 9 connects these composing elements.

As FIG. 2 shows, in the magnetic disk 4, servo signals (position signals) 16 are disposed on each track at equal spacing in the circumference direction, from the outer track to the inner track. Each track is comprised of a plurality of sectors, and the solid lines in FIG. 2 show the recording positions of the servo signals 16. As FIG. 3 shows, the position signal is comprised of a servo mark (ServoMark), track number (GrayCode), Index (Index) and offset information (servo burst) (PosA, PosB, PosC, PosD). The dotted lines in FIG. 3 show the track center.

FIG. 4 is a signal waveform diagram when the position signal in FIG. 3 is read by the head 3. The position of the magnetic head in the radius direction is detected using the track number (GrayCode) and the offset information (PosA, PosB, PosC, PosD) of the signal waveform shown in FIG. 4. Also based on the index signal (Index), the position of the magnetic head in the circumference direction is detected.

For example, the sector number, when the index signal is detected, is set to No. 0, and the sector number is incremented each time a servo signal is detected so as to acquire the sector number of each sector of the track. The sector number of the servo signal becomes a reference when the data is read and written. One index signal exists in each track. A sector number may be assigned instead of the index number.

FIG. 5 is an example of the seek control of the actuator performed by the MCU 14 in FIG. 1. Through the position detection circuit 7 in FIG. 1, the MCU 14 confirms the position of the actuator, performs servo computing, and supplies appropriate current to the VCM 1. FIG. 5 shows the transition of control from the start of seeking to move the head 3 from a track position to the target track position, the current of the actuator 1, the velocity of the actuator (head) 1, and the position of the actuator (head) 1.

In other words, in seek control, the head can be moved to the target position in the transition of coarse control, settlement control and following control. Coarse control is basically velocity control, and settlement control and following control are basically position control, and for both controls, the current position of the head must be detected.

To confirm such a position, servo signals, as shown in FIG. 2, are recorded on the magnetic disk in advance. In other words as FIG. 3 shows, a servo mark, to indicate the start position of the servo signal, gray code to indicate a track number, index signal, and the signals PosA-PosD to indicate offset, are recorded. These signals are read by the magnetic head, and the position detection circuit 7 converts these servo signals into digital values.

First Embodiment of Positioning Control System

Figure 6:
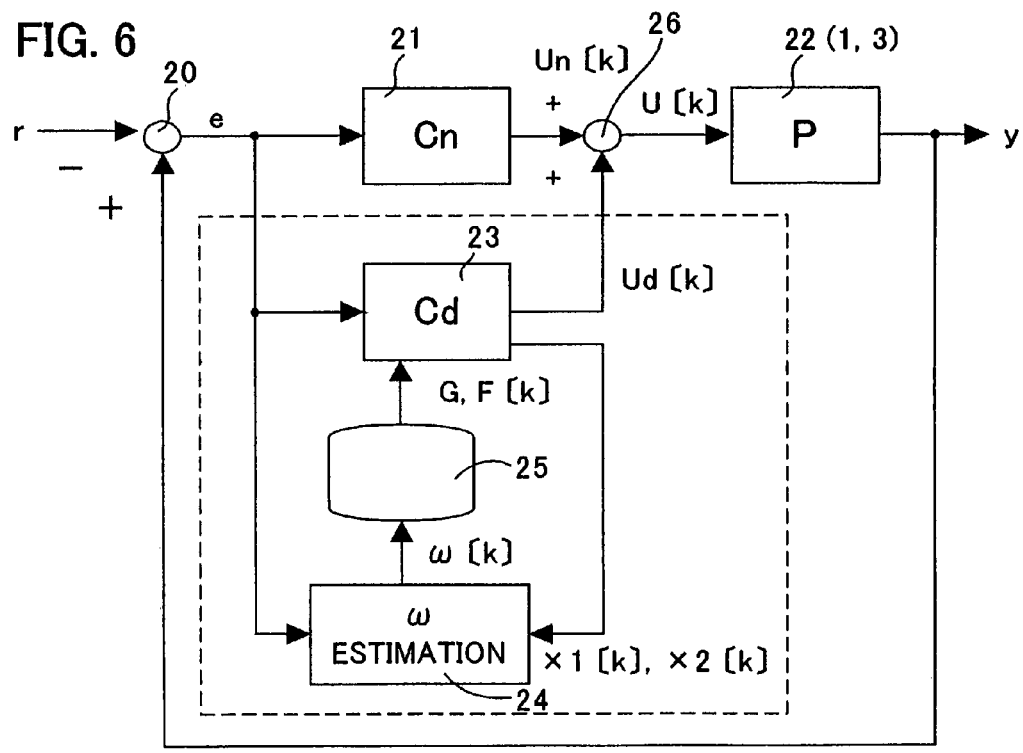
FIG. 6 is a block diagram depicting the positioning control system to which the disturbance suppression compensator in a first embodiment of the present invention is attached.
Figure 7:
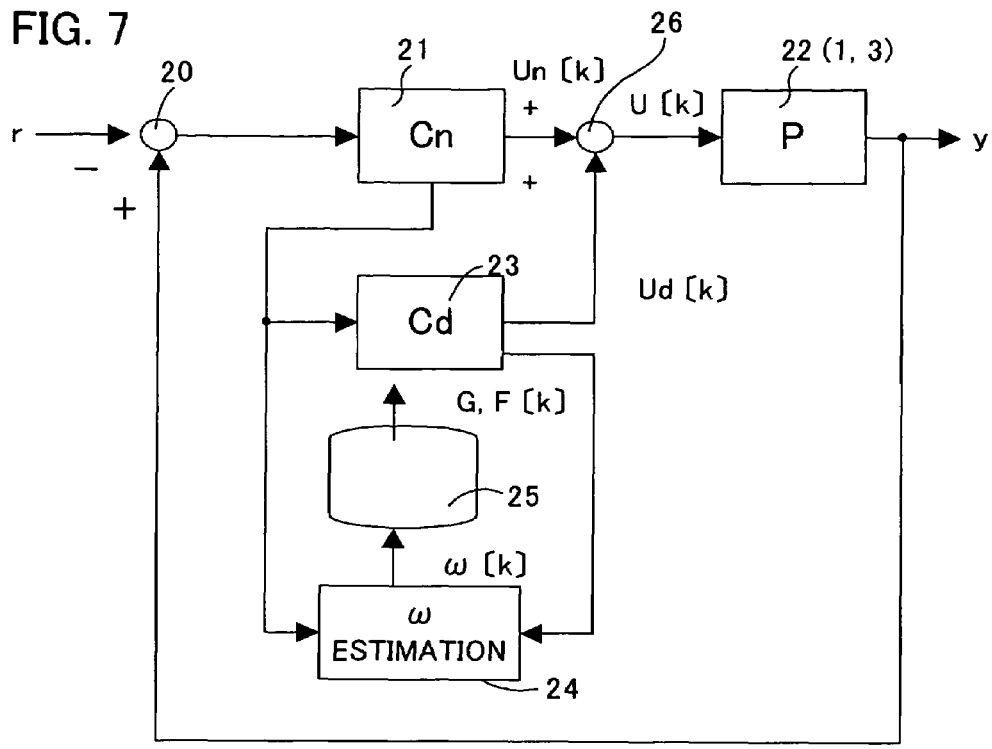
FIG. 7 is a block diagram depicting a modified embodiment where the controller in FIG. 7 is observer-controlled.
Figure 8:
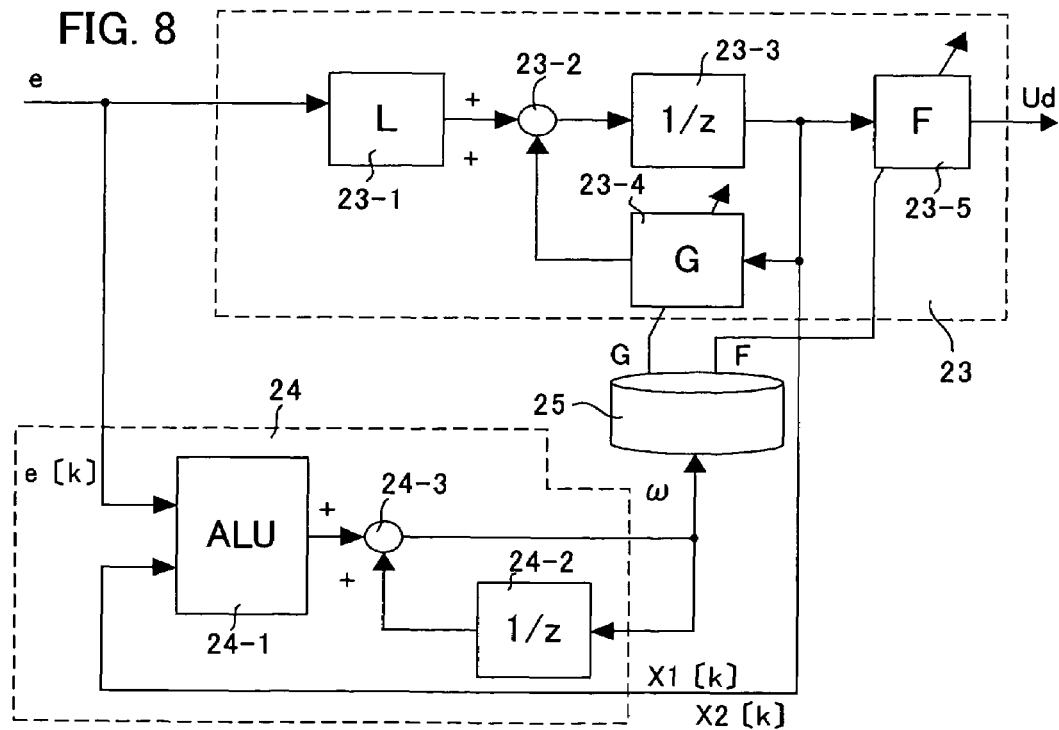
FIG. 8 is a detailed block diagram depicting the adaptive control block including the disturbance suppression compensator in the configuration in FIG. 6.
Figures 9, 10, 11:
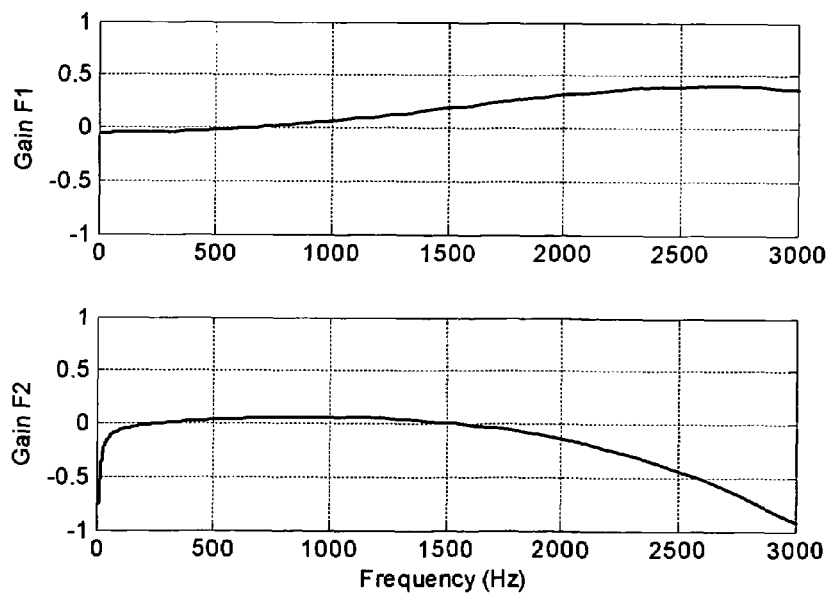
FIG. 9 shows a configuration of the table in FIG. 6, FIG. 7 and FIG. 8.
FIG. 10 shows another configuration of the table in FIG. 6, FIG. 7 and FIG. 8.
FIG. 11 is characteristic diagrams of the output gain in FIG. 9 and FIG. 10.

FIG. 6 is a block diagram depicting the first embodiment of the positioning control system (servo control system) of the present invention, FIG. 7 is a block diagram depicting a variant form of FIG. 6, FIG. 8 is a block diagram depicting the disturbance suppression compensator in FIG. 6 and FIG. 7, FIG. 9 shows the configuration of the table for disturbance suppression compensation in FIG. 6 to FIG. 8, FIG. 10 shows another configuration of the table for disturbance suppression compensation in FIG. 6 to FIG. 8, and FIG. 11 are graphs depicting the F values stored in the tables in FIG. 9 and FIG. 10.

FIG. 6 is a block diagram depicting the computing of the servo control system executed by the MCU 14. In other words, the computing block 20 computes the position error 'e' between the target position 'r' and the current position 'y', the control block (Cn) 21 performs control-computing, calculates the control amount Un, and drives the VCM 1 (the head 3), which are the plant 22. For the position of the plant 22, the servo signal from the magnetic head 3 is demodulated, the current position 'y' is calculated, and the result is fed back to the computing block 20.

The frequency estimation unit 24 estimates the angular frequency ω of the external vibration using the position error 'e' and the internal variable of the disturbance suppression compensator 23 (Cd). The compensation table 25 stores the constants of the compensator for external vibration suppression 23 (Cd) corresponding to each frequency ω. The disturbance suppression compensator 23 (Cd) corrects the internal constant by the constant read from the compensation table 25 based on the angular frequency XD of the frequency estimation unit 24, and calculates the disturbance suppression control amount Ud from the position error 'e'. The addition block 26 adds the control amount Un and the disturbance suppression control amount Ud and outputs it to the plant 22.

In this way, the internal constant of the compensator Cd is corrected according to the estimated value of the angular frequency (disturbance frequency) ω, so the operation of the compensator Cd can always be maintained at an optimum in a wide frequency range.

First the control block (controller) 21 will be described. In the design of the positioning control system of the magnetic disk device, the control target plant, that is the actuator, is often expressed by Expression (1).

$$y = \frac{Bl}{m} \frac{1}{s^2} u \quad (1)$$

In Expression (1), 'u' is the current to be supplied to the actuator, 'y' is the observed position, Bl is the force constant, 'm' is an equivalent mass and 's' is a Laplace operator. The magnetic disk device is generally a rotary actuator, but when designing a controller, it is converted into an equivalent linear actuator, as shown in Expression (1).

A typical control of the magnetic disk device is observer control. The transfer function of the actuator is expressed by the equation of state shown in Expression (2).

$$s \begin{pmatrix} x \\ v \end{pmatrix} = \begin{pmatrix} 0 & 1 \\ 0 & 0 \end{pmatrix} \begin{pmatrix} x \\ v \end{pmatrix} + \frac{Bl}{m} \begin{pmatrix} 0 \\ 1 \end{pmatrix} u \quad (2)$$

$$y = (1 \quad 0) \begin{pmatrix} x \\ v \end{pmatrix}$$

'x' and 'y' are positions, 'v' is velocity, and 'u' is the drive current. Z-transformation is performed on this analog model at sample period T, and the units are converted into the units for digital control of the magnetic disk device. Specifically, position is in track units, velocity is in track/sample units, and current is in units normalized such that the maximum current becomes 1. Then the equation of state of the actuator becomes Expression (3).

$$\begin{pmatrix} x[k+1] \\ v[k+1] \end{pmatrix} = \begin{pmatrix} 1 & 1 \\ 0 & 1 \end{pmatrix} \begin{pmatrix} x[k] \\ v[k] \end{pmatrix} + Ka \begin{pmatrix} 1/2 \\ 1 \end{pmatrix} u[k] \quad (3)$$

$$y[k] = (1 \quad 0) \begin{pmatrix} x[k] \\ v[k] \end{pmatrix}$$

Ka is the gain, including B1/m.

Using this expression, observer control is implemented. The observer control used for the digital control of the magnetic disk device has a configuration called the current observer in the following Expression (4).

$$\begin{pmatrix} \text{x\_hat}[k] \\ \text{v\_hat}[k] \end{pmatrix} = \begin{pmatrix} \text{x\_bar}[k] \\ \text{v\_bar}[k] \end{pmatrix} + \begin{pmatrix} L1 \\ L2 \end{pmatrix} (y[k] - \text{x\_bar}[k]) \quad (4)$$

$$u[k] = -Fx \cdot \text{x\_hat}[k] - Fv \cdot \text{v\_hat}[k]$$

$$\begin{pmatrix} \text{x\_bar}[k+1] \\ \text{v\_bar}[k+1] \end{pmatrix} = \begin{pmatrix} 1 & 1 \\ 0 & 1 \end{pmatrix} \begin{pmatrix} \text{x\_hat}[k] \\ \text{v\_hat}[k] \end{pmatrix} + Ka \begin{pmatrix} 1/2 \\ 1 \end{pmatrix} u[k]$$

As Expression (4) shows, the state variables x_hat [k] and v_hat [k] are corrected by the estimated position error of the observer, that is the difference between the observed position y [k] and the estimated position x_bar [k] calculated one sample before. Then the two state variables x_hat [k] and v_hat [k] are multiplied by the feedback gains Fx and Fv, and the current u [k] is output. After outputting the current, the state variable values of the next sample, x_bar [k+1] and v_bar [k+1] are estimated.

Using this Expression (4), the controller 21 (Cn) executes observer control.

The above-mentioned observer corresponds to the PD control in analog control. Integral compensation is also required in the magnetic disk device. A method for adding control equivalent to integrated compensation is bias compensation. A stationary bias 'b' given by the following Expression (5) is added to the analog plant model.

$$s \cdot b = 0 \quad (5)$$

Then the current observer is configured by using the expression (3) and dicretized expression (5), and the following Expression (6) is acquired.

$$\begin{pmatrix} \text{x\_hat}[k] \\ \text{v\_hat}[k] \\ \text{b\_hat}[k] \end{pmatrix} = \begin{pmatrix} \text{x\_bar}[k] \\ \text{v\_bar}[k] \\ \text{b\_bar}[k] \end{pmatrix} + \begin{pmatrix} L1 \\ L2 \\ L3 \end{pmatrix} (y[k] - \text{x\_bar}[k]) \quad (6)$$

$$u[k] = -Fx \cdot \text{x\_hat}[k] - Fv \cdot \text{v\_hat} - Fb \cdot \text{b\_hat}[k]$$

$$\begin{pmatrix} \text{x\_bar}[k+1] \\ \text{v\_bar}[k+1] \\ \text{b\_bar}[k+1] \end{pmatrix} = \begin{pmatrix} 1 & 1 & 1 \\ 0 & 1 & 2 \\ 0 & 0 & 1 \end{pmatrix} \begin{pmatrix} \text{x\_hat}[k] \\ \text{v\_hat}[k] \\ \text{b\_hat}[k] \end{pmatrix} + Ka \begin{pmatrix} 1/2 \\ 1 \\ 0 \end{pmatrix} u[k]$$

In the above description, a known observer controller was used as the controller, but as another control method, PID control, having the characteristics shown in the following Expression (7), may be used.

$$\left( \frac{Ki}{s} + Kp + Kd \cdot s \right) \quad (7)$$

In Expression (7), Ki is the integration gain, Kp is the proportion gain, Kd is the differential gain, and s is a Laplace operator.

This control is also possible with a controller where PI control and a LeadLag filter are connected in series. The transfer function is shown in the following Expression (8).

$$\left( \frac{Ki}{s} + Kp \right) \frac{s + a1}{s + b1} \quad (8)$$

In this Expression (8), Ki is the integration gain, Kp is the proportion gain, a1 and b1 are the characteristics of the Lead Lag filter, and s is a Laplace operator.

In recent magnetic disk devices, the actuator is controlled not by analog control but by digital control. The controller 21 described in Expressions (7) and (8) is based on analog control expressions, but these expressions are converted for use in digital control, and are installed in the device.

The configuration of the controller 21 is described by the configuration of PID control, PI control x Lead Lag filter and observer control. The present invention can be applied not only to the above-mentioned controller 21, but also to a linear controller 21. For example, a filter designed by H-infinity control theory may be used for the controller.

Also the actuator of the magnetic disk device has resonance characteristics, so the vibration of the actuator, due to resonance, influences the resonance position accuracy. Therefore in many cases, a plurality of notch filters based on the following Expression (9) is cascade-connected to suppress resonance. Actually Expression (9) is discretized and used.

$$\frac{s^2 + 2 \cdot \varsigma 2 \cdot \omega r \cdot s + \omega r^2}{s^2 + 2 \cdot \varsigma 1 \cdot \omega r \cdot s + \omega r^2} \quad (9)$$

Figure 44:
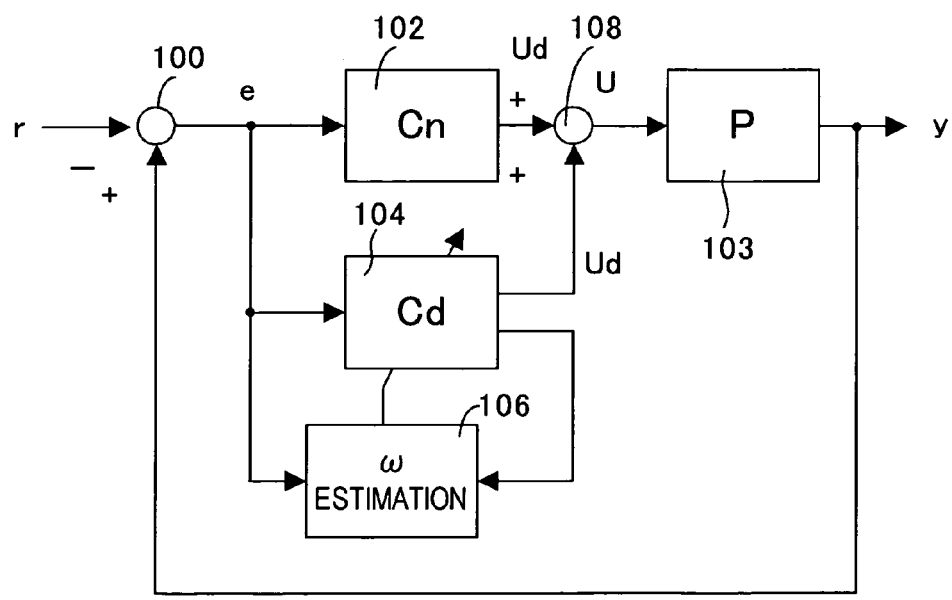
FIG. 44 is a block diagram depicting-the control system, including a conventional compensator for disturbance suppression.
Figure 45:
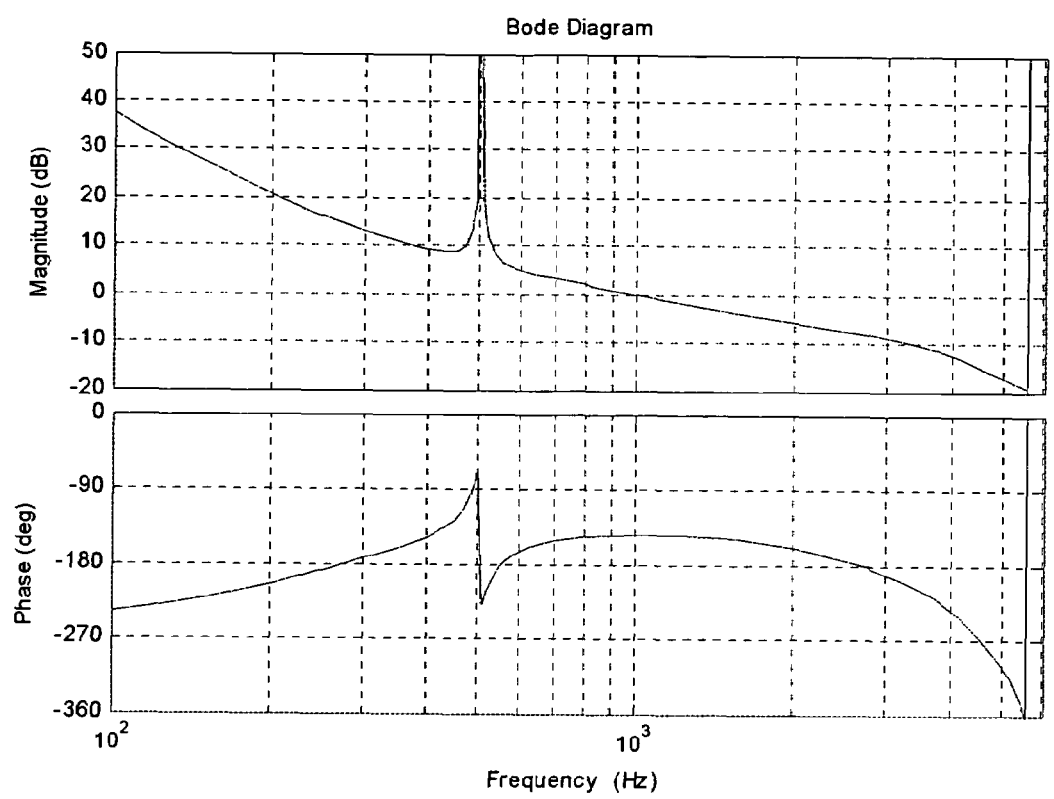
FIG. 45 is a closed loop characteristics diagram of a prior art in FIG. 44.

The compensator 23, table 25 and ω estimator 24 are described in FIG. 6. As FIG. 6 shows, a table 25 for storing the constants of the compensator Cd for external vibration suppression to be referred to by the estimation section 24 for estimating the angular frequency ω of external vibration, and means for correcting the internal constant of the compensator 23 (Cd), are provided to the conventional configuration in FIG. 44. The means indicated by the dotted line in FIG. 6 is implemented as the digital control.

Now the configuration of the compensator 23 (Cd) of digital control will be described. When the disturbance frequency is known, the compensator 23 of digital control, which follows up cyclic disturbance, is designed by the equation of state in Expression (10).

$$\begin{pmatrix} x1[k+1] \\ x2[k+1] \end{pmatrix} = G \begin{pmatrix} x1[k] \\ x2[k] \end{pmatrix} + L \cdot e[k], \quad (10)$$

$$Udist[k] = F \cdot \begin{pmatrix} x1[k] \\ x2[k] \end{pmatrix},$$

$$G = \begin{pmatrix} \cos(\omega T) & -\sin(\omega T) \\ \sin(\omega T) & \cos(\omega T) \end{pmatrix},$$

where, $$L = \begin{pmatrix} 0 \\ 1 \end{pmatrix},$$

$$F = -(F1 \quad F2)$$

or, $$L = \begin{pmatrix} 1 \\ 0 \end{pmatrix},$$

$$F = -(F3 \quad F4)$$

In Expression (10), (x1, x2) is the state variable of the rotation vector of disturbance, 'e' is the position error, 'L' is the input gain, Udist is the disturbance suppression output current Ud, F is the output gain, ω is the angular frequency of a known disturbance, and T is the sample period of the control system. For example, the output gain F is designed to be the optimum at the center of frequency of the fluctuation range of the disturbance frequency to be assumed, and once designed, this constant F is the constant. For example, if the original characteristic of the controller, before attaching the compensator for disturbance suppression, is C and the characteristic of the plant is P, then the transfer function of the following Expression (11) is used.

$$P/(1+CP) \quad (11)$$

The output gain F is adjusted considering the phase characteristic with respect to the angular frequency ω in the transfer function of this Expression (11) and the convergence response time with respect to a known disturbance.

In Expression (10), an element of the input gain L is "0" or "1", but another fixed value may be used. The constant design of the gain F is decided using simulation. However a calculation delay, the resonance of the actuator, the insertion of various filters represented by a notch filter for suppressing the resonance, and the frequency characteristics of the amplifier for driving VCM, for example, have actual influence. Therefore the final value of F is checked and adjusted while actually operating the device.

In the description here, a position error is used as the input. The estimated position error of the observer described in FIG. 7 may be used. In this case, the transfer function to be used for designing the gain F must be changed. For example, the transfer function from the current disturbance to the estimated position error of the observer is used.

In Expression (10), the angular frequency ω of the disturbance is a fixed value. In this invention, the angular frequency ω of the disturbance is sequentially corrected to adapt to an unknown disturbance frequency. The adaptive rule for this will now be described. The adaptive rule is derived by transforming the equation of state of the compensator 23 of the cyclic disturbance of the discrete system in Expression (10), and the continuous system of Expression (12) is used.

$$s\begin{pmatrix} x1 \\ x2 \end{pmatrix} = \begin{pmatrix} 0 & -\omega \\ \omega & 0 \end{pmatrix}\begin{pmatrix} x1 \\ x2 \end{pmatrix} + \begin{pmatrix} L1 \\ L2 \end{pmatrix} e \quad (12)$$

In Expression (12), x1 is the sine component of disturbance, x2 is the cosine component of disturbance, L1 and L2 are the input gain, 'e' is the position error, and s is a Laplace operator.

For the angular frequency $\omega$ of the rotation vector, the rotation vector is the tangent of the sine component x1 and the cosine component x2, and the angular frequency $\omega$ is a differential value thereof, so the angular frequency $\omega$ of this rotation vector is given by the following Expression (13).

$$\omega = \frac{d\theta}{dt} \quad (13)$$
$$= \frac{d}{dt}\tan^{-1}\left(\frac{x2}{x1}\right)$$
$$= \frac{x1\frac{dx2}{dt} - \frac{dx1}{dt}x2}{x1^2 + x2^2}$$

The equation of state of the analog compensator in Expression (12) is expanded, and the differential value of x1 and x2 is determined, and the differential value of x1 and x2 is substituted in Expression (13), then the following Expression (14) is acquired.

$$\omega = \frac{x1(\omega \cdot x1 + L2 \cdot e) - (-\omega \cdot x2 + L1 \cdot e)x2}{x1^2 + x2^2} \quad (14)$$
$$= \omega + \frac{L2 \cdot x1 - L1 \cdot x2}{x1^2 + x2^2} e$$

If the angular frequency of the estimated unknown disturbance is correct, the compensator 23 (Cd) can appropriately suppress the disturbance. As a result, the position error 'e' or the estimated position error of the observer becomes zero. In other words, in Expression (14), the conditions when the target angular frequency $\omega$ of the compensator 23 (Cd) and the angular frequency $\omega$ of the estimated disturbance are such that the term of the position error 'e' in the right side number in Expression (13) is zero. In other words, Expression (15) is established.

$$\frac{L2 \cdot x1 - L1 \cdot x2}{x1^2 + x2^2} e = 0 \quad (15)$$

In other words, the angular frequency $\omega$ is sequentially corrected so as to satisfy Expression (15). For this, Expression (15) is expressed by the time differential form and the adaptive rule (integral compensation rule) of the following Expression (16).

$$\frac{d}{dt}\omega = Ka \cdot \frac{L2 \cdot x1 - L1 \cdot x2}{x1^2 + x2^2} e \quad (16)$$

Using this expression, the value of $\omega$ is sequentially corrected. Expression (16) is corrected to an integral form, and is expressed by a digital control expression, then the following Expression (17) is acquired.

$$\omega[k] = \omega[k-1] + Ka \cdot \frac{L2 \cdot x1[k] - L1 \cdot x2[k]}{x1[k]^2 + x2[k]^2} e[k] \quad (17)$$

Ka is the adaptive gain. In Expression (17), the adaptive rule is used in the addition format. This can be expressed in multiplication format, as shown in the following Expression (18).

$$\omega[k] = \omega[k-1]\left(1 + Ka2 \cdot \frac{L2 \cdot x1[k] - L1 \cdot x2[k]}{x1[k]^2 + x2[k]^2} e[k]\right) \quad (18)$$

In Expression (18), the adaptive gain Ka2 is a gain that is a different value from the above-mentioned adaptive gain Ka.

In the following description, the adaptive rule in the addition format shown in Expression (17) will be used, but the adaptive rule in the multiplication format shown in Expression (18) can also be used just the same.

First the target frequency of the compensator, with respect to the cyclic disturbance, is corrected using the adaptive rule, then the angular frequency changes along with time k. Therefore the compensator that follows up the cyclic disturbance, with respect to a known disturbance frequency shown in Expression (10), is configured such that the parameters are updated according to the changes of the angular frequency. In other words, the input gain L for adjusting the phase and the magnitude of the input, the matrix G for rotating the vector, and the output gain (matrix) F for adjusting the phase and the magnitude of the output are also updated according to the sequential correction. By this, the accuracy of the sequential correction improves. In other words, the adaptive controller of Expression (19) is designed by matching Expression (10) with the adaptive rule.

$$\begin{pmatrix} x1[k+1] \\ x2[k+1] \end{pmatrix} = G\begin{pmatrix} x1[k] \\ x2[k] \end{pmatrix} + L \cdot e[k], \quad (19)$$

$$Udist[k] = F \cdot \begin{pmatrix} x1[k] \\ x2[k] \end{pmatrix},$$

$$G = \begin{pmatrix} \cos(\omega[k]T) & -\sin(\omega[k]) \\ \sin(\omega[k]T) & \cos(\omega[k]T) \end{pmatrix}$$

L, F [k] and $\omega$ [k] however are given by Expression (20) or Expression (21) according to the matrix L.

$$L = \begin{pmatrix} 0 \\ 1 \end{pmatrix}, F[k] = -Mag(\omega[k])(\cos(Phs(\omega[k])) \sin(Phs(\omega[k]))), \quad (20)$$
$$\omega[k] = \omega[k-1] + Ka \cdot x1[k] \cdot e[k]/(x1[k]^2 + x2[k]^2)$$

-continued $$L = \begin{pmatrix} 0 \\ 1 \end{pmatrix}, F[k] = -Mag(\omega[k])(-\sin(Phs(\omega[k]))\cos(Phs(\omega[k]))), \quad (21)$$

$$\omega[k] = \omega[k-1] - Ka \cdot x2[k] \cdot e[k]/(x1[k]^2 + x2[k]^2)$$

The matrix L is constant in Expression (19) to Expression (21), and as the adaptive rule ω [k] is updated, the matrixes G and F are changed to G[k] and F[k]. In other words, the angular frequency changes as time elapses, so the cosine (ω[k]T) and the sine (ω[k]T) of G and the value of the matrix F are also updated accordingly. Here Mag and Phs are the gain (magnitude) and the phase with respect to the angular frequency ω in the transfer function (shown in Expression (10)) from the current disturbance to the position error. And by changing to the gain Mag (ω[k]) and the phase Phs (ω[k]) according to ω [k], the phase and the gain of the output are adjusted by the output gain F [k].

For the input gain L, L1 and L2 are set to sine and cosine respectively as shown in Expression (20) and Expression (21), and in the adaptive control Expressions (20) and (21), one of the two variables of L is set to "1" and the other to "0". Either one of the input side L and the output side F is sufficient to adjust the gain and the phase, and the above-mentioned adaptive control must not only suppress disturbance but also estimate the angular frequency ω of the disturbance.

The internal state variables x1 and x2 are used for estimation. To simplify the estimation formula of ω, one of L1 and L2 is set to "1" and the other is set to "0", and are substituted in Expression (17), then the adaptive rule is transformed to the adaptive rule (ω[k]) of Expression (20) if L1=0 and L2=1, and is transformed to the adaptive rule (ω[k]) of Expression (21) if L1=1 and L2=0. By this, the operation time can be decreased.

For certain both values of the two variables in each matrix L and matrix F may be changed according to ω[k]. For example, L=(L1(ω[k]) and L2(ω[k]) can be set. The output side gain F may be fixed and the input side gain L may be changed according to ω[k]. However it takes time to compute ω[k] compared with Expression (20) and (21).

x1 and x2 are shifted 90 degrees, so by setting the matrix L, the matrix of sine and the matrix of the cosine of the terms of the phase of F[k] become opposite thereof as shown in Expression (20) and Expression (21).

Returning to FIG. 6, the ω estimation section 24 calculates ω[k] of Expression (20) or Expression (21) for each sample. The table 25 stores the values of G and F[k] corresponding to ω[k]. The ω estimation section 24 determines the values G and F[k] for each sample according to the estimated value of ω[k] by referring to the table 25, and sets the values in the compensator 23 for disturbance suppression. The compensator 23 computes Expression (19), calculates x1[k+1], x2[k+1] and the disturbance suppression current value Udist[k] (Ud[k]), and outputs them.

The adder 26 adds the control current value Un[k] of the controller 21 and the external disturbance suppression current value Ud[k], outputs the result to the plant 22 (VCM1), and drives it.

FIG. 7 is a configuration when the estimated position error e[k] of the observer 21 is provided to the input of the adaptive controls for disturbance suppression 23 and 24 using the observer control for the controller 21 in FIG. 6. The estimated position error e[k] of the observer is a difference between the position error (r−y) of the adder 20 and the estimated position of the observer.

This will be described in more detail with reference to FIG. 8, FIG. 9 and FIG. 10. FIG. 8 is a block diagram of Expression (19) to Expression (21). 1/z in FIG. 8 indicates the delay by one sample T. z is an operator z of the z transformation used for digital control. As FIG. 8 shows, the ω estimation section 24 comprises a computing section 24-1 for computing the second term (Ka·x1[k] . . . ) of the ω adaptive formula Expression (20), the delay block 24-2 for delaying the estimated ω[k] by one sample, and the addition block 24-3 for adding the delayed ω(ω)[k−1]) and the computing result of the second term of the computing block 24-1. This is the same for the adaptive formula in Expression (21).

Table 25, on the other hand, stores the values G and F according to the value of each estimated ω, as shown in FIG. 9. In other words, sin(1·ωr·T)−sin(n·ωr·T) and cos(1·ωr·T)−cos(n·ωr·T) of ω[k]=1·ωr−n·ωr are stored as the matrix G in Expression (19). The values of sin(1·ωr·T)−sin(n·ωr·T) start with "0", reach "1" and return to "0". The values of cos(1·ωr·T)−cos(n·ωr·T) start with "1", reach "0" and return to "1".

Also as the output gain F, F1 (1·ωr)−F1(n·ωr) and F2(1·ωr)−F2(n·ωr) of ω[k]=1·ωr−n ωr are stored. In Expression (20), F1 is=−Mag (ω[k])·cos(Phs (ω[k]), and F2 is=−Mag (ω[k])·sin(Phs(ω[k]). This is the same for the case of Expression (21).

The compensator 23 computes x1[k+1], x2[k+1] and Udist [k] in Expression (18). In other words, the compensator 23 comprises the multiplication block 23-1 for multiplying the position error e[k] by "L", the multiplication block 23-4 for multiplying x1[k] and x2[k] by G[k] from the table 25, the addition block 23-2 for adding the outputs of both multiplication blocks 23-1 and 23-4 and outputting x1[k+1] and x2[k+1], the delay block 23-3 for delaying the output of the addition block 23-2 by one sample and outputting x1[k] and x2[k], and the multiplication block 23-5 for multiplying the output x1[k] and x2[k] of the delay block 23-3 by the output gains F1[k] and F2[k] from the table 25.

In FIG. 9, only the values for the integral multiple of the rotation angular frequencies are stored. FIG. 10 shows the configuration of another table of FIG. 8. FIG. 10 shows an example when the value of SIN is deleted in FIG. 9. To use this table, the value of SIN is decided from the value of COS by calculation. In other words, sine is calculated from cosine in table 25-1 by the following Expression (22).

$$SIN = (1-COS^2)^{1/2} \quad (22)$$

It must be remembered that in Expression (22) that the SIN component, and not the COS component, is deleted. In this case, values up to the Nyquist frequency must be represented. In other words, as FIG. 9 shows, the values of COS change from "1" to "−1", but the values of SIN in this range are "0" to "1", and two angular frequencies, which take a same SIN value, exist. If the COS components are deleted from the table 25-1 and the SIN components remain, the negative/positive of COS must be judged, and for this the value of ω must be checked. Such judgment processing requires extra time.

Therefore to decrease the table size, it is preferable to have the COS values remain. In the case when such a consideration is unnecessary, the COS components may be deleted and the SIN components remain.

FIG. 11 shows examples of the frequency change of the output gain F=[F1, F2] in FIG. 9 and FIG. 10. In other words, the abscissa is the frequency (angular frequency) and the ordinate is the gain F1 and F2 in each frequency. In FIG. 11, the graphs have been normalized such that the greater of the maximum value of the absolute value of F1 and the maximum value of the absolute value of F2 becomes "1". Characteristics in FIG. 11 are based on simulation design, and the calculation delay, the resonance of the actuator, the insertion of various filters represented by a notch filter for suppressing the resonance, and the frequency characteristics of the amplifier for driving VCR, for example, have actual influence. Therefore the final values are checked and adjusted while actually operating the device.

As FIG. 11 shows, the gains of F1 and F2 are different values, and the signs thereof are also different according to the frequency. According to this, F1 and F2 of each angular frequency are set in the tables 25 and 25-1. This example shows the values for the compensator 23 of which the input is the positional error shown in FIG. 6.

Figure 12:
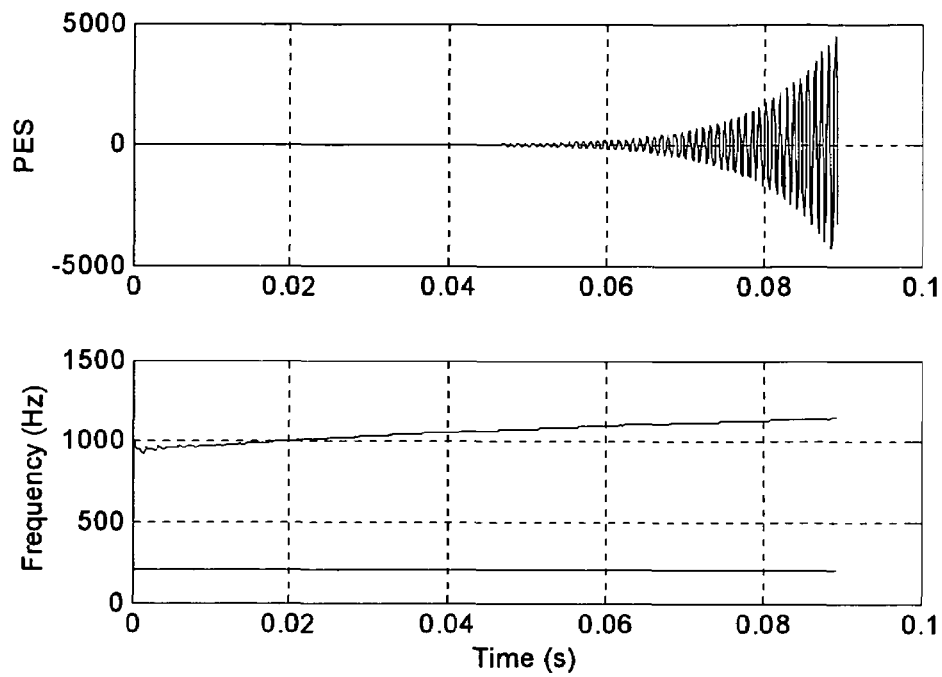
FIG. 12 is graphs of the simulation result when a conventional compensator, of which internal constant fixed, is used.
Figure 13:
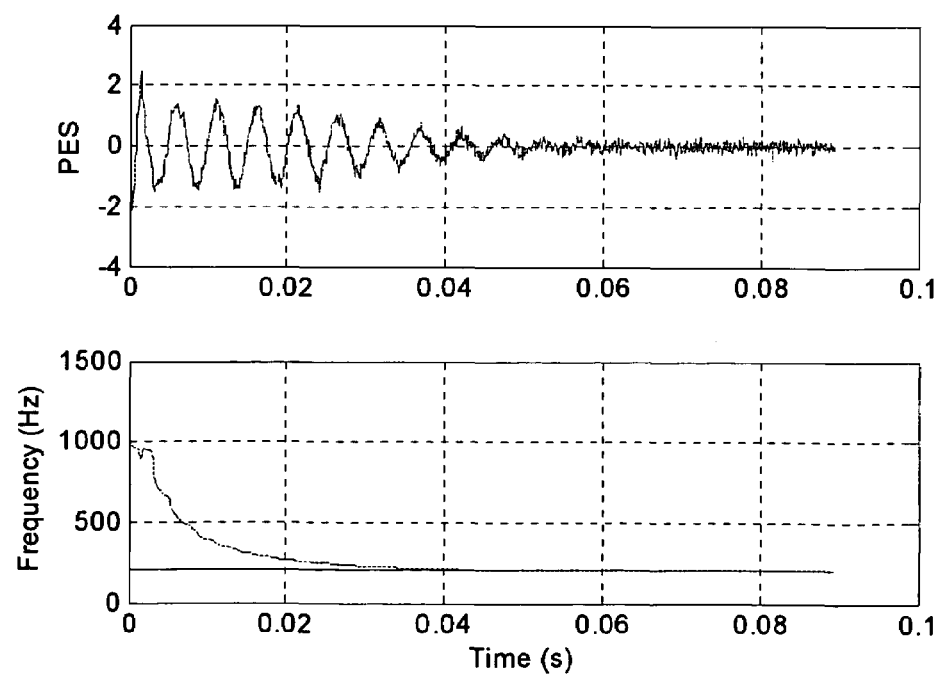
FIG. 13 is graphs of the simulation result when a compensator of the present invention, of which internal constant is updated, is used.

FIG. 12 shows graphs of the estimated disturbance values and the corrected response values when the conventional output gain F=[F1, F2] is optimized to 1000 Hz and fixed, and FIG. 13 shows graphs of the estimated disturbance values and the correction response values when the output gain F=[F1, F2] of the present invention is optimized for each frequency, and the frequency values are changed according to the estimated disturbance frequency.

In FIG. 12 and FIG. 13, the top graph shows that the abscissa is the time (sec.) and the ordinate is the position error PES (number of tracks), and the bottom graph shows that the abscissa is the time (sec.) and the ordinate is the estimated frequency (Hz). Both FIG. 12 and FIG. 13 show the case when the frequency of the compensator 23 and the disturbance frequency are set to different unknown disturbance frequencies, and are the result of simulation using the system in FIG. 44 and FIG. 6, where the disturbance frequency is 200 Hz and the initial frequency of the compensator 23 is 1000 Hz.

As the prior art in FIG. 12 shows, if the disturbance frequency (200 Hz) is unknown for the compensator 23, the disturbance cannot be corrected and the position error PES does not converge, and that rather the position error diverges by disturbance suppression control, as the top graph in FIG. 12 shows. The estimated frequency is also different from 200 Hz, which is shown as a solid line in the bottom graph in FIG. 12, and is around the initial value 1000 Hz, which does not converge.

In the simulation result when the present invention is applied, as shown in FIG. 13, on the other hand, if the disturbance frequency (200 Hz) is unknown for the compensator 23, the disturbance can be accurately corrected and the position error PES converges as shown in the top graph in FIG. 13. The estimated frequency as well converges to 200 Hz, which is indicated by the solid line in the bottom graph in FIG. 13. In FIG. 13, the position error range is "4"-"-4", while in the case of prior art in FIG. 12, the position error range is "5000"-"-5000".

Therefore by applying the present invention, disturbance can be accurately and quickly suppressed, even if an unknown disturbance frequency is provided. For example, as the simulation result in FIG. 13 shows, the position error converges at 0.04-0.06 sec. even if a disturbance is applied. If the disk rotation is 4200 rpm, one rotation takes 0.014 millisecond, so a single disturbance can be suppressed in 2-4 rotations of the disk.

Second Embodiment of Positioning Control System

Figure 14:
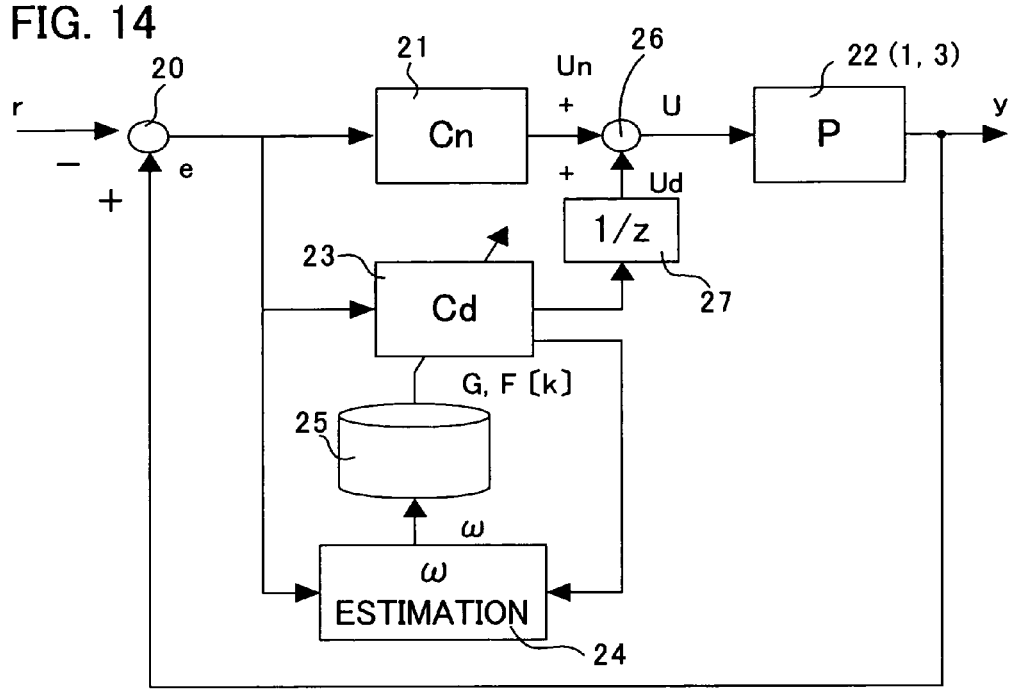
FIG. 14 is a block diagram depicting the positioning control system to which the disturbance suppression compensator of a second embodiment of the present invention is attached.
Figure 15:
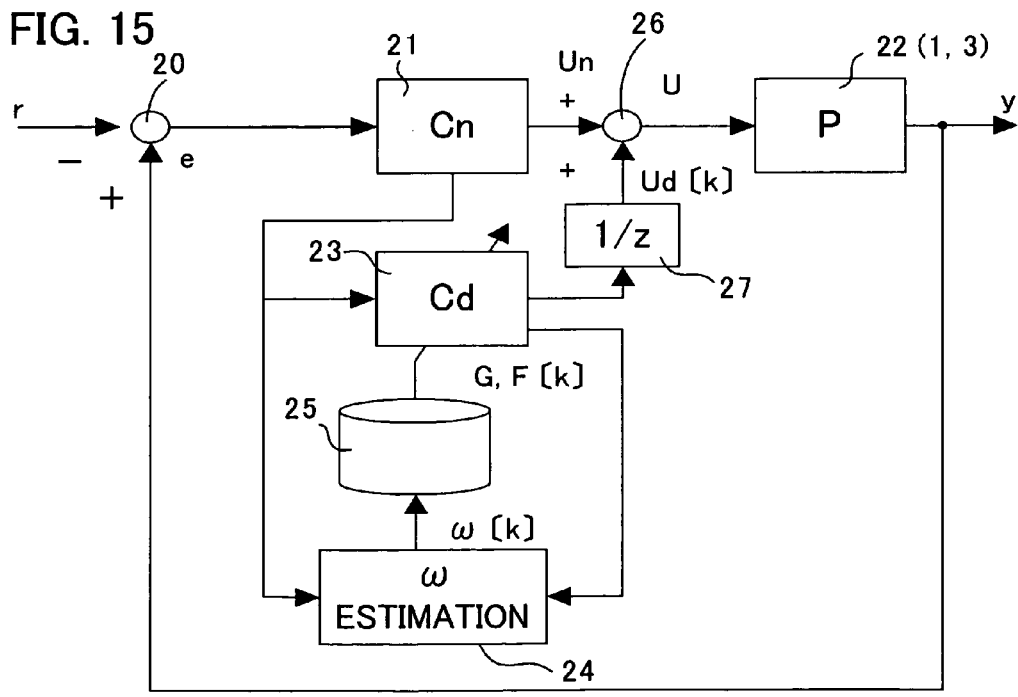
FIG. 15 is a block diagram depicting a modified embodiment where the controller in FIG. 14 is observer-controlled.
Figure 16:
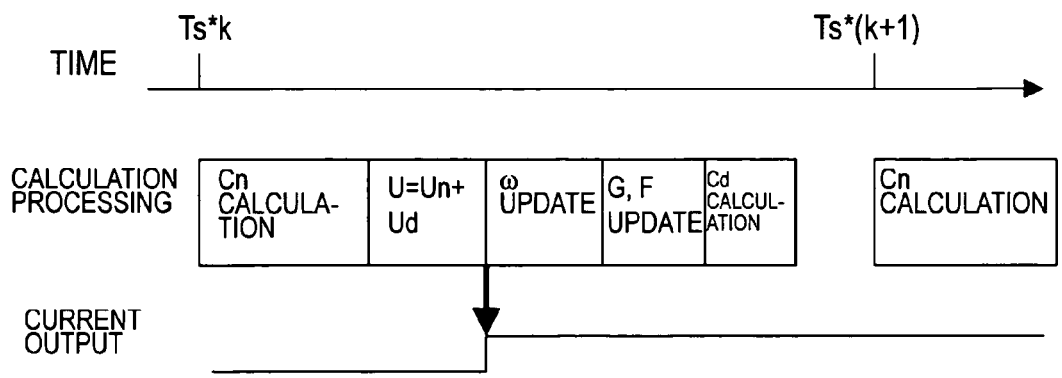
FIG. 16 is a sequence diagram depicting processing when the calculation for disturbance suppression in FIG. 14
Figure 17:
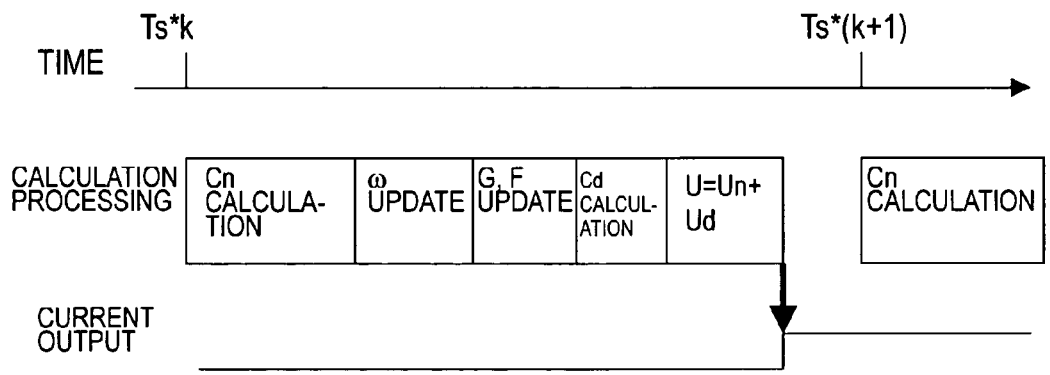
FIG. 17 is a sequence diagram depicting processing when the calculation for disturbance suppression in FIG. 6
Figure 18:
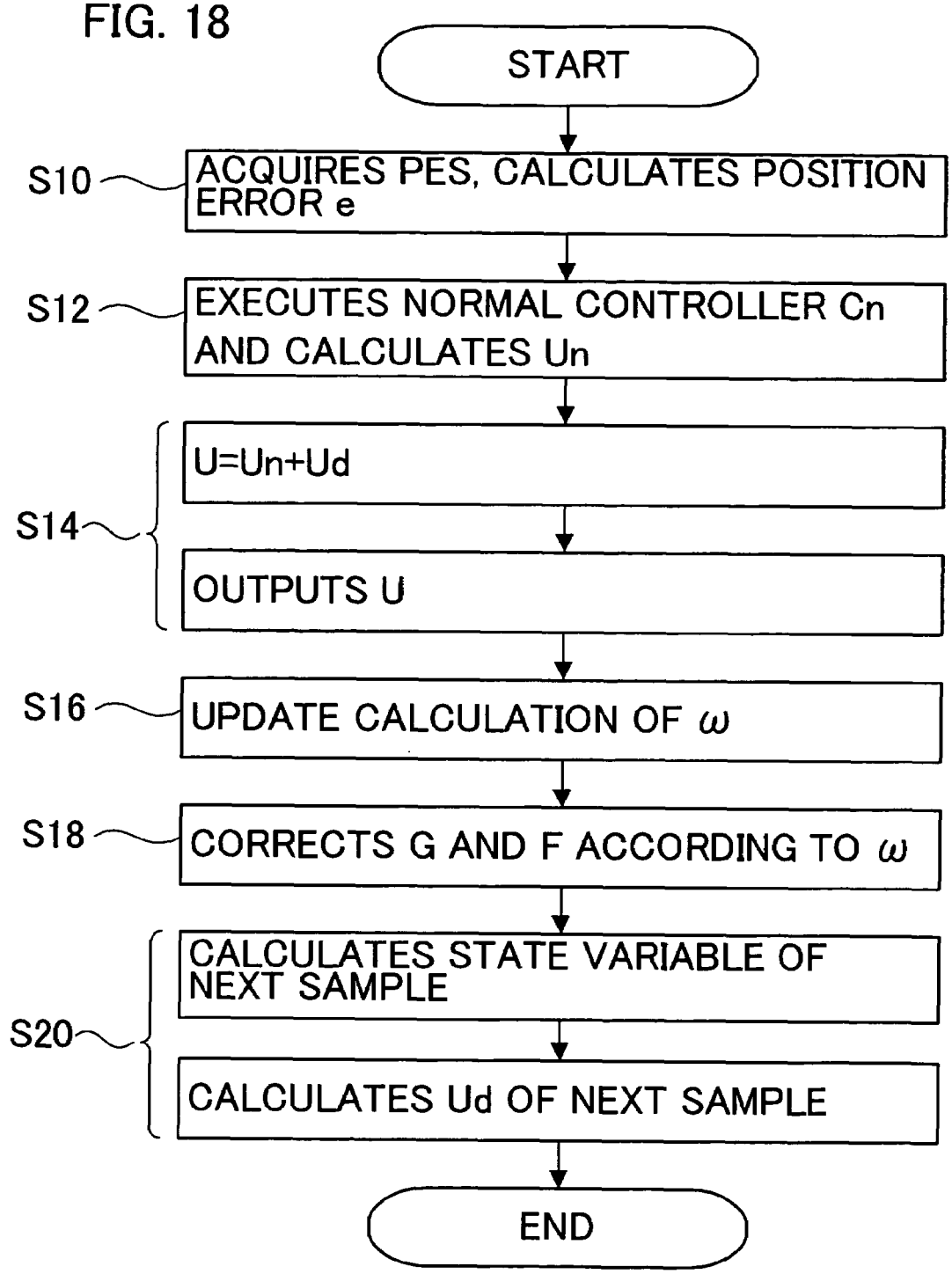
FIG. 18 is a flow chart depicting the adaptive control processing in FIG. 14 and FIG. 15.

FIG. 14 is a block diagram depicting the second embodiment of the positioning control system (servo control system) of the present embodiment, FIG. 15 shows block diagrams depicting the variant form of FIG. 14, FIG. 16 and FIG. 17 are diagrams depicting the calculation processing of the control system in FIG. 14 and FIG. 15, and FIG. 18 is a flow chart depicting the calculation processing of the servo control system in FIG. 14 and FIG. 15.

FIG. 14 is a block diagram depicting the computing of the servo control system executed by the MCU 14 in FIG. 1. In FIG. 14, composing elements the same as those in FIG. 6 are denoted with the same reference symbols. In other words, the position error 'e' between the target position 'r' and the current position 'y' is computed by the computing block 20, the control block (Cn) 21 performs control computation, calculates the control amount Un, and drives VCM 1 (and the head 3) which are the plant 22. For the position of the plant, the servo signal from the magnetic head 3 is demodulated and the current position 'y' is calculated, which is fed back to the computing block 20.

The frequency estimation unit 24 estimates the angular frequency ω of the external vibration using the position error 'e' and the internal variable of the disturbance suppression compensator 23 (Cd). The compensation table 25 stores the constants of the compensator 23 (Cd) for the extended vibration suppression corresponding to each frequency ω. The disturbance suppression comparator 23 (Cd) corrects the internal constant by the constant read from the compensation table 25 using the angular frequency ω of the frequency estimation unit 24, and calculates the disturbance suppression control amount Ud from the position error 'e'. The addition block 26 adds the control amount Un and the disturbance suppression control amount Ud, and outputs it to the plant 22. The delay unit 27 delays the output Ud of the compensator 23 by one sample and outputs it to the addition block 26.

If one sample is delayed, a shift in the phase characteristics (phase lag) is generated. Therefore the set value of the output gain F is different from the values in FIG. 6 and FIG. 8 to FIG. 10. For example, a phase lag is generated with the characteristic in FIG. 8, so the characteristic in FIG. 8 is advanced for the amount of this phase lag.

The disturbance suppression output is intentionally delayed by one sample, as shown in FIG. 14, because of a decrease in the calculation processing time. This will be described with reference to FIG. 16 and FIG. 17. In order to improve the response characteristics of the control system, it is critical to decrease the calculation processing time, that is to decrease the time from the acquisition of the observed position to the output of the drive current U.

Expressions (17) to (21) for adaptive control of the present invention, on the other hand, require extra calculation processing time compared to prior art. In other words, as FIG. 17 shows, if the MCU 14 executes calculation of the system in FIG. 6, the output Un[k] of the controller (Cn) 21 is calculated first using Expression (6) for every k sample. Then the adaptive rule of the frequency estimation unit 24 is calculated by Expression (17) or Expression (18) to update the estimated angular frequency ω.

Then the table 25 is referred to by this estimated angular frequency ω, and G and F of the compensator 23 are updated. And the output Ud (Udist) of the compensator (Cd) 23 is calculated by Expression (19). Finally the output U[k] of the plant 22 is calculated by Un[k]+Ud[k]. This calculated value is output to the plant 22, and changes the output current. In other words, time from the acquisition of the observed position y to the output of the drive current U becomes long and the response of the control system drops (in particular a phase lag is generated). This delay is certainly not guaranteed if a high-speed MCU 14 is installed. However to provide a low cost disk device, installing a high-speed MCU 14 is not the best solution.

Therefore the value $\omega[k]$ of the current sample is not used for the current for disturbance suppression, but a value $\omega[k-1]$, which estimated one sample before, is used, and the correction current Ud is calculated. In other words, as FIG. 16 shows, the MCU 14 first calculates the output Un[k] of the controller (Cn) 21 using Expression (6) at every k samples. Then using the Ud[k-1] calculated for the previous sample (Ud one sample delayed in the delay block 27 based on the value $\omega[k-1]$ estimated one sample before), the output U[k] of the plant 22 is calculated by Un[k]+Ud[k-1]. This calculated value is output to the plant 22, which changes the output current.

Then the adaptive rule of the frequency estimation unit 24 is calculated based on Expression (17) or Expression (18), and the estimated angular frequency $\omega[k]$ is updated. Then the table 25 is referred to by this estimated angular frequency $\omega[k]$, and G and F of the compensator 23 are updated. And by Expression (19), the output Ud (Udist) [k] of the compensator (Cd) 23 is calculated by Expression (19). In this way, the time from the acquisition of the observed position 'y' to the output of the drive current U decreases, and the response of the control system improves (phase lag is prevented).

Also the estimated values $\omega[k-1]$ and Ud [k-1] with the previous sample may be used, as mentioned above, since the response of the control system (phase accuracy) becomes quicker, which improves disturbance frequency estimation speed.

FIG. 15 is a block diagram depicting a variant form of FIG. 14. Composing elements the same as those in FIG. 14 are denoted with the same reference symbols. In the configuration in FIG. 15, observer control is used for the controller 21 in FIG. 14, and the estimated position error of the observer is provided for the input of adaptive control for disturbance suppression (frequency estimation unit 24, compensator 23). With this configuration as well, the present invention can be implemented in the same way.

FIG. 18 is a flow chart depicting a series of processings from the acquisition of the observed position by the control system in FIG. 14 or FIG. 15, to the current output, and to the calculation of adaptive control.

(S10) First the MCU 14 acquires the observed position y from the head 3, and calculates the position error 'e'.

(S12) Then the MCU 14 calculates the output Un[k] of the controller (Cn) 21 by Expression (6).

(S14) Then the MCU 14 calculates the output U[k] of the plant 22 by Un[k]+Ud[k-1] using the Ud[k-1] calculated with the previous sample. This calculated value U is output to the plant 22, and the output current changes.

(S16) The MCU 14 then executes calculation of adaptive control. First the update calculation of $\omega$ is executed. In other words, the estimated angular frequency $\omega[k]$ is updated by calculating the adaptive rule of the frequency estimation unit (24) in Expression (17) or Expression (18).

(S18) Then the MCU 14 refers to tables 25, and updates the values G and F.

(S20) Then the MCU 14 performs the update calculation of the state variables x1[k+1] and x2[k+1] in Expression (19), and at the same time calculates the correction current Ud[k] of the next sample.

Third Embodiment of Positioning Control System

Figure 19:
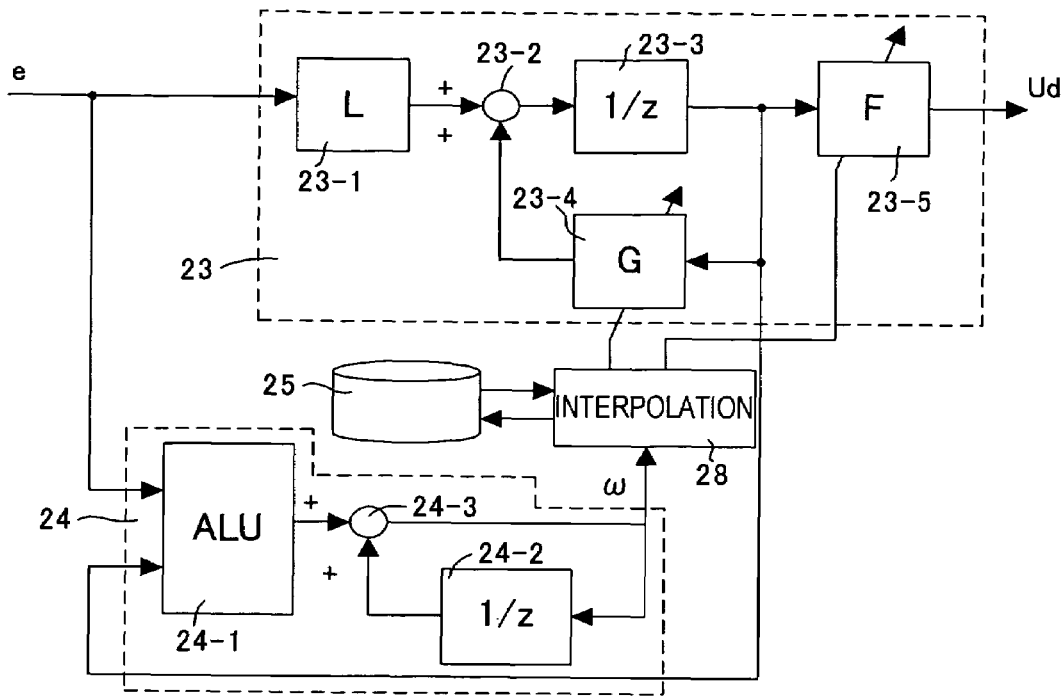
FIG. 19 is a block diagram depicting the positioning control system to which the disturbance suppression compensator in a third embodiment of the present invention is attached.
Figure 20:
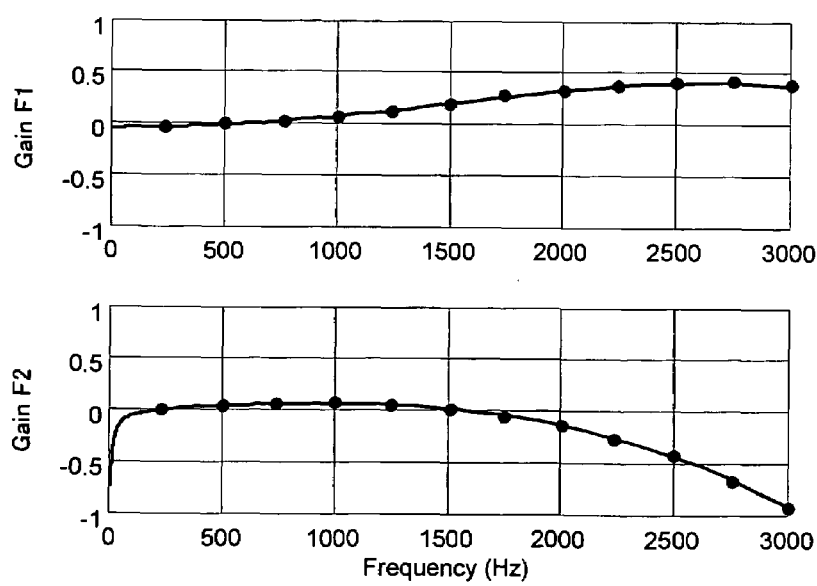
FIG. 20 is graphs depicting the storage data in the table in FIG. 19.

FIG. 19 is a block diagram according to the third embodiment of the position control system (servo control system) of the present invention, and FIG. 20 is graphs depicting the embodiment in FIG. 19. The embodiment in FIG. 19 has a configuration for decreasing the data capacity of the compensation table 25. In other words, in the embodiments in FIG. 8 to FIG. 10, the table 25 holds the values G and F for all the estimated angular frequencies $\omega$. In the case of the present embodiment, the same disturbance suppression compensation is performed with decreasing the data G and F in the table 25.

In FIG. 19, composing element the same as FIG. 8 are denoted with the same reference symbols. In other words, just like FIG. 8, the $\omega$ estimation section 24 comprises a computing block 24-1 for computing the second term (Ka·x1 [k] . . . ) of the $\omega$ adaptive formula in Expression (20), a delay block 24-2 for delaying the estimated $\omega[k]$ by one sample, and an addition block 24-3 for adding the delayed $\omega(\omega[k-1])$ and the computing result of the second term of the computing block 24-1. The case of Expression (21) is the same.

The table 25 stores the values G and F at each predetermined frequency of the angular frequency $\omega$, as shown in FIG. 20. For example, in FIG. 20, the output gain F=[F1, F2] at every 250 Hz is stored. This is the same for the phase compensation value G.

The interpolation-computing unit 28 reads the two G and F closest to the estimated angular frequency $\omega[k]$ output from the estimation unit 24 from the table 25, performs linear interpolation, and calculates G[k] and F[k] corresponding to the estimated angular frequency $\omega[k]$.

The comparator 23 computes x1[k+1], x2[k+1] and Udist [k] of Expression (18). In other words, the compensator 23 comprises a multiplication block 23-1 for multiplying the position error e[k] by "L", a multiplication block 23-4 for multiplying x1[k] and x2[k] by G[k] from the interpolation computing unit 28, an addition block 23-2 for adding the outputs of both the multiplication blocks 23-1 and 23-4 and outputting x1[k+1] and x2[k+1], a delay block 23-3 for delaying the output of the addition block 23-2 by one sample and outputting x1[k] and x2[k], and the multiplication block 23-5 for multiplying the outputs x1[k] and x2[k] of the delay block 23-3 by the output gains F1[k] and F2[k] from the interpolation computing unit 25.

The configuration of the table 25 may be the one in FIG. 9 or the one in FIG. 10. In other words, each frequency $\omega$ of the estimated disturbance is inserted into the interpolation-computing block 28, and the block 28 refers to the table 25. It is difficult to hold an infinite number of values in the table 25, so in practical terms it is desirable to hold the values G and F at intermittent frequencies for the values of the table 25. For example, the values for the angular frequencies, which are an integral multiple of the rotation angular frequency, are held.

By this configuration, a disturbance suppression control the same as the first embodiment can be implemented with decreasing the size of the table 25, which is effective for installation.

Fourth Embodiment of Positioning Control System

Figure 21:
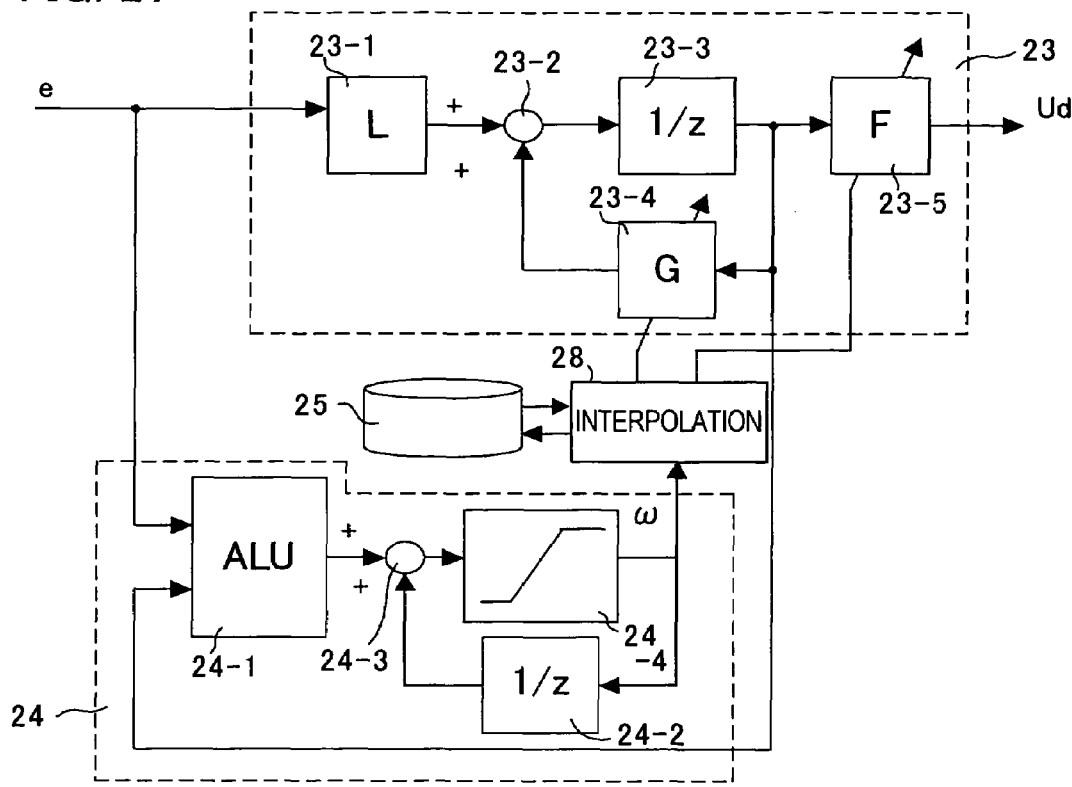
FIG. 21 is a block diagram depicting the positioning control system to which the disturbance suppression compensator in a fourth embodiment of the present invention is attached.
Figure 22:
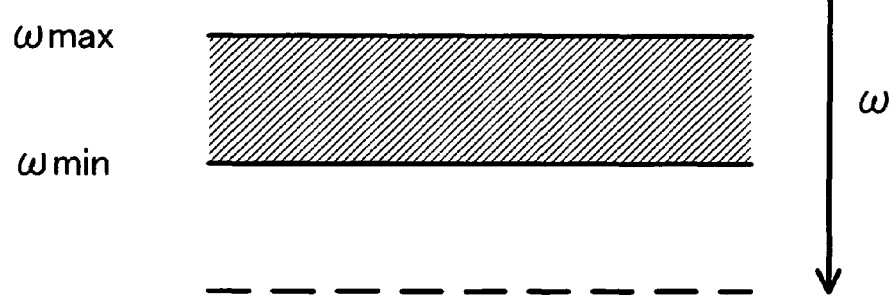
FIG. 22 is a diagram depicting the upper limit and the lower limit of the estimated angular frequency in FIG. 21.
Figure 23:
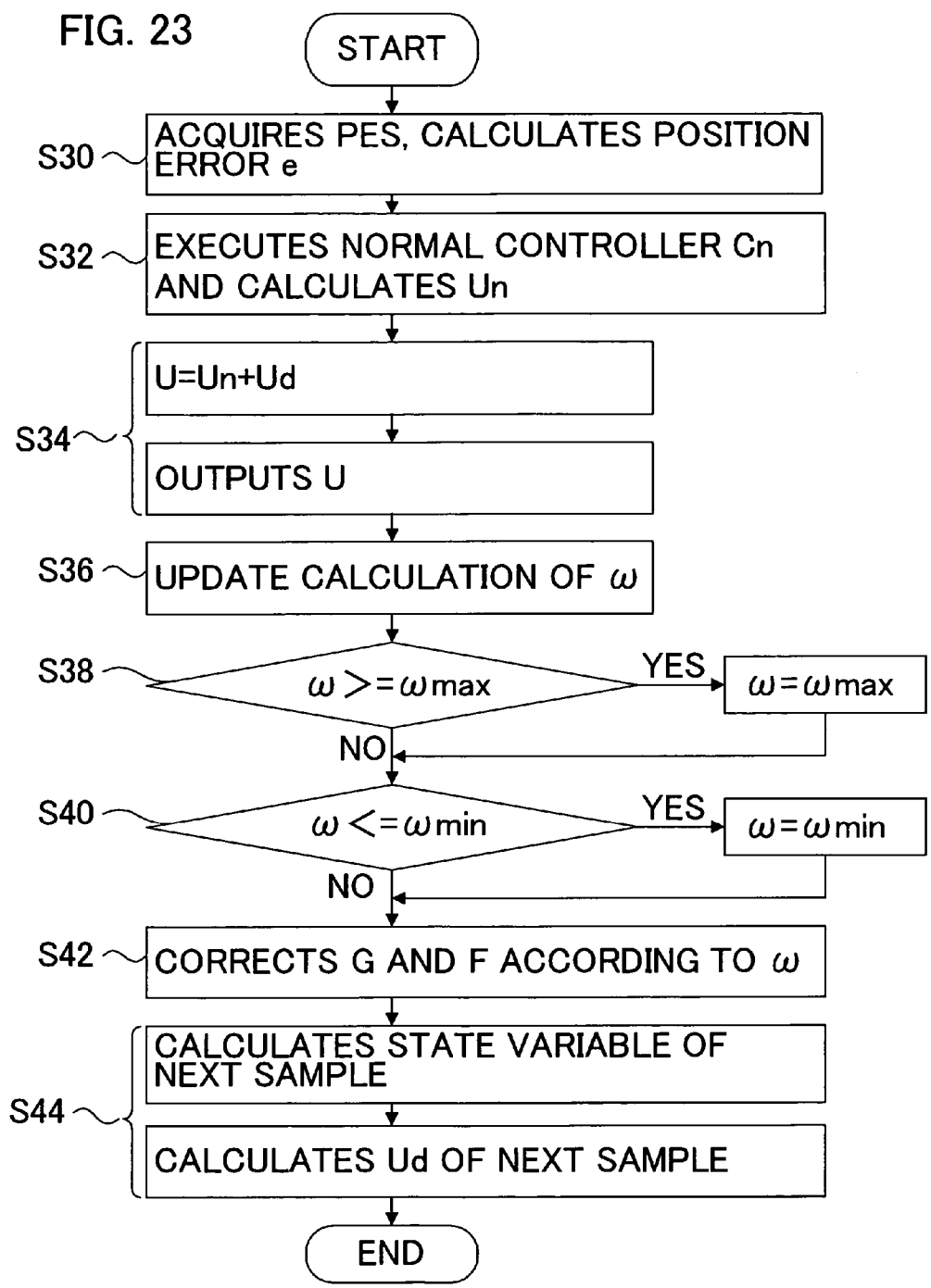
FIG. 23 is a flow chart depicting the adaptive control processing in FIG. 21.

FIG. 21 is a block diagram depicting the fourth embodiment of the positioning control system (servo control system) of the present invention, FIG. 22 is a diagram depicting the calculation processing of the control system in FIG. 21, and FIG. 23 is a flow chart depicting the calculation processing of the servo control system in FIG. 21. FIG. 21 is an example when the upper limit and the lower limit are set to a value of the estimated angular frequency ω[k].

In other words, the value ω does not become "0" or a negative value. And it is unnecessary to estimate a frequency higher than the Nyquist frequency, which is an angular frequency corresponding to a frequency that is half of the sample frequency, since the present invention is implemented by digital control. Also because of such an influence as the calculation delay, a disturbance around the Nyquist frequency is difficult to handle. Also an extremely low frequency disturbance, such as 1 Hz, can be handled by the integral compensation of the controller 21, so this need not be dealt with. Therefore as FIG. 22 shows, the upper limit ω max and the lower limit ω min are set in the estimation range of the angular frequency ω.

In FIG. 21, composing elements the same as those in FIG. 8 and FIG. 19 are denoted with the same reference symbols. In other words, the ω estimation block 24 comprises a computing block 24-1 for computing the second term (Ka·x1 [k] . . . ) of the ω adaptive formula in Expression (20), a delay block 24-2 for delaying the estimated ω[k] by one sample, an addition block 24-3 for adding the delayed ω(ω[k−1]) and the computing result of the second term of the computing block 24-1, and a frequency range limiting block 24-4 for setting the upper limit and the lower limit of the estimated angular frequency ω of the addition block 24-3. This is the same for the case of the adaptive formula in Expression (21).

The table 25 stores the values G and F at each predetermined frequency of the angular frequency ω, as shown in FIG. 20. For example, in FIG. 20, the output gain F [F1, F2] at each 250 Hz is stored. This is the same for the phase compensation value G.

The interpolation computing unit 28 reads the two G and F values which are closest to the estimated angular frequency ω[k] from the ω estimation unit 24 in the table 25, performs linear interpolation, and calculates G[k] and F[k] corresponding to the estimated angular frequency ω[k].

The compensator 23 computes x1[k+1], x2[k+1] and Udist[k] of Expression (19). In other words, the compensator 23 comprises the multiplication block 23-1 for multiplying the position error e[k] by "L", a multiplication block 23-4 for multiplying x1[k] and x2[k] by G[k] from the interpolation computing unit 28, an addition block 23-2 for adding the output of both multiplication blocks 23-1 and 23-4 and outputting x1[k+1] and x2[k+1], a delay block 23-3 for delaying the output of the addition block 23-2 by one sample and outputting x1[k] and x2[k], and a multiplication block 23-5 for multiplying the outputs x1[k] and x2[k] of the delay block 23-3 by the output gains F1[k] and F2[k] from the interpolation computing unit 28.

The configuration of the table 25 may be the one in FIG. 9 or the one in FIG. 10. In other words, each frequency ω of the estimated disturbance is inserted into the interpolation-computing block 28, and the block 28 refers to the table 25. It is difficult to hold an infinite number of values in the table 25, so in practical terms it is desirable to hold the values G and F at intermittent frequencies as the values of the table 25. For example, the values at the angular frequencies, which are an integral multiple of the rotation angular frequency, are held.

By this configuration, the estimated angular frequency is limited by the upper limit ω max (e.g. half of the sampling frequency=Nyquist frequency), and is also limited by the lower limit ω min (e.g. rotation frequency of the disk). Therefore excessive disturbance suppression control can be prevented and stable disturbance suppression control can be implemented. Also the upper limit may be a lower limit frequency of the fluctuation range due to the individual difference in the resonant frequency of the actuator and the temperature change.

FIG. 23 is a flow chart depicting a series of processings from the acquisition of the observed position of the control system in FIG. 21, to the current output, and to the calculation of adaptive control.

(S30) First the MCU 14 acquires the observed position 'y' from the head 3, and calculates the position error 'e'.

(S32) Then the MCU 14 calculates the output Un[k] of the controller (Cn) 21 by Expression (6).

(S34) Then the MCU 14 calculates the output U[k] of the plant 22 by Un[k]+Ud[k−1] using the Ud[k−1] calculated with the previous sample. This calculation value U is output to the plant 22, and the output current changes.

(S36) The MCU 14 then executes calculation of adaptive control. First the update calculation of ω is performed. In other words, the adaptive rule of the frequency estimation unit 24 in Expression (17) or Expression (18) is performed, and the estimated angular frequency ω[k] is updated.

(S40) Then the MCU 14 judges whether the estimated angular frequency ω[k] is the lower limit ω min or less. If the estimated angular frequency ω[k] is the lower limit ω min or less, the estimated angular frequency ω[k] is ω[k]=ω min.

(S42) Then the MCU 14 refers to the table 25 and executes the above-mentioned linear interpolation to update the values G and F.

(S44) Then the MCU 14 performs the update calculation of the state variables x1[k+1] and x2[k+1] of Expression (19), and at the same time calculates the correction current Ud[k] of the next sample.

Fifth Embodiment of Positioning Control System

Figure 24:
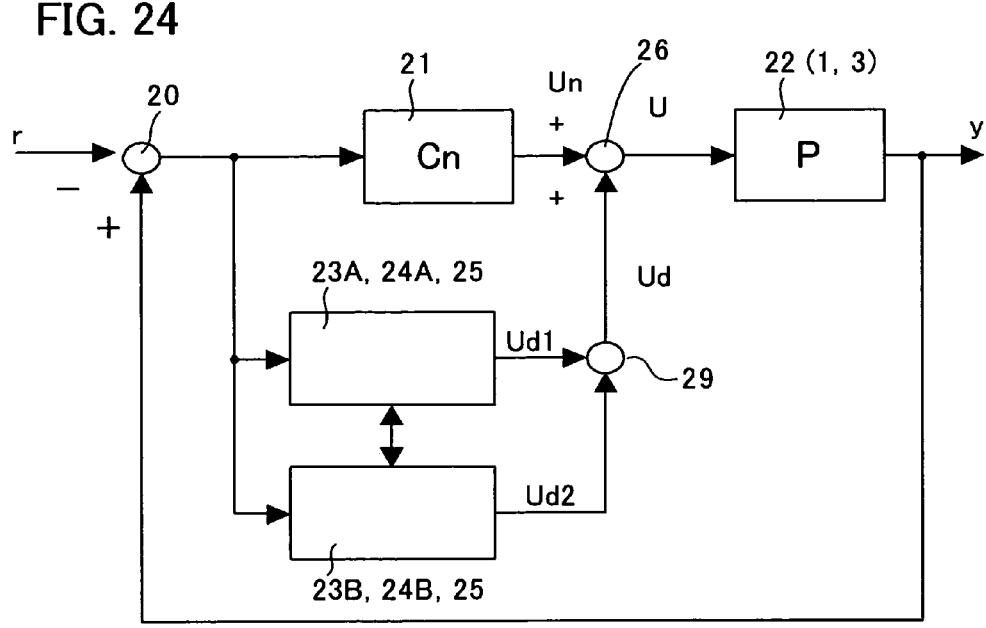
FIG. 24 is a block diagram depicting the positioning control system to which the disturbance suppression compensator in a fifth embodiment of the present invention is attached.
Figure 25:
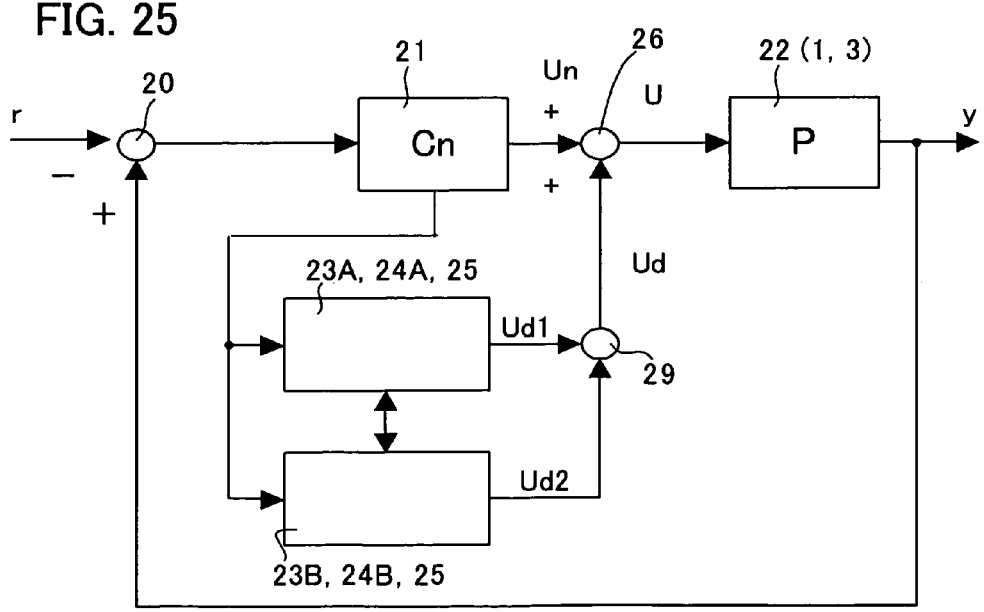
FIG. 25 is a block diagram depicting a modified embodiment where the controller in FIG. 24 is observer-controlled.
Figure 26:
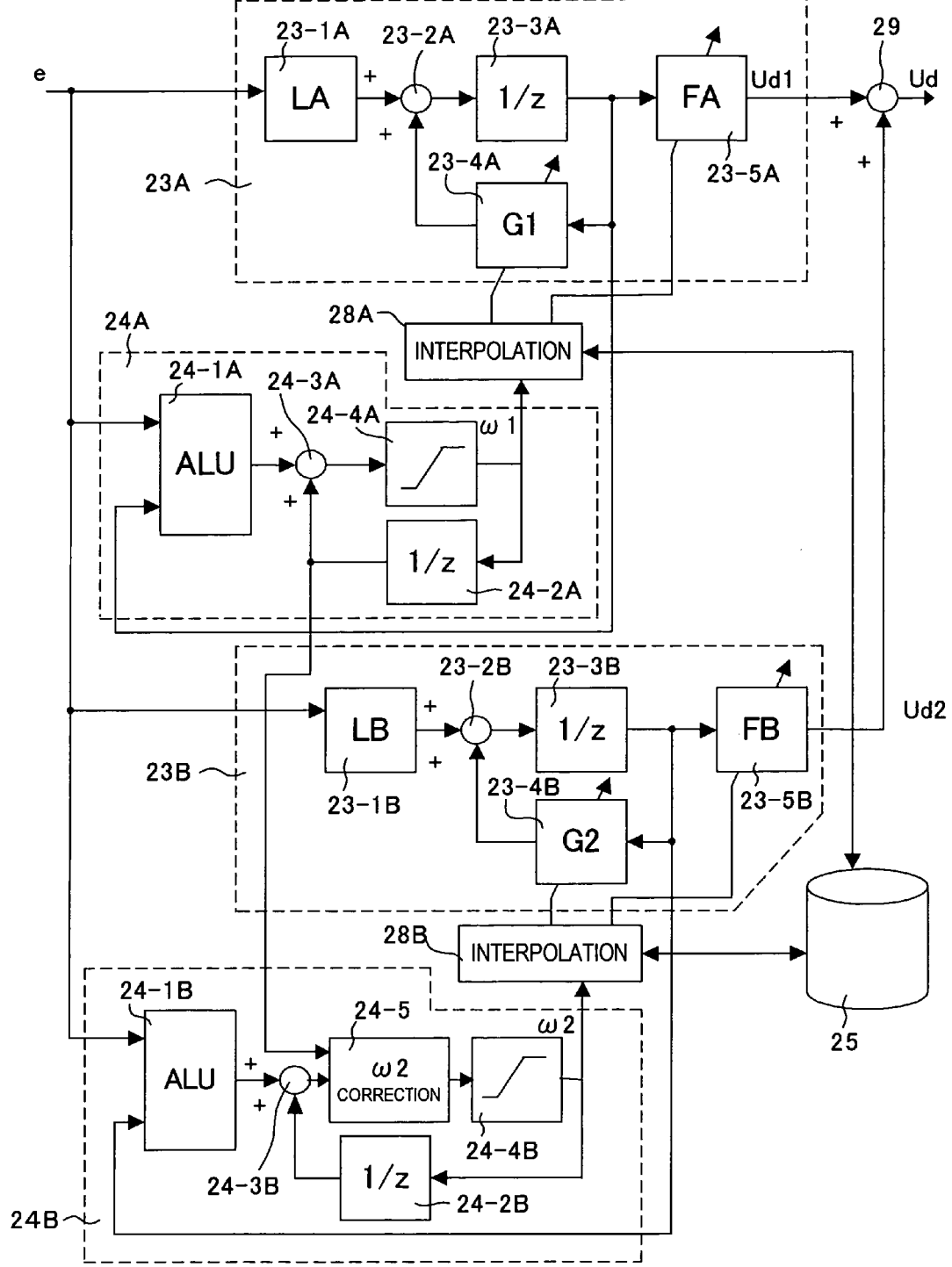
FIG. 26 is a detailed block diagram depicting the adaptive control block, including the disturbance suppression compensator in the configuration in FIG. 24.
Figure 27:
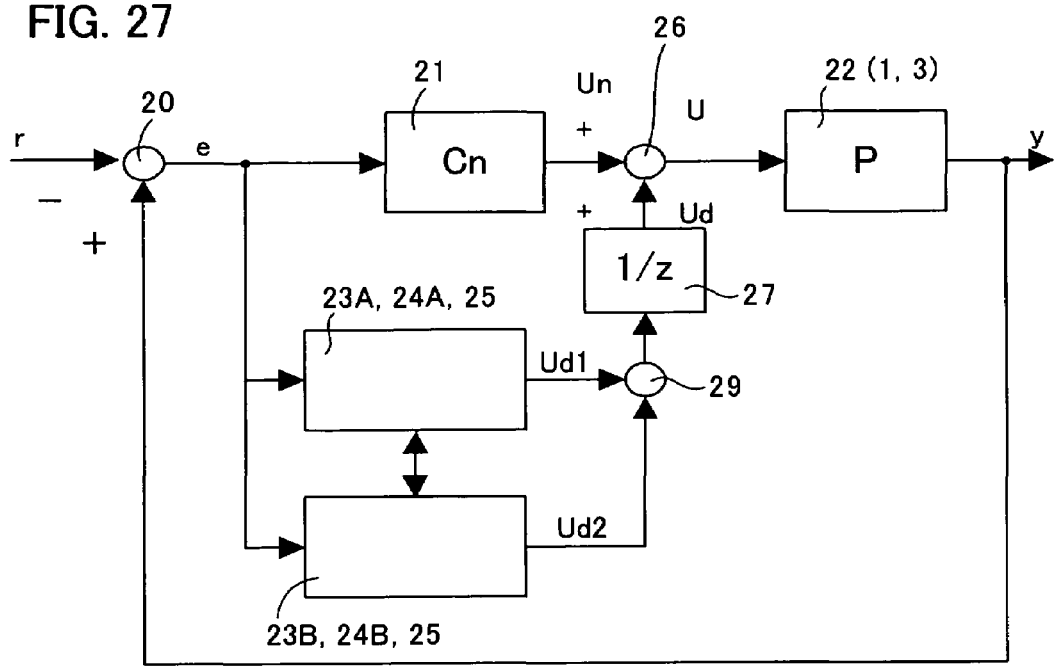
FIG. 27 is a block diagram depicting another configuration of the positioning control system according to the fifth embodiment of the present invention.

FIG. 24 is a block diagram depicting the fifth embodiment of the positioning control system (servo control system) of the present invention, FIG. 25 is a block diagram depicting a variant form of the fifth embodiment in FIG. 24, FIG. 26 is a detailed block diagram of FIG. 24, and FIG. 27 is a flow chart depicting the calculation processing of FIG. 24. The embodiments in FIG. 24 and later have two adaptive control blocks to support the disturbance of two different frequencies.

In other words, in the description of the above-mentioned embodiments, the number of frequencies of unknown disturbance is one. However depending on the operating format of the disk device, two different frequencies may be causing an unknown disturbance. For example, when the disk device is installed in a portable device, it is installed via an elastic element. In such an installation example, the disk device not only receives disturbance directly but also receives disturbance via the elastic element that is the disk device receives two different frequency disturbances even if there is one disturbance. Therefore suppression control is performed for the disturbance of two different unknown frequencies.

In FIG. 24, composing elements the same as FIG. 6 are denoted with the same reference symbols. In FIG. 24, the position error 'e' between the target position 'r' and the current position 'y' is computed by the computing block 20, and control computing is performed by the control block (Cn) 21, the control amount Un is calculated, and VCM 1 and 3, which are the plant 22, are driven. For the position of the plant, the servo signal from the magnetic head 3 is demodulated to calculate the current position 'y', and is fed back to the computing block 20.

Two disturbance suppression control mechanisms are installed. In other words, the first disturbance suppression control mechanisms 23A, 24A and 25 and the second disturbance suppression control mechanisms 23B, 24B and 25 are installed. The frequency estimation units 24A and 24B estimate the angular frequencies $\omega 1$ and $\omega 2$ of the external vibration, using the position error 'e' and the internal variables of the disturbance suppression compensators 23A and 23B (Cd). The compensation table 25 stores the constants of the compensators 23A and 23B (Cd) for the external vibration suppression corresponding to each frequency $\omega 1$ and $\omega 2$. The disturbance suppression compensators 23A and 23B (Cd) correct the internal constants by the constants read from the compensation table 25 by the angular frequencies $\omega 1$ and $\omega 2$ of the frequency estimation units 24A and 24B, and calculate the disturbance suppression control amounts Ud1 and Ud2 from the position error 'e'.

The addition block 29 adds the two disturbance suppression control amounts Ud1 and Ud2. The addition block 26 adds the control amount Un and the disturbance suppression control amount Ud(=Ud1+Ud2), and outputs it to the plant 22.

In other words, two correction values, Ud1 and Ud2, are added and output. Here the angular frequency $\omega$ is corrected between the first disturbance suppression control mechanisms 23A, 24A and 25, and the second disturbance suppression control mechanisms 23B, 24B and 25. In other words, if adaptive control is performed, the estimated angular frequencies $\omega 1$ and $\omega 2$ may become the same. Then only one disturbance can be supported. Therefore, as mentioned later, the values of the estimated angular frequencies $\omega 1$ and $\omega 2$ are adjusted as not to overlap.

FIG. 25 is a variant form of FIG. 24. In FIG. 25, composing elements the same as those in FIG. 24 are denoted with the same reference symbols, and just like the variant form of FIG. 6 in FIG. 7, the configuration, when the observer control is used for the controller 21 in FIG. 24 and the estimated position error of the observer is supplied to the input of the adaptive control for disturbance suppression, is shown.

FIG. 26 is a detailed block diagram of FIG. 24. In FIG. 26, composing elements the same as those in FIG. 21 and FIG. 25 are denoted with the same reference symbols. In FIG. 26, the 0° estimation block 24A/24B comprises the computing block 24-1A/24-1B for computing the second term (Ka·x1 [k] . . . ) of the $\omega$ adaptive formula in Expression (20), a delay block 24-2A/24-2B for delaying the estimated $\omega 1[k]$ or $\omega 2[k]$ by one sample, an addition block 24-3A/24-3B for adding the delayed $\omega 1(\omega 1[k-1])$ or $\omega 2$ ($\omega 2[k-1]$), and the computing result of the second term of the computing block 24-1A/24-1B, and the frequency range limiting block 24-4A/24-4B for setting the upper limit and the lower limit of the estimated angular frequency $\omega 1$ or $\omega 2$ of the addition block 24-3A/24-3B. This is the same for the adaptive formula in Expression (21).

The table 25 stores the values G and F at each predetermined frequency of the angular frequency $\omega$, as shown in FIG. 20. For example, in FIG. 20, the output gain F=[F1, F2] at each 250 Hz is stored. This is the same for the phase compensation value G.

The interpolation computing unit 28A/28B reads the two G and F values which are closest to the estimated angular frequency $\omega 1[k]$ or $\omega 2[k]$ from the $\omega$ estimation unit 24A/24B in the table 25, performs linear interpolation, and calculates G1[k], G2[k], FA[k]=F1[k], F2[k], FB[k]=F1[k], F2[k] corresponding to the estimated angular frequency $\omega 1[k]$ or $\omega 2[k]$.

The compensator 23A/23B computes x1[k+1], x2[k+1], Udist1[k] and Udist2[k] in Expression (19). In other words, the compensator 23A/23B comprises a multiplication block 23-1A/23-1B for multiplying the position error e[k] by [LA=L1, L2], [LB=L1, L2], a multiplication block 23-4A/23-4B for multiplying x1[k] and x2[k] by G1[k] and G2[k] from the interpolation computing unit 28A/28B, an addition block 23-2A/23-2B for adding the outputs of both multiplication blocks 23-1A/23-B and 23-4A/23-4B, and outputting x1[k+1] and x2[k+1], a delay block 23-3A/23-3B for delaying the output of the addition block 23-2A/23-2B by one sample and outputting x1[k] and x2[k], and a multiplication block 23-5A/23-5B for multiplying the outputs x1[k] and x2[k] of the delay block 23-3A/23-3B by the output gains FA[k] and FB[k] from the interpolation computing unit 28A/28B.

The addition block 29 adds the outputs Ud1 and Ud2 of the two multiplication blocks 23-5A and 23-5B, and outputs the disturbance suppression control value Ud[k]. The configuration of the table 25 may be the one in FIG. 9 or the one in FIG. 10.

Also in the second $\omega$ estimation section 24B, a $\omega 2$ correction block 24-5 for correcting the estimated $\omega 2$ by the output $\omega 1$ of the delay block 24-2A of the first $\omega$ estimation block 24A is installed. In other words, when the adaptive control configuration for two unknown frequencies like this is used, it must be remembered that there is the case when $\omega 1$ and $\omega 2$ always take a same value, and that virtually only one disturbance can be handled while two disturbance suppression control mechanisms are provided.

To solve this problem, a means of adjusting $\omega 1$ and $\omega 2$, so that the values $\omega 1$ and $\omega 2$ do not overlap, is installed. In other words, the $\omega 2$ correction block 24-5 compares the updated $\omega 2$ with $\omega 1$, and corrects $\omega 2$ if these values are similar. Details will be described in the processing flow in FIG. 29.

FIG. 27 is a block diagram of still another variant form of the embodiment in FIG. 24. In FIG. 27, composing elements the same as those in FIG. 24 are denoted with the same reference symbols. FIG. 27 is an example when a delay block 27, described in FIG. 14, is installed in the configuration in FIG. 24, and as described in FIG. 16, the output of Ud is delayed for one sample to improve the calculation delay time.

Figure 28:
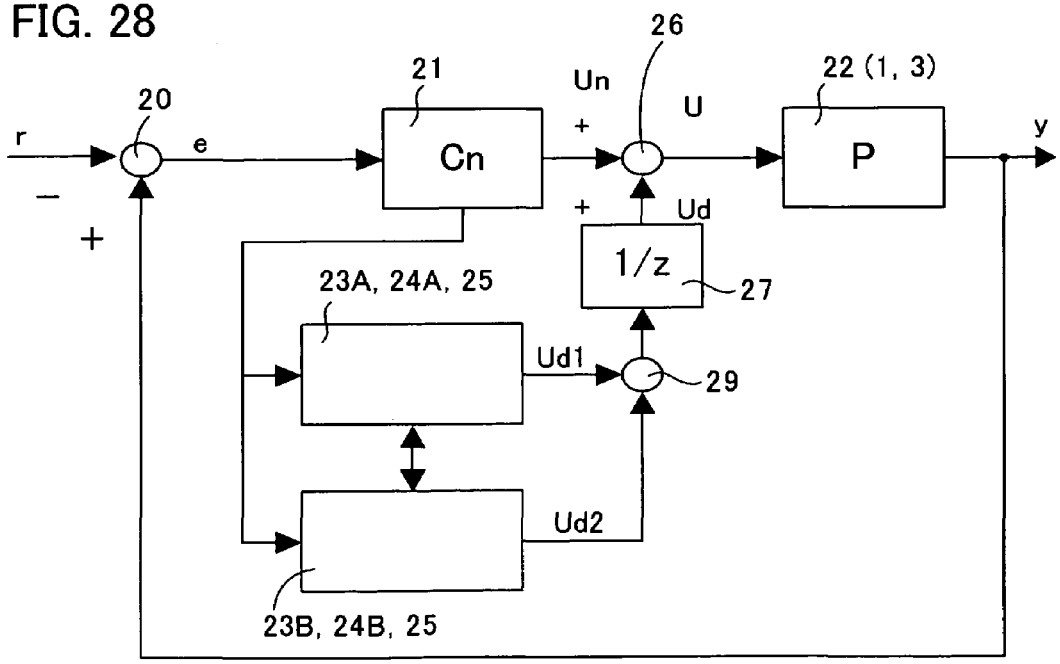
FIG. 28 is a block diagram depicting a modified embodiment where the controller in FIG. 27 is observer-controlled.

FIG. 28 is a block diagram depicting a variant form of the block diagram in FIG. 27. In FIG. 28, composing elements the same as those in FIG. 24 and FIG. 27 are denoted with the same reference symbols. Just like FIG. 15, FIG. 28 shows a configuration when observer control is used for the controller 21 in FIG. 27, and the estimated position error of the observer is provided to the input of the adaptive control for disturbance suppression.

Figure 29:
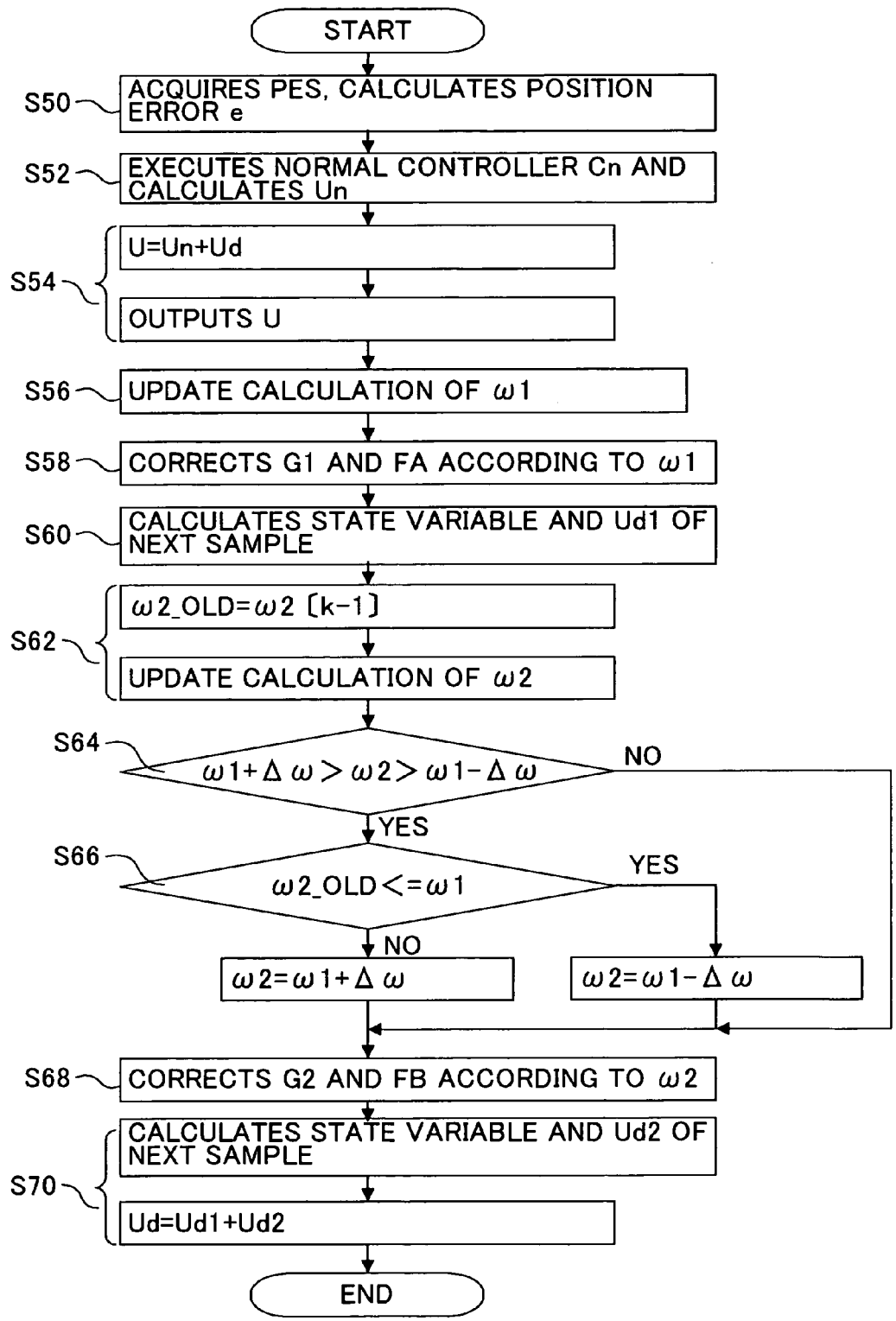
FIG. 29 is a flow chart depicting the adaptive control processing in FIG. 27.

FIG. 29 is a flow chart depicting a series of processing from the acquisition of the observed position of the control system in FIG. 24 and FIG. 27, to the current output, and to the calculation of adaptive control.

(S50) First the MCU 14 acquires the observed position y from the head 3, and calculates the position error 'e'.

(S52) Then the MCU 14 calculates the output Un[k] of the controller (Cn) 21 by Expression (6).

(S54) Then the MCU 14 calculates the output U[k] of the plant 22 by Un[k]+Ud[k−1] using the Ud[k−1] calculated with the previous sample. This calculation value U is output to the plant 22, and the output current changes.

(S56) The MCU 14 then executes the calculation of adaptive control. First the update calculation of ω1 is performed. In other words, the adaptive rule of the frequency estimation unit 24A in Expression (17) or Expression (18) is performed, and the estimated angular frequency ω1[k] is updated.

(S58) Then the MCU 14 refers to the table 25, executes the above-mentioned linear interpolation, and updates the values G1 and FA.

(S60) Then the MCU 14 performs the update calculation of state variables x1[k+1] and x2[k+1] of Expression (19), and at the same time calculates the correction current Ud1[k] of the next sample.

(S62) Then the MCU 14 performs the update calculation of the estimated angular frequency ω2[k]. First ω[k−1] of the previous sample is set for the variable ω2_OLD. Then the MCU 14 executes the adaptive rule of the frequency estimation unit 24B of Expression (17) or Expression (18), and updates the estimated angular frequency ω2[k].

(S64) The MCU 14 compares the updated ω2[k] with ω1[k], and if both are close, ω2[k] is corrected. In other words, Δx for defining a predetermined frequency range is set for the first estimated angular frequency ω1, and it is judged whether the second estimated angular frequency ω2[k] is smaller than (ω1+Δω) and greater than (ω1−Δω). This range from (ω1+Δω) to (ω1−Δω) is the range to judge whether ω2 is close to ω1. If the second estimated angular frequency ω2[k] is not smaller than (ω1+Δω) or is not greater than (ω1−Δω), then ω2 and ω1 are not close, so it is not necessary to correct ω2, and the processing advances to step S68.

(S66) If the second estimated angular frequency ω2[k] is smaller than (ω1+Δω) and greater than (ω1−Δω), it is judged that ω2 is close to ω1, and ω2[k] is corrected. That is, in order to judge whether ω2 is smaller than or greater than ω1, it is judged whether ω1 is ω_OLD[k], where ω2[k−1] of the previous sample is set, or less. If ω1 is greater than ω_OLD [k] where ω2[k−1] is set, ω2 is smaller than ω1, so ω2[k] is corrected to (ω1−Δω), that is the lower limit of the tolerance. If ω1 is not greater than ω_OLD[k], where ω2[k−1] is set, ω2 is greater than ω1, so ω2[k] is corrected to ω1+Δω), that is to the upper limit of the tolerance.

(S68) Now the MCU 14 refers to the table 25 by ω2[k], executes the above-mentioned linear interpolation, and updates the values G2 and FB.

(S70) Then the MCU 14 performs the update calculation of the state variables x1[k+1] and x2[k+1] in Expression (19), and at the same time calculates the correction current Ud2[k] of the next sample. And the MCU 14 adds Ud1[k] in step S60 and Ud2[k], and determines Ud[k].

In FIG. 24 to FIG. 29, an example of adapting to the disturbance of two different frequencies was shown. However the number of frequencies to be supported is not limited to two. By increasing the number of blocks for adaptive control to three or four, even more disturbance frequencies can be supported.

In this way the value Δω is set. This value is the minimum value of the difference between ω2 and ω1. If the difference is smaller than Δω, the value of ω2 is shifted. This shift has direction. The shift in the positive direction and the shift in the negative direction must be distinguished.

Sixth Embodiment of Positioning Control System

Figure 30:
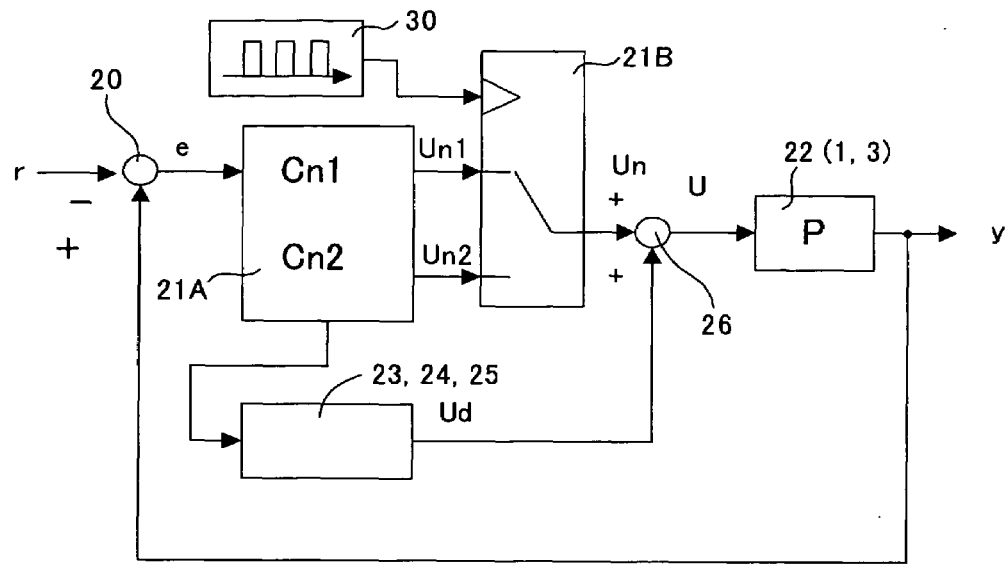
FIG. 30 is a block diagram depicting the positioning control system to which the disturbance suppression compensator in a sixth embodiment of the present invention is attached.
Figure 31:
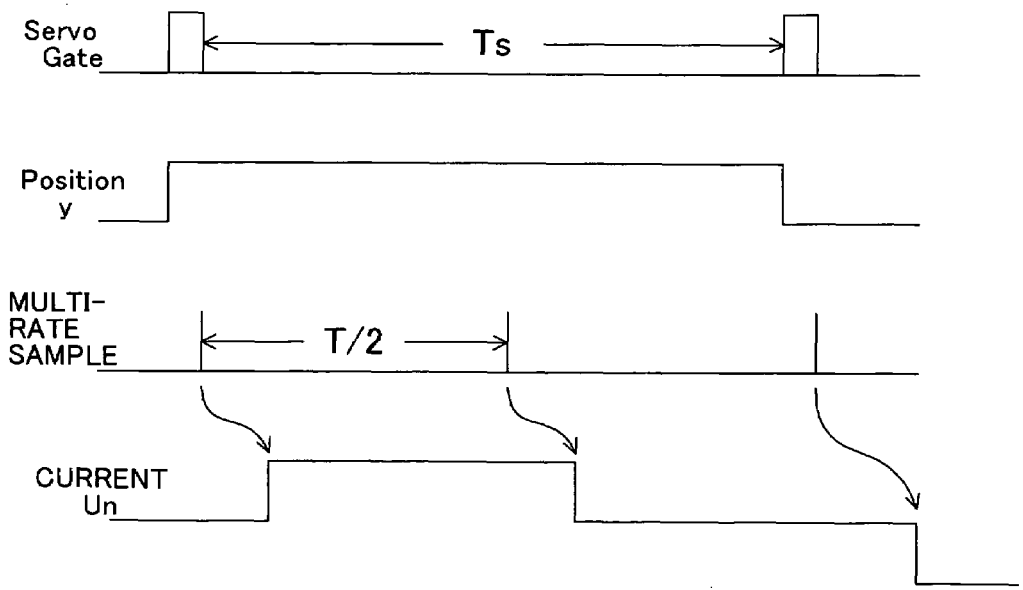
FIG. 31 is a diagram depicting the operation of adaptive control by the double rate control in FIG. 30.

FIG. 30 is a block diagram depicting the sixth embodiment of the positioning control system (servo control system) of the present invention, and FIG. 31 is a time chart of FIG. 30.

Generally an improvement of positioning accuracy can be expected if the sample frequency is increased. In the magnetic disk device, however, increasing the sample frequency increases the recording area of servo signals, which decreases the area where data is recorded. To improve this, multi-rate control may be used for the magnetic disk device. Multi-rate control can also be implemented by using a filter. In the magnetic disk device, a method of implementing multi-rate control using observer control is generally used.

In the present embodiment, the configuration of a controller of the observer control using multi-rate control is used. In other words, multi-rate control is a method for implementing the output of a frequency higher than the sample frequency of the input. In this example, a double rate of multi-rate control is constructed. In other words, current U is output at double the frequency of the detected sample frequency at the observed position 'y', which is input.

The controllers 21A and 21B of observer control using the multi-rate control in FIG. 30 are constructed based on the following Expression (23) using Expression (6).

$$\begin{pmatrix} x\_hat[k] \\ v\_hat[k] \\ b\_hat[k] \end{pmatrix} = \begin{pmatrix} x\_bar[k] \\ v\_bar[k] \\ b\_bar[k] \end{pmatrix} + \begin{pmatrix} L11 \\ L12 \\ L13 \end{pmatrix}(y[k] - x\_bar[k]) \quad (23)$$

$$u[k] = -Fx \cdot x\_hat[k] - Fv \cdot v\_hat[k] - Fb \cdot b\_hat[k]$$

$$\begin{pmatrix} x\_hat[k+0.5] \\ v\_hat[k+0.5] \\ b\_hat[k+0.5] \end{pmatrix} = A\begin{pmatrix} x\_hat[k] \\ v\_hat[k] \\ b\_hat[k] \end{pmatrix} + B \cdot u[k]$$

$$u[k+0.5] = -Fx \cdot x\_hat[k+0.5] - Fv \cdot v\_hat[k+0.5] - Fb \cdot b\_hat[k+0.5]$$

$$\begin{pmatrix} x\_bar[k+1] \\ v\_bar[k+1] \\ b\_bar[k+1] \end{pmatrix} = A\begin{pmatrix} x\_hat[k+0.5] \\ v\_hat[k+0.5] \\ b\_hat[k+0.5] \end{pmatrix} + B \cdot u[k+0.5]$$

As Expression (23) shows, basically Expression (6) is executed twice for the detected sample at the observed position y. u[k] and u[k+0.5] are calculated, and current u[k] and u[k+0.5] are output with double frequency.

In other words, as FIG. 31 shows, after the observed position 'y' is acquired with the detected sample (servo gate) at the observed position, the state variables x_hat[k], v_hat [k] and b_hat[k] are corrected by the difference value between the estimated position error of the observer, that is the difference of the observed position y[k], and the estimated position x_bar[k] calculated one sample before. Then the three state variables x_hat[k], v_hat[k] and b_hat[k] are multiplied by the feedback gains Fx, Fv and Fb, and the current u[k] is output. After the current is output, the values of the state variables of the sample at 0.5 sample later, x_hat[k+0.5], v_hat[k+0.5] and b_hat[k+0.5] are estimated by u[k]. Then the three state variables x_hat[k+0.5], v_hat [k+0.5] and b_hat[k+0.5] are multiplied by the feedback gains Fx, Fv and Fb, and the current u[k+0.5] is output. After current is output, the values of the state variables of the next sample x_bar[k+1], v_bar[k+1] and b_[k+1] are estimated.

Specifically a clock (multi-rate sample clock) 30 with a double frequency of the detected sample frequency at the observed position 'y' is supplied to the controllers 21A and 21B, and Un1 (U[k]) and Un2 (U[k+0.5]) are output as Un synchronizing with this clock.

For the blocks 23, 24 and 25 of adaptive control, the disturbance suppression control value Ud is calculated, as mentioned above, using the estimated position error of the observer 21A. In this multi-rate control as well, the blocks 23, 24 and 25 of adaptive control are operated once per one sample, and the disturbance suppression control value Ud is calculated. This is because calculation processing becomes heavy and the processing time becomes long, and also suppression performance is not much different between operating once per one sample and twice per one sample. The addition block 26 adds Un and Ud, and outputs it to the plant 22.

Figure 32:
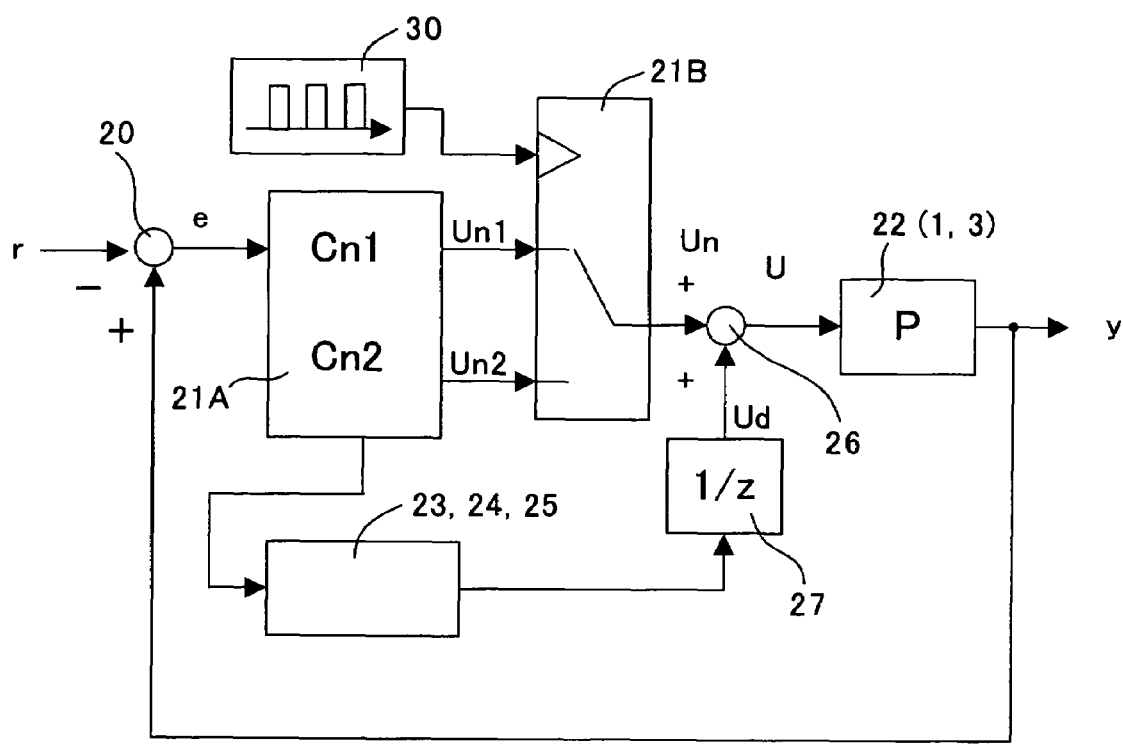
FIG. 32 is a block diagram depicting another positioning control system according to the sixth embodiment of the present invention.

FIG. 32 is a block diagram depicting another configuration of the control system using the multi-rate control of the sixth embodiment in FIG. 30. In FIG. 32, composing elements the same as those in FIG. 30 are denoted with the same reference symbols. FIG. 32 is an example when a delay block 27, for delaying the output Ud of the adaptive control by one sample, is installed in the configuration in FIG. 30. In other words, just like the embodiment in FIG. 14, the disturbance suppression output is intentionally delayed for one sample to decrease the calculation processing time.

In other words, as shown in FIG. 16, current is output using the disturbance suppression control value Ud[k−1] of the previous sample, then the output Ud(Udist)[k] of the compensator (Cd) 23 is calculated. In this way, time, from the acquisition of the observed position 'y' to the output of the drive current U, becomes shorter, and the response (phase accuracy) of the control system is improved. Also as mentioned above, even if the estimated values ω[k−1] and Ud[k−1] with the previous sample are used, the disturbance frequency estimation speed improves since the response (phase accuracy) of the control system becomes quicker.

Figure 33:
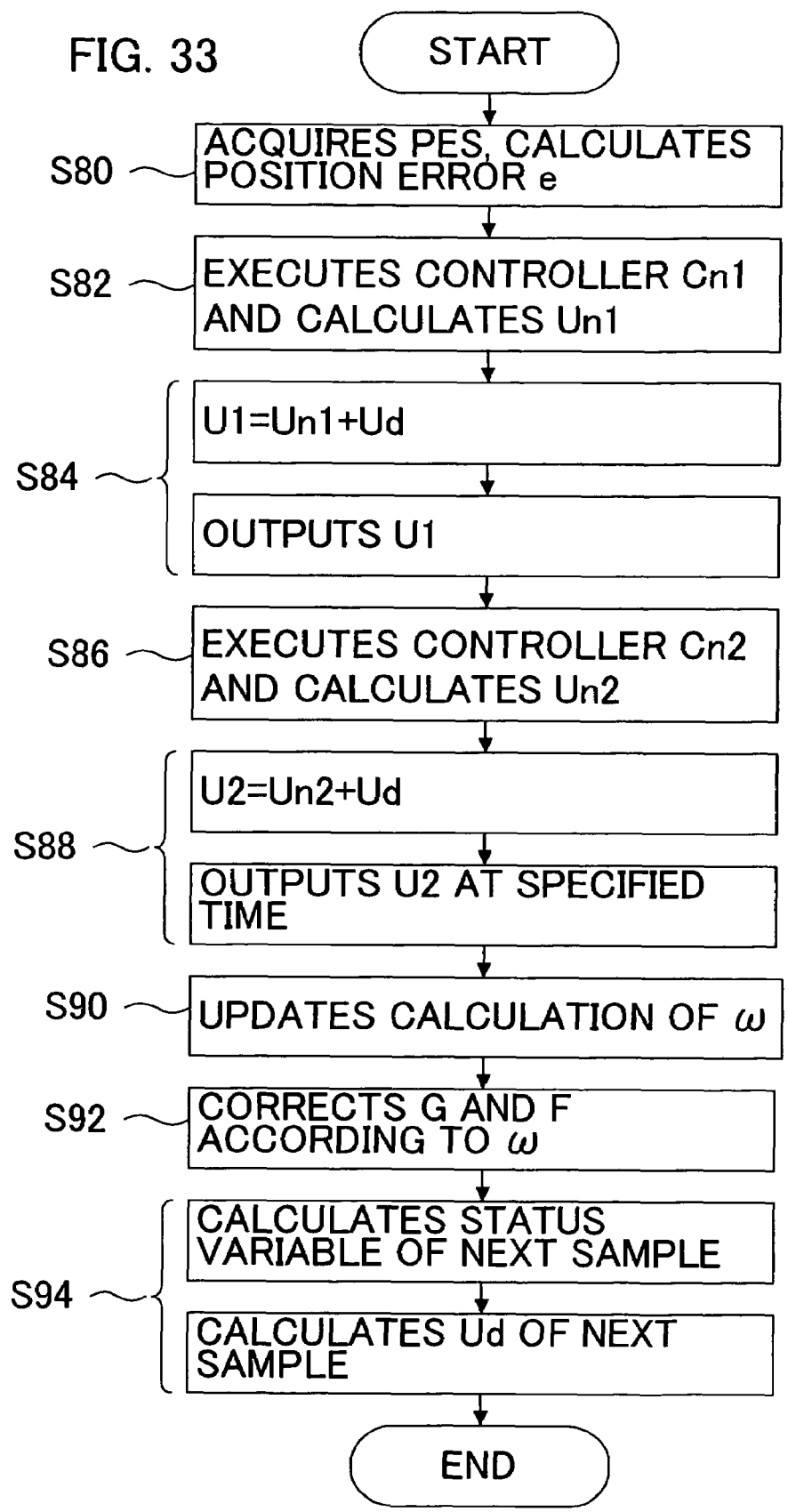
FIG. 33 is a flow chart depicting the adaptive control processing in FIG. 32.

FIG. 33 is a flow chart depicting a series of processing from the acquisition of the observed position of the control system in FIG. 32, to current output, and to the calculation of adaptive control.

(S80) First the MCU 14 acquires the observed position 'y' from the head 3, and calculates the position error 'e'.

(S82) Then the MCU 14 calculates the output Un1[k] of the controller (Cn1) 21A by Expression (33).

(S84) Then the MCU 14 calculates the output U1[k] of the plant 22 by Un1[k]+Ud[k−1] using Ud[k−1] calculated with the previous sample. This calculated value U1 is output to the plant 22, and the output current changes.

(S86) Then the MCU 14 calculates the output Un2[k] (=Un[k+0.5]) of the controller (Cn2) by Expression (33).

(S88) Then the MCU 14 calculates the output U2[k] of the plant 22 by Un2[k]+Ud[k−1] using Ud[k−1] calculated with the previous sample. This calculated value U2 is output to the plant 22 at a specified time, and the output current changes.

(S90) The MCU 14 then executes the calculation of adaptive control. First the update calculation of a is performed. In other words, the adaptive rule of the frequency estimation unit 24 of Expression (17) or Expression (18) is calculated, and the estimated angular frequency ω[k] is updated.

(S92) Then the MCU 14 refers to the table 25 and updates the values of G and F.

(S94) Then the MCU 14 performs the update calculation of the state variables x1[k+1] and x2[k+1] in Expression (19), and at the same time calculates the correction current Ud[k] of the next sample.

Figure 34:
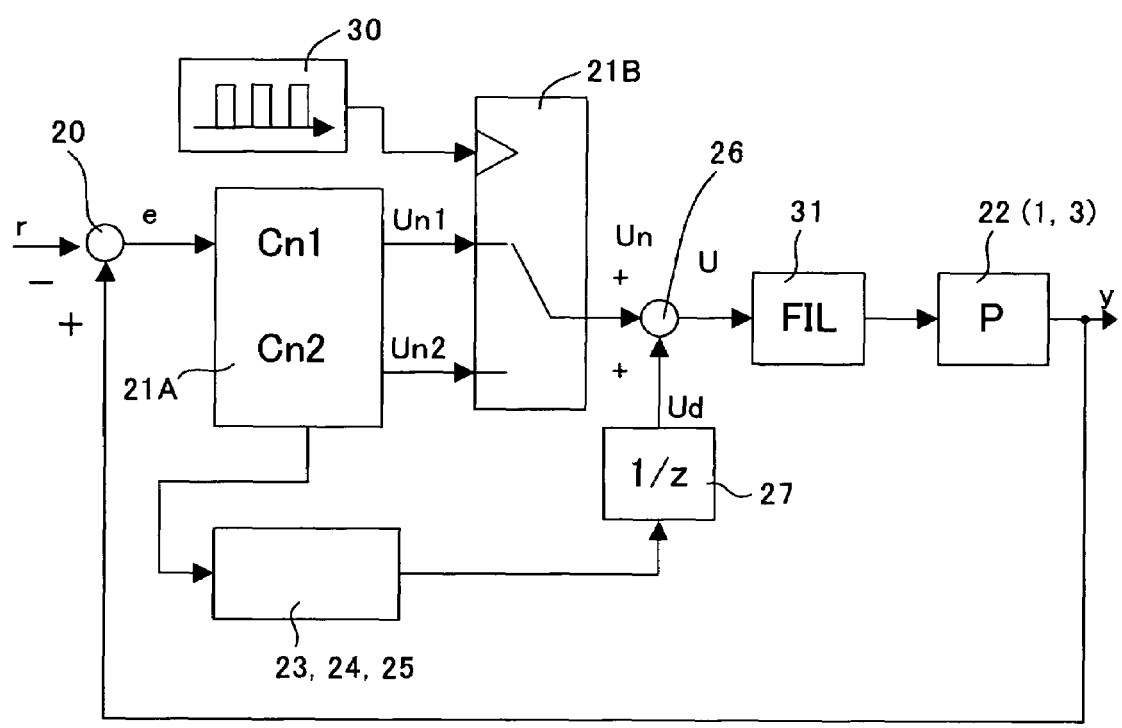
FIG. 34 is a block diagram depicting still another positioning control system according to the sixth embodiment of the present invention.

FIG. 34 is a block diagram depicting still another configuration of the control system using the multi-rate control of the sixth embodiment in FIG. 30. In FIG. 34, composing elements the same as those in FIG. 30 and FIG. 32 are denoted with the same reference symbols. FIG. 34 is an example when a delay block 27, for delaying the output Ud of adaptive control by one sample, is installed in the configuration in FIG. 30, and the notch filter 31, described in Expression (9), is installed before outputting current to the plant 22.

One or plurality of cascade-connected notch filters 31 suppresses the resonance of the actuator 1. In other words, an actuator has resonance characteristics. Therefore by using a filter represented by a notch filter, the controller output is passed through the filter and the filter output is supplied to the actuator.

Figure 35:
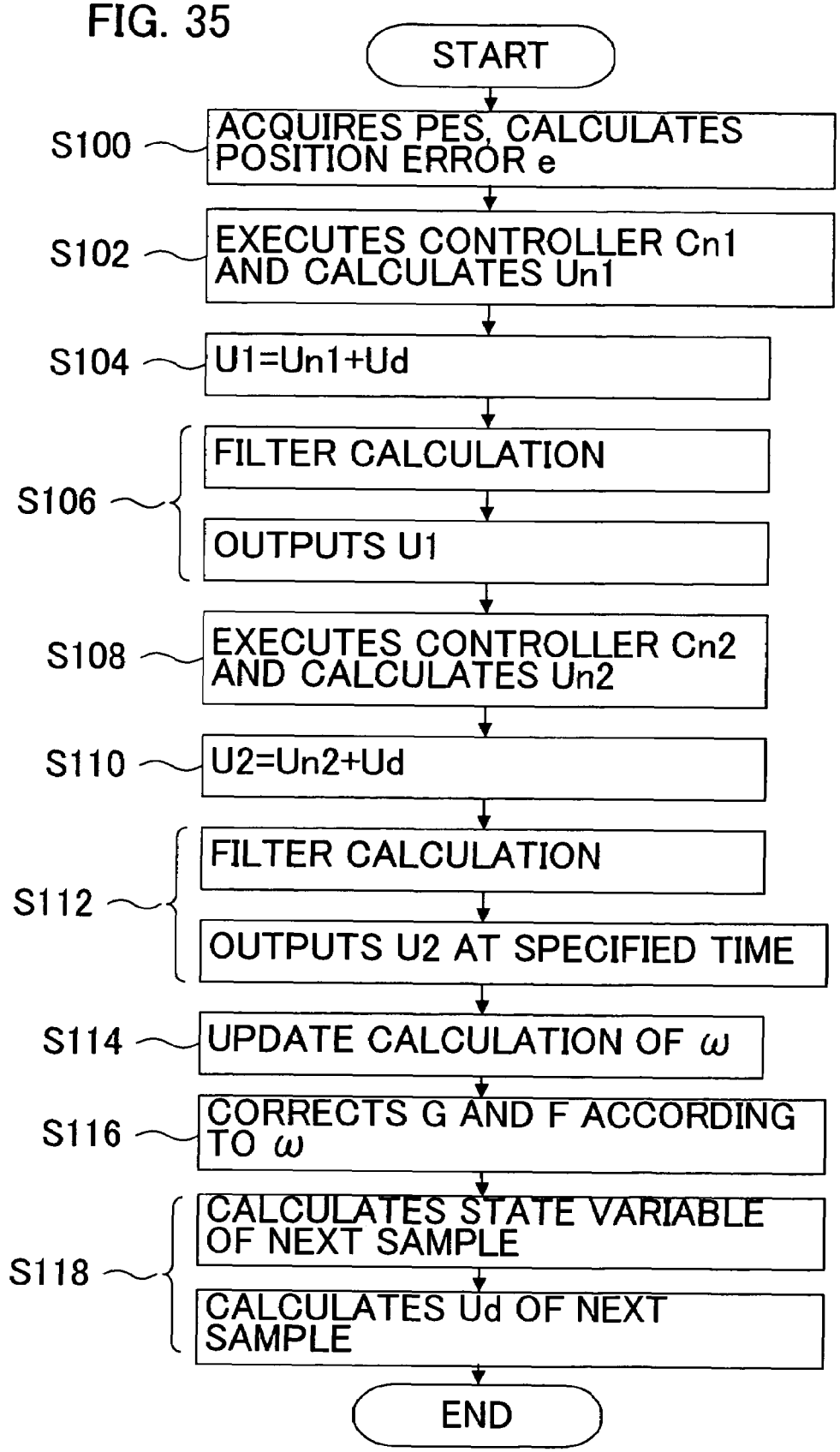
FIG. 35 is a flow chart depicting the adaptive control processing in FIG. 34.

FIG. 35 is a flow chart depicting a series of processings from the acquisition of the observed position of the control system shown in FIG. 34, to current output, and to the calculation of adaptive control.

(S100) First the MCU 14 acquires the observed position 'y' from the head 3, and calculates the position error 'e'.

(S102) Then the MCU 14 calculates the output Un1[k] of the controller (Cn1) 21A by Expression (33).

(S104) Then the MCU 14 calculates the output U1[k] of the plant 22 by Un1[k]+Ud[k−1] using Ud[k−1] calculated with the previous sample.

(S106) The MCU 14 performs filter calculation processing for passing the output U1[k] through the notch filter 31 in Expression (9), and this calculated value U1 is output to the plant 22, and the output current changes.

(S108) Then the MCU 14 calculates the output Un2[k] (=Un[k+0.5]) of the controller (Cn2) 21A by Expression (33).

(S110) Then the MCU 14 calculates the output U2[k] of the plant by Un2[k]+Ud[k−1] using Ud[k−1] calculated with the previous sample.

(S112) The MCU 14 performs filter calculation processing for passing the output U2[k] through the notch filter 31 in Expression (9), and this calculated value U2 is output to the plant 22, and the output current changes.

(S114) The MCU 14 then executes the calculation of adaptive control. First the update calculation of o is performed. In other words, the adaptive rule of the frequency estimation unit 24 of Expression (17) or Expression (18) is calculated, and the estimated angular frequency ω[k] is updated.

(S116) Then the MCU 14 refers to the table 25, and updates the values of G and F.

(S118) Then the MCU 14 performs the update calculation of the state variables x1[k+1] and x2[k+1] in Expression (19), and at the same time calculates the correction current Ud[k] of the next sample.

Seventh Embodiment of the Positioning Control System

In the above description, adaptive control is started in a state where external vibration is applied when following up a track, so as to suppress the disturbance. In an actual magnetic disk, however, a same track is not always followed up, but seek control is also executed.

Figure 36:
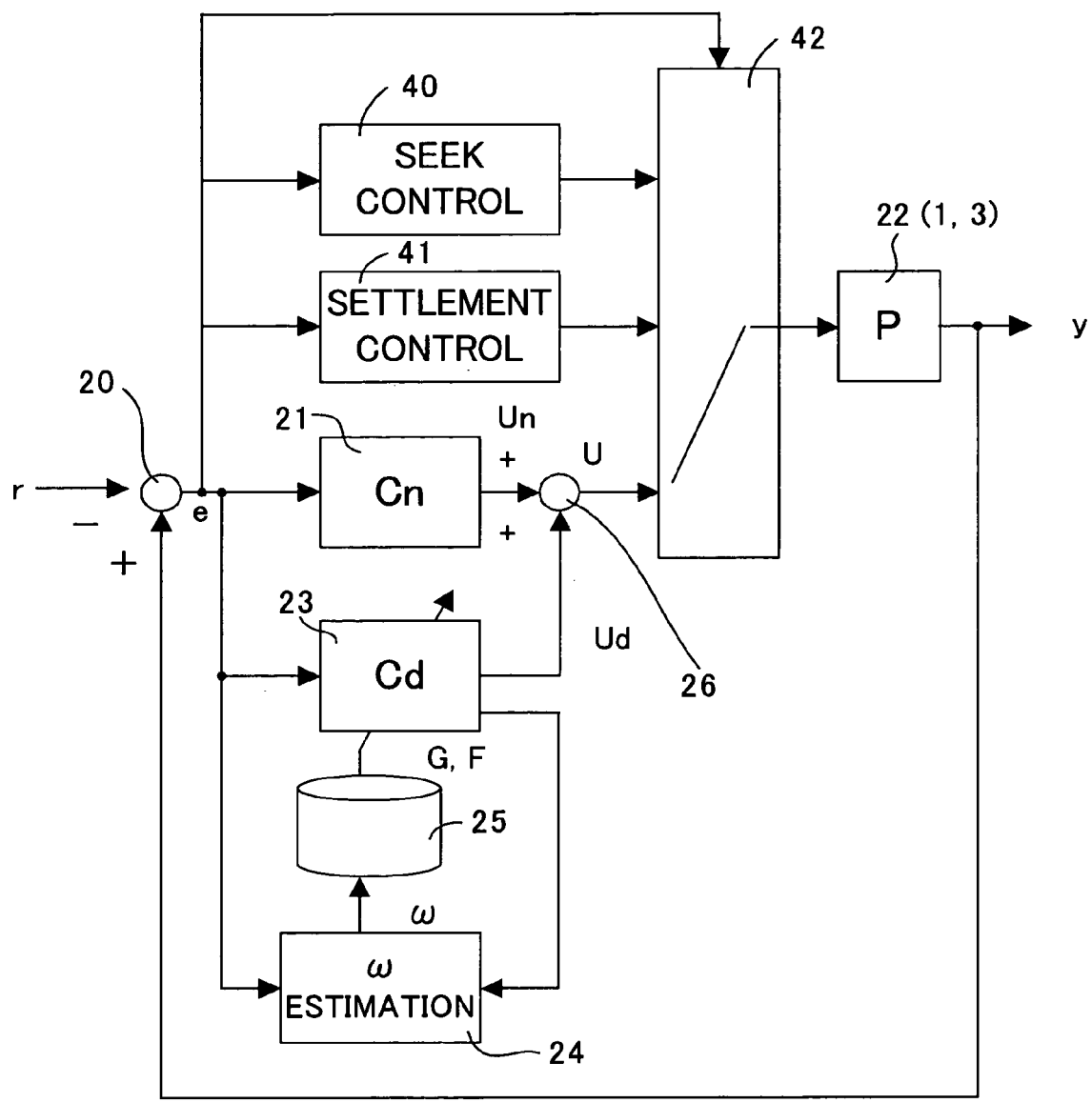
FIG. 36 is a block diagram depicting the positioning control system to which the disturbance suppression compensator in a seventh embodiment of the present invention is attached.

The operation timing of the adaptive control of the present invention when control is switched in this way will be described. FIG. 36 is a block diagram depicting the seventh embodiment of the positioning control system of the present invention. In FIG. 36, composing elements the same as those in FIG. 6 are denoted with the same reference symbols. In other words, FIG. 36 is a computing block diagram of the servo control system executed by the MCU 14, where the position error 'e', between the target position 'r' and the current position 'y', is computed by the computing block 20, control computing is performed and the control amount Un is calculated by the control block (Cn) 21, and VCM 1 and 3, which are the plant 22, are driven. For the position of the plant, the current position 'y' is calculated by demodulating the servo signal from the magnetic head 3, which is fed back to the computing block 20.

The angular frequency estimation unit 24 estimates the angular frequency ω of external vibration, using the position error e and the internal variable of the disturbance suppression compensator 23 (Cd). The compensation table 25 stores the constants of the compensator 23 (Cd) for external vibration suppression corresponding to each frequency ω. The disturbance suppression compensator 23 (Cd) corrects the internal constants using the constants read from the compensation table 25 by the angular frequency ω of the frequency estimation unit 24, and calculates the disturbance suppression control amount Ud from the position error 'e'. The addition block 26 adds the control amount Un and the disturbance suppression control amount Ud, and outputs it to the plant 22.

This controller 21 is a block for performing track following. This positioning control system further comprises a known seek control block 40, settlement control block 41 and switching block 42 for switching the seek control block 40, settlement control block 41 and controller (track following control block) 21 according to the position error, so as to perform seek control and settlement control, as shown in FIG. 5.

In this configuration, when the head moving control in FIG. 5 is performed, adaptive control is started only for track following control. In other words, only when track following control is performed, the switching block 42 selects the output of the addition block 26 for adaptive control, and outputs it to the plant 22 (1, 3), so the processing of the adaptive control block (23, 24, 25, 26), including the controller 21, is executed only when track following is performed.

Therefore the load of processing on the MCU 14 can be decreased, and the track following control of the head during read/writing can be executed with suppressing disturbance.

Figure 37:
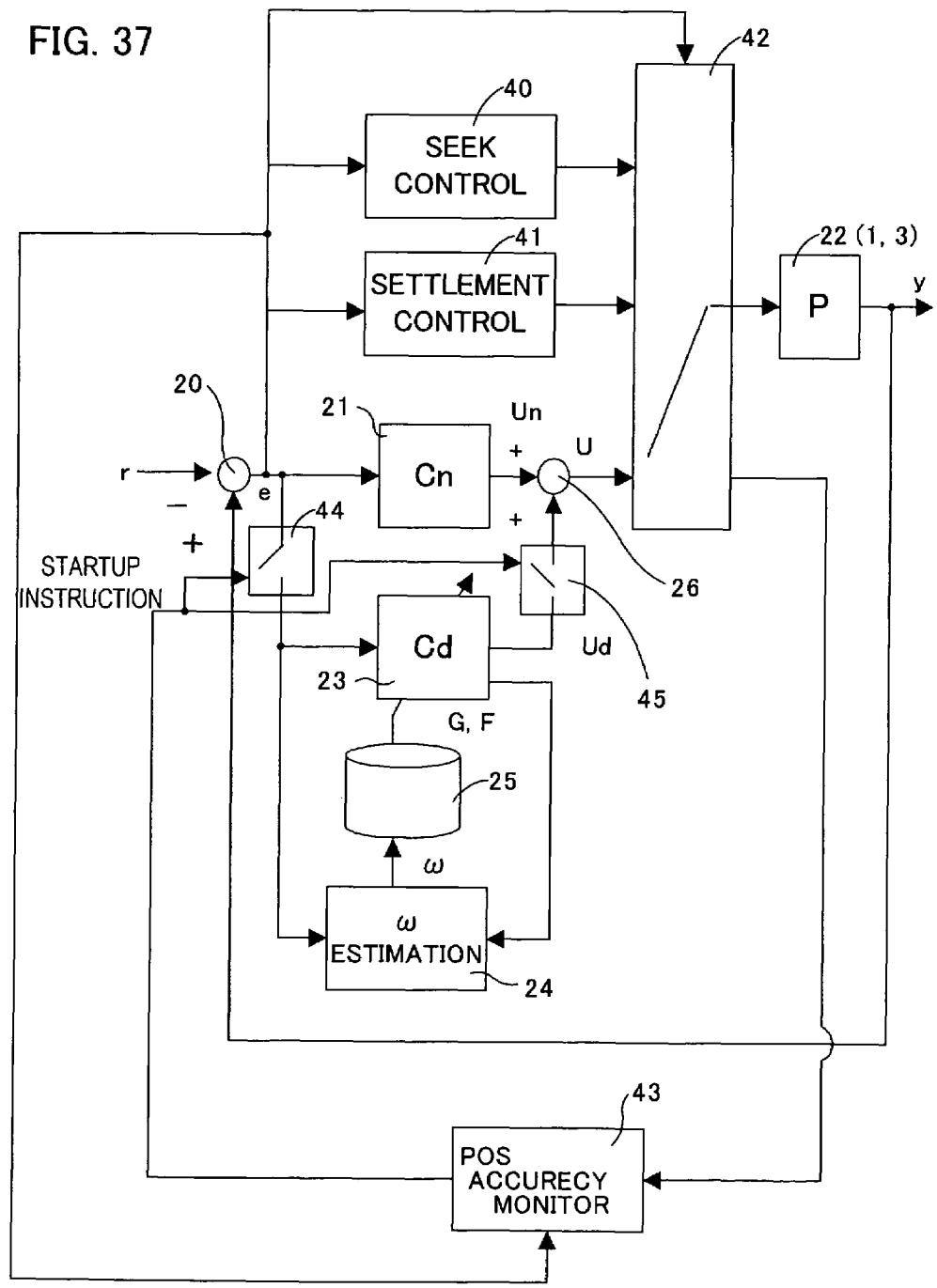
FIG. 37 is a block diagram depicting still another positioning control system according to the seventh embodiment of the present invention.

FIG. 37 is another block diagram depicting the seventh embodiment of the positioning control system of the present invention. In FIG. 37, composing elements the same as those in FIG. 6 and FIG. 36 are denoted with the same reference symbols, of which description is omitted. In this configuration, adaptive controls 23, 24 and 25 are normally OFF. If the positioning accuracy has deteriorated at the read or write execution of data, adaptive controls 23, 24 and 25 are turned ON, and the read or write operation is retried.

In other words, as the configuration of the control system in FIG. 37 shows, the positioning accuracy monitoring block 43 and a pair of switch blocks 44 and 45 at the entrance and exit of the adaptive control blocks 23 and 24 are installed in the configuration in FIG. 36. The positioning accuracy monitoring block 43 receives the control mode (seek, settlement, following) from the switching block 42, and monitors the position error 'e' in the following mode, and judges whether the positioning accuracy has dropped. The switches 44 and 45 are both normally in OFF status. In other words, the input to the adaptive control blocks 23 and 24 is cut-off, and the output therefrom is also cut-off.

When it is judged that the positioning accuracy has dropped due to a disturbance in the above-mentioned monitoring, the positioning accuracy monitoring block 43 sends a startup instruction to both switches 44 and 45, and turns the switches 44 and 45 ON. By this, the position error 'e' is input to the compensator 23 and the ω estimation block 24, and as mentioned above, the disturbance suppression control value Ud is output from the compensator 23 to the addition block 26 via the switch 45. Therefore the output U to the plant 22 (1, 3) during track following changes from the output Un of the controller 21 to (Un+Ud), and disturbance suppression control is performed.

In this case, if the positioning accuracy monitoring block 43 judged that positioning accuracy improved, the switches 44 and 45 can be turned OFF.

By this, the load of processing on the MCU 14 can be further decreased, and when disturbance drops the positioning accuracy, the track following control of the head during a read/write operation can be executed with suppressing disturbance.

Figure 38:
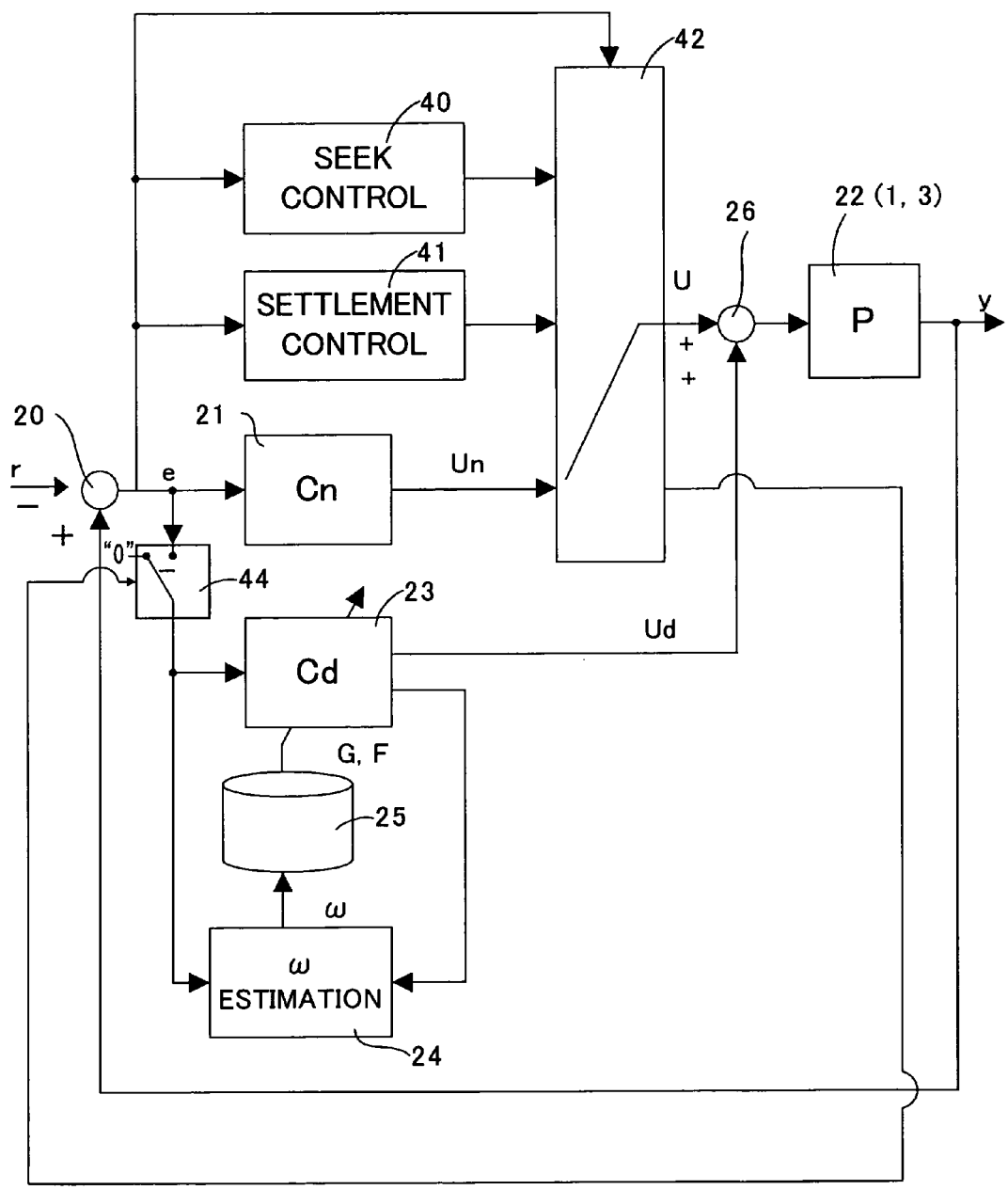
FIG. 38 is a block diagram depicting still another positioning control system according to the seventh embodiment of the present invention.

FIG. 38 is still another block diagram depicting the seventh embodiment of the positioning control system of the present invention. In FIG. 38, composing elements the same as those described in FIG. 6, FIG. 36 and FIG. 37 are denoted with the same reference symbols, of which description is omitted. In this configuration, adaptive control is always operated.

The output Ud of the adaptive control 23 is always supplied, but the input of the adaptive controls 23 and 24 is supplied during track following. By this configuration, adaptive control can be executed without being subject to the influence of a major position error generated during seek response.

In other words, as FIG. 38 shows, the switch block 44 is installed at the entrance of the adaptive control blocks 23 and 24 in the configuration in FIG. 36. The switch block 44 is normally connected to the value "0" side, and is switched to the position error e side in following mode, out of the control modes (seek, settlement, following) sent from the switching block 42. By this, the position error 'e' is input to the compensator 23 and X estimation section 24, and as mentioned above, the disturbance suppression control value Ud is output from the compensator 23 to the addition block 26 via the switch 45.

On the other hand, the addition block 26 is installed between the switching block 42 and the plant 22 (1, 3). Therefore the disturbance suppression control value Ud is added to the seek control value and the settlement control value even when track following is not performed (when seek or settlement control is performed), and is output to the plant 22 (1, 3). For the output U to the plant 22 (1, 3) during track following, on the other hand, the position error 'e' is input, and Ud, according to the position error 'e', is added to the output Un of the controller 21 calculated by the adaptive control blocks 23, and 24, so as to perform disturbance suppression control.

When track following is not performed (when seek or settlement control is performed), the value "0" (position error e=0) is input to the adaptive control blocks 23 and 24 by the switch 44, so the angular frequency X remains as the estimated value in track following, as shown in Expression (20). Therefore the seek operation can be started at track following, without being subject to the influence of a major position error (number of seek tracks) during seeking, even if disturbance cannot be completely suppressed.

In other words, the disturbance suppression control value Ud is added to a seek control value and settlement control value and is output to the plant 22 (1, 3). In this configuration, the positioning control system can be used continuously when heads are switched.

EXAMPLES

Figure 39:
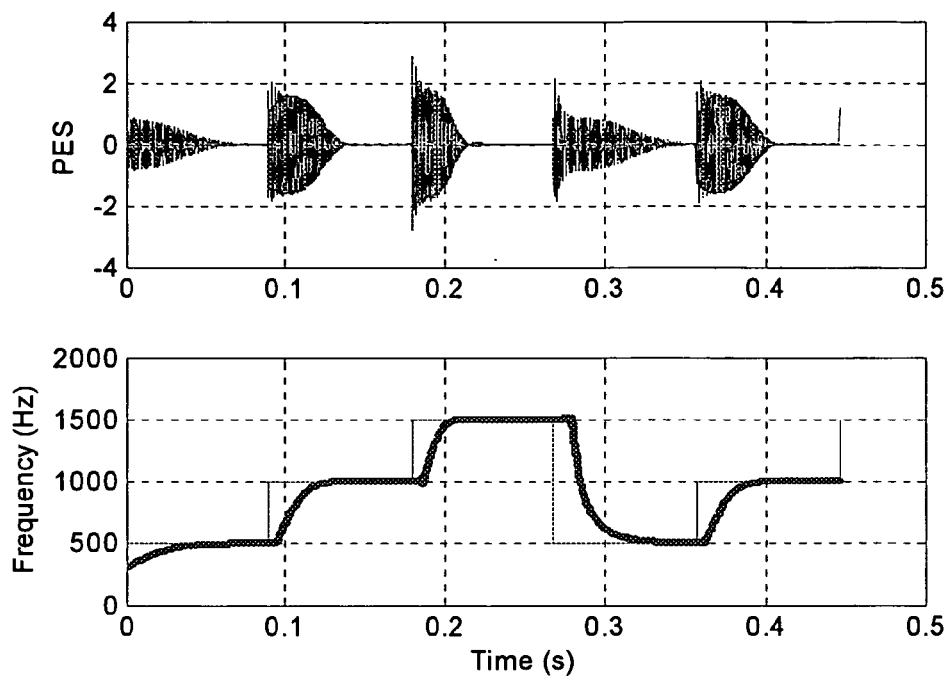
FIG. 39 is graphs depicting the response of an example based on the computer simulation of the control system to which the present invention is applied.
Figure 40:
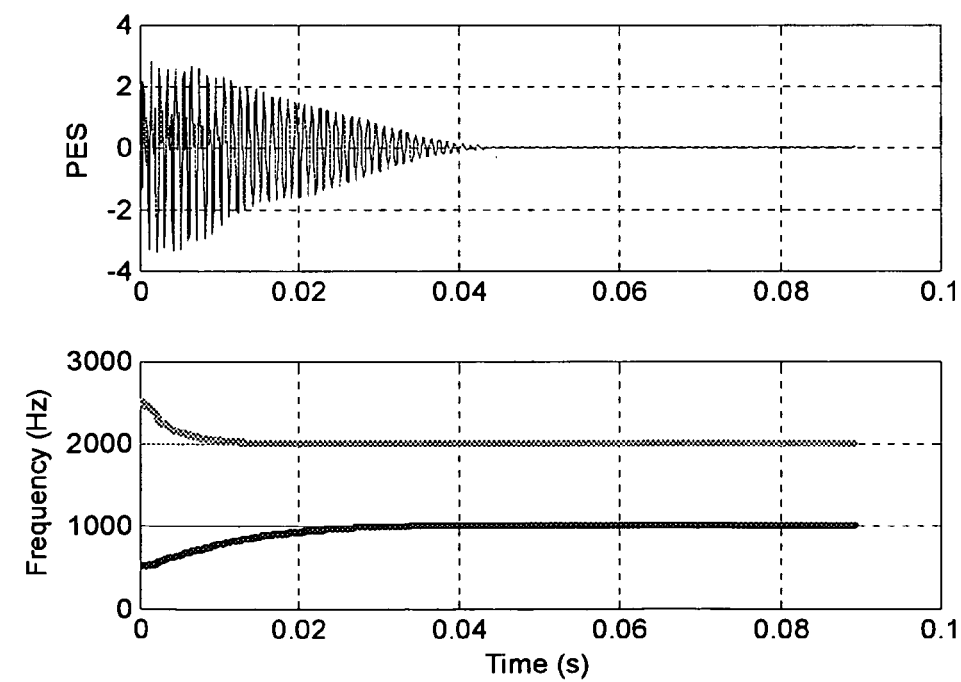
FIG. 40 is graphs depicting the response of another example based on the computer simulation of the control system to which the present invention is applied.

Examples of the present invention will now be described. FIG. 39 and FIG. 40 are the simulation result of the positioning control system to which the adaptive control of the present invention is applied. FIG. 39 and FIG. 40 are control systems having the configuration in FIG. 19, where a model based on observer control is used for the controller 21. Input to the adaptive control, however, is not the estimated position error of the observer, but is the position error.

The top of FIG. 39 is a graph where the abscissa is the time (ms) and the ordinate is the position error PES (e), and the bottom is a graph where the abscissa is the time and the ordinate is the disturbance frequency (Hz). When the disturbance frequency is changed in three steps, 500 Hz, 1000 Hz and 1500 Hz, as shown at the bottom graph in FIG. 39, the position error PES converges appropriately as the top graph in FIG. 39 shows. As the suppression response of the adaptive control of the present invention shows, disturbance can be correctly suppressed.

FIG. 40 is a simulation result of the control system where an adaptive control, that can support the two different frequencies shown in FIG. 24 and FIG. 25, is used. Just like FIG. 39, the top of FIG. 40 is a graph where the abscissa is the time and the ordinate is the position error PES (e), and the bottom is a graph where the abscissa is the time and the ordinate is the disturbance frequency (Hz). As the bottom graph in FIG. 40 shows, two disturbance frequencies, 1000 Hz and 2000 Hz, are provided.

FIG. 40 shows the convergence response when the positioning control system is operated, setting the initial frequencies of the compensators 23A and 23B shown in FIG. 24 to 500 Hz and 2500 Hz respectively. As the top graph in FIG. 40 shows, the position error PES converges appropriately. As the suppression response of the adaptive control of the present invention shows, the disturbance of two different frequencies can be correctly suppressed.

Figure 41:
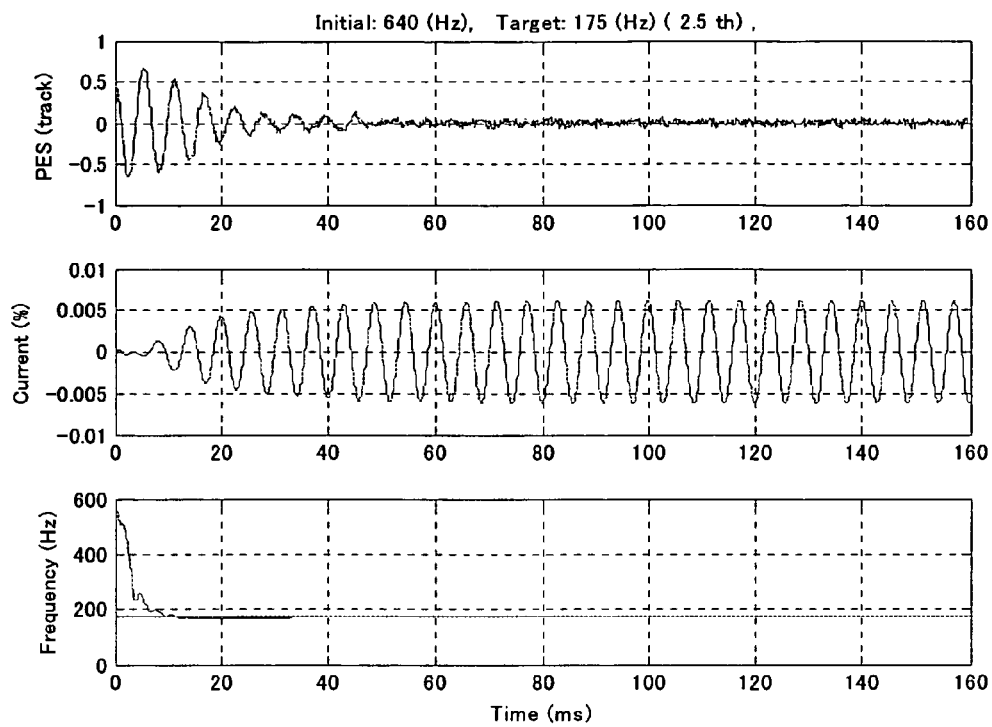
FIG. 41 is graphs depicting the response when a sinusoidal disturbance is applied to the current value in the program on the magnetic disk device to which the present invention is applied.
Figure 42:
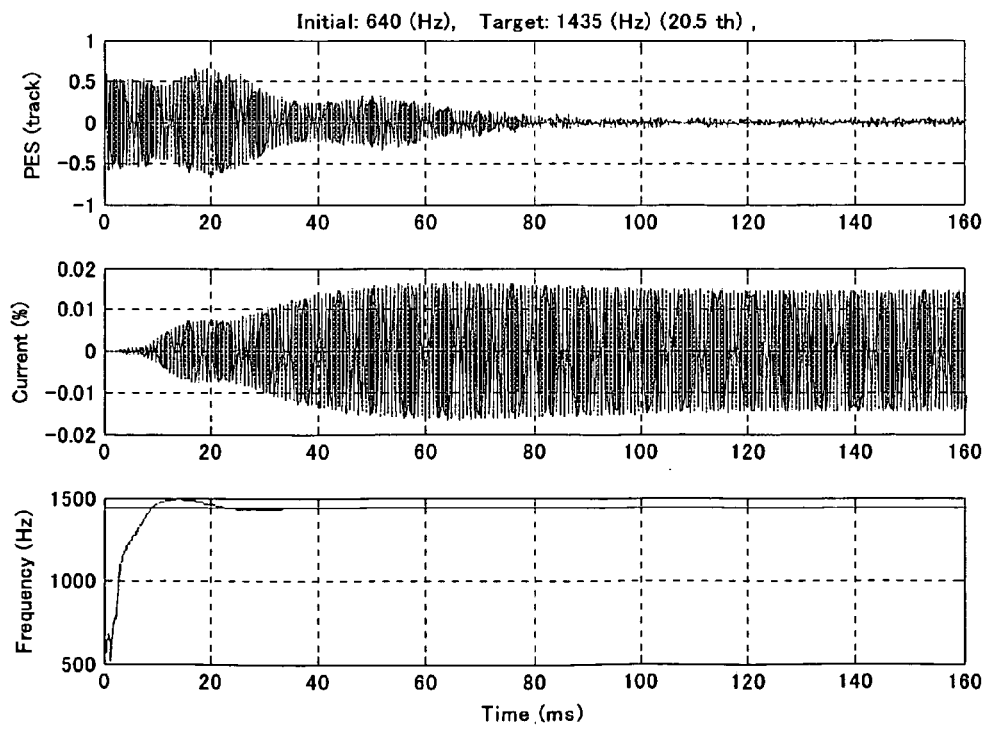
FIG. 42 is graphs depicting the response when another sinusoidal disturbance is applied to the current value in the program on the magnetic disk device to which the present invention is applied.
Figure 43:
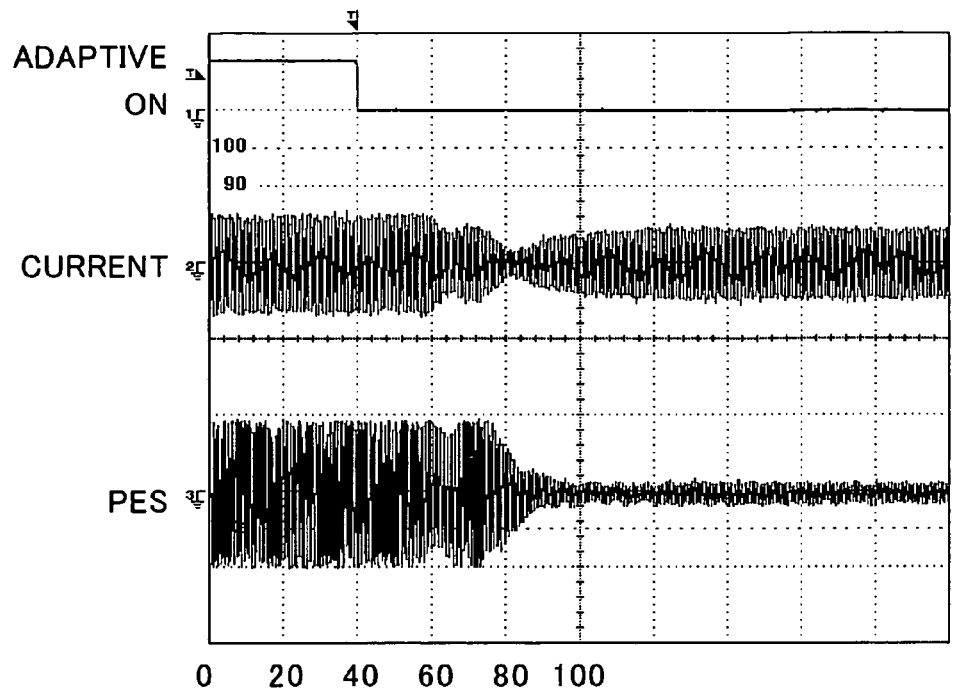
FIG. 43 is graphs depicting the convergence response result when the magnetic disk device to which the present invention is applied is shaken by a shaker.

Now examples using an actual magnetic disk device will be described. FIG. 41, FIG. 42 and FIG. 43 are graphs that show the response characteristics when adaptive control of the present invention is installed in a 2.5-inch magnetic disk device. In FIG. 41 and FIG. 42, the top is a graph where the abscissa is the time (ms) and the ordinate is the position error PES (number of tracks), in the middle graph the abscissa is the time (ms) and the ordinate is the drive current (%), and in the bottom graph the abscissa is the time (ms) and the ordinate is the disturbance frequency (Hz).

For the magnetic disk device, a 2.5-inch device of which rotation frequency is 70 Hz (4200 rpm) was used. The graphs show the response when pseudo-vibration is generated by applying a sinusoidal disturbance at the position y by a program of the MCU 14 of this magnetic disk device. The disturbance frequencies are shifted from an integral multiple of the rotation frequency. The result is expanded as numeric data on the memory of the circuit, and after operation, the values are fetched and shown as a graphic.

In FIG. 41, the estimated value of the disturbance frequency of the compensator is 560 Hz, and a disturbance with a disturbance frequency of 175 Hz is applied, then as the bottom graph in FIG. 41 shows, the estimated disturbance frequency of the compensator changes from 560 Hz to 175 Hz, and the position error PES converges appropriately, as the top graph in FIG. 41 shows. At this time, as the middle graph in FIG. 41 shows, the drive current appropriately changes according to the change of the disturbance. As the suppression response of the adaptive control of the present invention shows, disturbance can be correctly suppressed. In other words, the disturbance frequency can be correctly followed, and the positional fluctuation can be suppressed.

In the same way, in FIG. 42, the estimated value of the disturbance frequency of the compensator is 560 Hz and a disturbance with a disturbance frequency of 1435 Hz is applied, then as the bottom graph in FIG. 42 shows, the estimated disturbance frequency of the compensator changes from 560 Hz to 1435 Hz, and the position error PES converges appropriately, as the top graph in FIG. 42 shows. At this time, as the middle graph in FIG. 42 shows, the drive current appropriately changes according to the change of the disturbance. As the suppression response of the adaptive control of the present invention shows, disturbance can be correctly suppressed.

FIG. 43 are graphs of the response of the adaptive control observed when the magnetic disk device described in FIG. 41 and FIG. 42 is installed on a shaker, and the shaker is driven so as to vibrate sinusoidal waveforms. In FIG. 43, the abscissa is the time (ms) and the ordinate is the time to turn ON the adaptive control, drive current of VCM and the position error PES respectively from the top graph. In this example, the position error PES converges at time 90 ms, which is 50 ms later from the time 40 ms when the adaptive control was turned ON.

This convergence time can be adjusted by the adaptive gain Ka and F in Expression (20) and Expression (21). As the adaptive gain Ka or the value F increases, the frequency follows up more quickly, and the convergence time, to match the disturbance frequency, decreases.

In all the above described examples, disturbance is suppressed by starting adaptive control in a status where an external vibration is applied during track following. However in an actual magnetic device, not only is a same track always followed, but seek control as well is executed to move to another track or to switch heads.

Other Embodiments

In the above embodiments, the disk device was described using a magnetic disk device, but the present invention can also be applied to other disk device, such as an optical disk deice and a magneto-optical disk device, and the shape of the disk is not limited to circular, but may be square, for example. Program control by the MPU was described, but individual hardware may be used.

The present invention was described above using embodiments, but the present invention can be modified in various ways within the scope of the essential character thereof, and these shall not be excluded from the scope of the present invention.

Since the external vibration frequency is estimated by an adaptive rule using signals based on the position error, the accurate external vibration frequency can be estimated based on integral compensation, and since the constants of the compensator are sequentially corrected using this external vibration frequency, highly accurate follow up control is possible for a wide range of external vibration frequencies. In the same way, the operation of the compensator can always be kept at an optimum according to the value of the estimated external vibration frequency, and in particular the present invention contributes to guaranteeing normal operation of the disk drive, even in an environment where external vibration is easily applied.

What is claimed is:

1. A head positioning control method for controlling positioning of a head onto a desired track of a disk by an actuator according to a position signal which the head has read from the disk, comprising the steps of:
   calculating a control value of the actuator according to a position error between a target position and a current position acquired from said position signal;
   estimating sequentially external vibration frequency from a signal that is based on the position error according to an adaptive rule;
   estimating a rotation vector of cyclic disturbance from the signal that is based on the position error and calculating an external vibration suppression control value using a constant for external vibration suppression,
   sequentially correcting said constant for external vibration suppression according to each of the sequentially estimated external vibration frequencies; and
   generating a drive value of the actuator by adding the control value and the external vibration suppression control value.

2. The head positioning control method according to claim 1, wherein
   the step of estimating external vibration frequency further comprises a step of estimating an angular frequency of sequential disturbance from the signal based on the position error according to the adaptive rule,
   the step of calculating the external vibration suppression value further comprises a step of converting the estimated rotation vector of cyclic disturbance into a current value as the external vibration suppression control value using an output gain as the constant for external vibration suppression, and
   the step of correcting further comprises a step of sequentially correcting the output gain according to the sequentially estimated angular frequency.

3. The head positioning control method according to claim 2, wherein the step of correcting further comprises:
   a step of referring to a table for storing the output gains for each of a plurality of angular frequency values by the estimated angular frequency and fetching the corresponding output gain; and
   a step of updating the output gain as the constant for external vibration suppression.

4. The head positioning control method according to claim 3, wherein the step of correcting further comprises:
   a step of referring to a table for storing the output gains for each of a plurality of angular frequency values by the estimated angular frequency, fetching the corresponding two output gains;
   a step of obtaining the output gain of the estimated angular frequency by the interpolation of the two output gains; and
   a step of updating the output gain as the constant for external vibration suppression.

5. The head positioning control method according to claim 2, wherein the step of estimating external vibration frequency further comprises a step of limiting the estimated angular frequency by an upper limit value and a lower limit value.

6. The head positioning control method according to claim 1, further comprising a step of delaying the external vibration suppression control value by one sample,
   wherein the step of generating further comprises a step of generating a drive value of the actuator by adding the control value in the current sample, and the one sample-delayed external vibration suppression control value.

7. The head positioning control method according to claim 1, wherein the step of executing said estimating step, said correcting step, said calculation step of the external vibration suppression value, and said generating step for every one sample,
   and wherein the step of obtaining the control value is executed a plurality of times during the one sample.

8. The head positioning control method according to claim 1, further comprises:
   a step of executing the step of estimating, the step of correcting, and the step of obtaining the external vibration suppression value for each of the plurality of external vibration frequencies; and
   a step of adding the plurality of external vibration suppression values for each of the external vibration frequencies.

9. The head positioning control method according to claim 8, wherein the step of executing further comprises a step of correcting one of the estimated external vibration frequencies so that the estimated external vibration frequencies do not overlap.

10. A head positioning control device for controlling the positioning of a head onto a desired track of a disk by an actuator according to a position signal which the head has read from the disk, comprising:
    a control block for obtaining a control value of the actuator according to a position error between a target position and a current position acquired from the position signal;
    an adaptive control block for estimating sequentially external vibration frequency from a signal that is based on the position error according to an adaptive rule, estimating a rotation vector of cyclic disturbance from the signal based on the position error, obtaining an external vibration suppression control value using a constant for external vibration suppression, and sequentially correcting the constant for external vibration suppression according to each of the sequentially estimated external vibration frequencies; and
    an addition block for adding the control value and the external vibration suppression control value and generating a drive value of the actuator.

11. The head positioning control device according to claim 10,
    wherein the adaptive control block estimates an angular frequency of sequential disturbance from the signal that is based on the position error according to the adaptive rule, converts the estimated rotation vector of cyclic disturbance into a current value as the external vibration suppression control value using an output gain as the constant for external vibration suppression, and sequentially corrects the output gain according to the sequentially estimated angular frequency.

12. The head positioning control device according to claim 11,
    wherein the adaptive control block refers to a table for storing output gains for each of a plurality of angular frequency values by the estimated angular frequency, fetches the corresponding output gain, and updates the output gain as the constant for external vibration suppression.

13. The head positioning control device according to claim 12,
wherein the adaptive control block refers to a table for storing output gains for each of a plurality of angular frequency values by the estimated angular frequency, fetches the corresponding two output gains, obtains the output gain of the estimated angular frequency by the interpolation of the two output gains, and updates the output gain as the constant for external vibration suppression.

14. The head positioning control device according to claim 11,
wherein the adaptive control block limits the estimated angular frequency by an upper limit value and a lower limit value.

15. The head positioning control device according to claim 10,
wherein the adaptive control block delays the external vibration suppression control value by one sample, and the addition block generates a drive value of the actuator by adding the control value with the current sample and the one sample-delayed external vibration suppression control value.

16. The head positioning control device according to claim 10, wherein
the adaptive control block is executed for every one sample, and
the control block is executed a plurality of times during the one sample.

17. The head positioning control device according to claim 10, wherein the adaptive control block is disposed for each of the plurality of external vibration frequencies,
and wherein said device further comprises an addition block for adding the external vibration suppression values of the plurality of adaptive control blocks.

18. The head positioning control device according to claim 17, wherein the adaptive control block corrects one of the estimated external vibration frequencies so that the estimated external vibration frequencies do not overlap.

19. A disk device, comprising:
a head for reading information from a disk;
an actuator for moving the head in the track crossing direction of the disk; and
a control unit for obtaining a control value of the actuator according to a position error between a target position and a current position acquired by a position signal read by the head so as to position the head onto a desired track of a disk according to the position signal,
wherein said control section further comprises:
an adaptive control block for estimating sequential external vibration frequencies from the signal that is based on the position error according to an adaptive rule, estimating a rotation vector of cyclic disturbance from the signal that is based on the position error, obtaining an external vibration suppression control value using a constant for external vibration suppression, and sequentially correcting the constant for external vibration suppression according to each of the sequentially estimated external vibration frequencies; and
an addition block for adding the control value and the external vibration suppression control value and generating a drive value of the actuator.

20. The disk device according to claim 19,
wherein the adaptive control block estimates an angular frequency of sequential disturbance from the signal based on the position error according to the adaptive rule, converts the estimated rotation vector of cyclic disturbance into a current value as the external vibration suppression control value using the output gain as the constant for external vibration suppression, and sequentially corrects the output gain according to the sequentially estimated angular frequency.

21. The disk device according to claim 20,
wherein the adaptive control block refers to a table for storing output gains for each of a plurality of angular frequency values by the estimated angular frequency, fetches the corresponding output gain, and updates the output gain as the constant for external vibration suppression.

22. The disk device according to claim 21,
wherein the adaptive control block refers to a table for storing output gains for each of a plurality of angular frequency values by the estimated angular frequency, fetches the corresponding two output gains, obtains the output gain of the estimated angular frequency by the interpolation of the two output gains, and updates the output gain as the constant for external vibration suppression.

23. The disk device according to claim 19,
wherein the adaptive control block delays the external vibration suppression control value by one sample,
and the addition block generates a drive value of the actuator by adding the control value in the current sample and the one sample-delayed external vibration suppression control value.

24. The disk device according to claim 20,
wherein the adaptive control bocks limits the estimated angular frequency by an upper limit value and a lower limit value.

25. The disk device according to claim 19,
wherein the adaptive control block is executed by the control section for every one sample and calculation of the control value is executed a plurality of times during the one sample.

26. The disk device according to claim 19,
wherein the control unit further comprises:
a plurality of the adaptive control block; and
an addition block for adding the external vibration suppression values of the plurality of adaptive control blocks for each of the plurality of external vibration frequencies.

27. The disk device according to claim 26,
wherein the adaptive control block corrects one of the estimated external vibration frequencies so that the estimated external vibration frequencies do not overlap.

* * * * *